US009330468B2

(12) United States Patent
Shaw

(10) Patent No.: US 9,330,468 B2
(45) Date of Patent: May 3, 2016

(54) METHOD AND SYSTEM FOR ANALYZING INTERACTIONS

(71) Applicant: RetailNext, Inc., San Jose, CA (US)

(72) Inventor: George Shaw, Palo Alto, CA (US)

(73) Assignee: RetailNext, Inc., San Jose, CA (US)

( * ) Notice: Subject to any disclaimer, the term of this patent is extended or adjusted under 35 U.S.C. 154(b) by 239 days.

(21) Appl. No.: 13/781,309

(22) Filed: Feb. 28, 2013

(65) Prior Publication Data

US 2013/0294646 A1 Nov. 7, 2013

Related U.S. Application Data

(63) Continuation-in-part of application No. 13/603,832, filed on Sep. 5, 2012.

(60) Provisional application No. 61/605,054, filed on Feb. 29, 2012, provisional application No. 61/605,064, filed on Feb. 29, 2012.

(51) Int. Cl.
*G06K 9/00* (2006.01)
*G06T 7/00* (2006.01)

(52) U.S. Cl.
CPC .......... *G06T 7/0048* (2013.01); *G06K 9/00771* (2013.01)

(58) Field of Classification Search
None
See application file for complete search history.

(56) References Cited

U.S. PATENT DOCUMENTS

| 8,615,254 | B2 * | 12/2013 | Jamtgaard | G01S 3/7864 345/427 |
| 8,989,775 | B2 * | 3/2015 | Shaw | H04W 24/00 455/414.2 |
| 9,158,975 | B2 * | 10/2015 | Lipton | G06K 9/00771 |
| 2004/0248589 | A1 * | 12/2004 | Gwon et al. | 455/456.1 |
| 2005/0114379 | A1 * | 5/2005 | Lee | G06Q 10/10 |
| 2011/0169917 | A1 * | 7/2011 | Stephen et al. | 348/46 |
| 2012/0046044 | A1 * | 2/2012 | Jamtgaard et al. | 455/456.1 |
| 2012/0130774 | A1 * | 5/2012 | Ziv et al. | 705/7.39 |
| 2015/0181387 | A1 * | 6/2015 | Shaw | H04W 24/00 455/456.1 |
| 2015/0235237 | A1 * | 8/2015 | Shaw | G06Q 30/0201 705/7.29 |

* cited by examiner

*Primary Examiner* — Soo Park

(74) *Attorney, Agent, or Firm* — Dergosits & Noah LLP; Todd A. Noah

(57) ABSTRACT

Techniques are provided for tracking different types of subjects and labeling the tracks according to subject type. In an implementation, the tracking includes tracking first and second subject types using video, and also tracking subjects of the first type using Wi-Fi tags provided to the subjects of the first type. The video and Wi-Fi tracks can be compared in order to identify and label which video tracks are associated with subjects of the first type and which video tracks are associated with subjects of the second type. Upon the tracks having been labeled, interactions between the different subject types can be identified and analyzed.

16 Claims, 43 Drawing Sheets

METHOD AND SYSTEM FOR ANALYZING INTERACTIONS

CROSS-REFERENCE TO RELATED APPLICATIONS

This patent application claims priority to U.S. provisional patent application 61/605,064, filed Feb. 29, 2012, and is a continuation-in-part of U.S. patent application Ser. No. 13/603,832, filed Sep. 5, 2012, which claims priority to U.S. provisional patent application 61/605,054, filed Feb. 29, 2012, which are all incorporated by reference along with all other references cited in this application.

BACKGROUND

The present invention relates to the field of information technology, including, more particularly, to systems and techniques for tracking and identifying different types of subjects.

Tracking subjects through a real world space offers benefits in a variety of areas including commercial, business, corporate, security, government, science, and others. For example, brick and mortar businesses have long desired to gather data that would allow them to better understand customer behavior and how such behavior is influenced by the salespersons.

Such data can be used to improve the customer shopping experience, educate salespersons on how to assist customers, make decisions about merchandising, advertising, pricing, staffing, design new in-store concepts, and, in particular, understand how customers interact with store displays, make correlations with sales data, calculate conversion rates, identify good locations for merchandise, identify poor performing products and locations, improve store layout, provide targeted promotions, and much more. Providing traditional retailers with a data-driven approach can help them provide the best possible shopping experience, stay ahead of constantly evolving customer needs, reduce cost and significantly increase revenue per square foot.

Techniques are needed to accurately identify and track different types of subjects (e.g., salespersons and customers) moving through a particular space (e.g., store) so that interactions between the different subject types can be analyzed.

BRIEF SUMMARY OF THE INVENTION

Techniques are provided for tracking different types of subjects and labeling the tracks according to subject type. In an implementation, the tracking includes tracking first and second subject types using video, and also tracking subjects of the first type using Wi-Fi tags provided to the subjects of the first type. The video and Wi-Fi tracks can be compared in order to identify and label which video tracks are associated with subjects of the first type and which video tracks are associated with subjects of the second type. Upon the tracks having been labeled, interactions between the different subject types can be identified and analyzed.

In a specific implementation, techniques are provided for an approach to tracking the location over time of a WiFi enabled device (which may be referred to as a "tag" or mobile client) that transmits a signal over a standard wireless network. Techniques are provided for how this location data is used in conjunction with location information derived from video. There is a software algorithm that translates signal strength readings from the tags into location data, and there is a methodology for tying the (imprecise) tag location readings to (precise but inaccurate) locations derived from video.

In this specific implementation, the basic problem to be solved in tracking is to make sense of the received signal strength indicator (RSSI) readings taken at wireless (802.11 g) access points (APs). The correlation problem includes taking two movement traces (x,y coordinates over time), one from WiFi tracking and one from video-based tracking, and determining whether they represent the same person. In this specific implementation, a system as described in this patent application performs WiFi tracking and integrates these movement traces with video in an accurate, scalable way.

In a specific implementation of a methodology for tracking, three or more wireless (802.11 g) access points (APs) are positioned throughout the space where tracking will take place. Given one or more tags (normally carried by a person) beaconing in this space, the system captures and processes RSSI from each AP for each tag. Signal strength is a proxy for the distance from the AP to the tag. If this proxy were an accurate mapping (i.e., if the relationship between RSSI and distance were purely linear) then tracking would be a simple matter of triangulating tag location from the distance readings to the 3 nearest APs.

This is not the case, however. RSSI is affected by a multitude of issues, including signal inhibition by physical objects, multipath effects (when signal reaches the AP via two different routes), and signal reflectance and refraction. A technique as described in this patent application allows for tracking the tags with a good level of precision.

In a specific implementation, a first step includes determining a distance to an AP. In other words, an attempt is made to determine a tag's distance to an AP based on its RSSI. In this specific implementation, to accomplish this, samples of RSSI at various known distances to the AP in question are taken. Statistics (mu, sigma) for the observed RSSI at each distance are generated. When a new RSSI reading is received, a gaussian mixture model (GMM) is employed in order to produce the maximum likelihood distance to the AP. In order to account for the limited number of distance samples taken during calibration (due to practical considerations), the system employs a simple linear model of distance versus RSSI and combines this linear hypothesis with the GMM's hypothesis. The result of this step is a "best guess" as to the distance of the tag to the AP in question. A confidence score is attached to each distance hypothesis that equates roughly to the likelihood that the distance hypothesis is accurate.

In a second step, given a set of distances (derived above), the system generates a best hypothesis as to the location of the tag. Again, with perfect distance readings this would be simply a matter of trigonometry. However, the system can account for possibly very large inaccuracies in distance estimates. In a specific implementation, one AP and corresponding distance reading gives a circle of possible tag locations. Two APs with corresponding distance readings gives (potentially) two possible locations.

In this specific implementation, for each pair of AP's, the pair of possible locations for the tag is derived. The system can assign each pair of points a confidence score based on the scores assigned to the distances used to derive locations. The system then generates all clusters of potential points, where a cluster includes exactly one point hypothesis from each pair of AP's. Each cluster may also be assigned a confidence score based on the scores of its points. The system then takes the best cluster as the most likely tag location, with the mean of that cluster as the hypothesized point. In a specific implementation, the "best" cluster is defined as the one with minimum size and maximum confidence. The result of this part of the system is a location for each tag at each point in time.

Taken together, these points make up tracks of individual tags as they move through a space.

A third step includes correlation. In this specific implementation, the system produces representations of the two different movement traces (WiFi and video) that are comparable and that account for the deficiencies in each trace type. The system finds the temporal intersection between the two traces. In this specific implementation, this means taking the segment of each trace that begins at the maximum start time of the two and ends at the minimum end time of the two.

Next, the system determines suitable temporal and spatial sample resolutions. These resolutions can be thought of as the "lowest common denominator" between the two trace types. In a specific implementation, the system uses 1 second and 1 meter for temporal and spatial resolutions respectively.

The system may then step through each trace at intervals corresponding to the temporal resolution, recording spatial location (discretized at the spatial resolution determined above) and velocity (represented in polar form, theta and magnitude). An assumption may be made that there is one video track for each WiFi track. In this specific implementation, the system can then perform an optimal matching between the two sets of tracks using a modified version of Munkres' Algorithm, with the cost of correlating two tracks determined by the Euclidean distance between their feature vectors.

In a specific implementation, a method includes tracking, via video, a set of subjects of a first type, and a set of subjects of a second type, different from the first type, to generate video tracks, tracking, via Wi-Fi, the set of subjects of the first type, to generate Wi-Fi tracks, comparing the Wi-Fi tracks and the video tracks, and based on the comparison, labeling a subset of the video tracks as being associated with the subjects of the first type.

The method may include providing a set of tags to the set of subjects of the first type, where a tag is to be carried by a subject of the first type, and the tag transmits a Wi-Fi signal to allow the subject of the first type to be tracked. Tracking, via Wi-Fi, the set of subjects of the first type may include analyzing a Wi-Fi signal transmitted from a tag carried by a subject of the first type.

In an implementation, the subset of the video tracks associated with the subjects of the first type is a first subset, and the method includes based on the comparison, labeling a second subset of the video tracks as being associated with the subjects of the second type. The subjects of the first type may include salespersons. The subjects of the second type may include customers. In a specific implementation, comparing the Wi-Fi tracks and the video tracks includes comparing changes in direction specified by a first Wi-Fi track with changes in direction specified by a first video track, and if the changes in direction specified by the first Wi-Fi track correspond to the changes in direction specified by the first video track, labeling the first video track as being associated with a subject of the first type.

In another specific implementation, a method includes tracking, via video, a set of subjects of a first type, and a set of subjects of a second type, different from the first type, to generate video tracks, tracking, via tags, the set of subjects of the first type, to generate Wi-Fi tracks, comparing the Wi-Fi tracks and the video tracks, and based on the comparison, labeling a subset of the video tracks as being associated with the subjects of the first type, where the tags are carried by the subjects of the first type, and are not carried by the subjects of the second type. The method may include providing the tags to the subjects of the first type, and not providing the tags to the subjects of the second type.

The subset of video tracks associated with the subjects of the first type may be a first subset and the method may include labeling a second subset of the video tracks as being associated with the subjects of the second type. In a specific implementation, if a first Wi-Fi track corresponds to a first video track, the first video track is labeled as being associated with a subject of the first type. Comparing the Wi-Fi and video tracks may include comparing changes in direction specified by a first Wi-Fi track and changes in direction specified by a first video track, and if the changes in direction specified by the first Wi-Fi track corresponds to the changes in direction specified by the first video track, labeling the first video track as being associated with the subjects of the first type.

In a specific implementation, the tracking, via tags, the set of subjects of the first type, includes detecting at each of at least three access points a strength of a signal from a first tag carried by a first subject of the first type, determining for each of the at least three access points a distance between an access point and the first tag based on the strength of the signal detected at the access point, defining for each access point a circular boundary encompassing possible locations for the first tag, the circular boundary including a radius based on the determined distance between the access point and the tag, identifying pairs of intersections formed by each circular boundary crossing another circular boundary, grouping the intersections into a set of clusters, each cluster including a single intersection from each of the pairs of intersections, analyzing the set of clusters to identify a cluster having a smallest size, and using the cluster having the smallest size to determine a location of the first tag.

In another specific implementation, a method includes tracking, via video, a set of subjects of a first type, and a set of subjects of a second type, different from the first type, to generate video tracks, while the tracking, via video, subjects of the first and second type, tracking, via tags, the set of subjects of the first type, to generate Wi-Fi tracks, comparing the Wi-Fi tracks and the video tracks, and based on the comparison, labeling a subset of the video tracks as being associated with the subjects of the first type. In an implementation, the tags are carried by the subjects of the first type, and are not carried by the subjects of the second type.

Tracking, via tags, the set of subjects of the first type may include detecting at each of at least three access points a strength of a signal from a first tag carried by a first subject of the first type, determining for each of the at least three access points a distance between an access point and the first tag based on the strength of the signal detected at the access point, defining for each access point a circular boundary encompassing possible locations for the first tag, the circular boundary including a radius equal to or greater than the determined distance between the access point and the tag, identifying pairs of intersections formed by each circular boundary crossing another circular boundary, grouping the intersections into a set of clusters, each cluster including a single intersection from each of the pairs of intersections, analyzing the set of clusters to identify a cluster having a smallest size, and using the cluster having the smallest size to determine a location of the first tag.

In a specific implementation, the intersections of the clusters form vertices of polygons, and the analyzing the set of clusters to identify a cluster having a smallest size includes calculating areas of the polygons, and comparing the areas to identify a polygon having a smallest area, where the polygon having the smallest area is the cluster having the smallest size. The intersections may be specified by x-coordinates and y-coordinates. Comparing the Wi-Fi tracks and the video tracks may include comparing changes in direction specified by a first Wi-Fi track and changes in direction specified by a first video track, and if the changes in direction specified by the first Wi-Fi track corresponds to the changes in direction specified by the first video track, labeling the first video track as being associated with the subjects of the first type. In an implementation, the subset of the video tracks associated with the subject of the first type is a first subset, and the method includes labeling a second subset of the video tracks as being associated with the subjects of the second type.

In another specific implementation, a method includes detecting at each access point of a set of access points a strength of a signal from a mobile client, determining for each access point a distance between an access point and the mobile client based on the strength of the signal detected at the access point, defining for each access point a boundary encompassing possible locations for the mobile client, the boundary including a dimension based on the determined distance between the access point and the mobile client, identifying pairs of intersections formed by each boundary crossing another boundary, grouping the intersections into a set of clusters, each cluster including a single intersection from each of the pairs of intersections, analyzing the set of clusters to identify a cluster having a smallest size, and using the cluster having the smallest size to determine a location of the mobile client.

In a specific implementation, the intersections of the clusters form vertices of polygons, and the analyzing the set of clusters to identify a cluster having a smallest size includes calculating areas of the polygons, and comparing the areas to identify a polygon having a smallest area, where the polygon having the smallest area is the cluster having the smallest size. The intersections may include x-coordinate values, and y-coordinate values, and the method may include averaging x-coordinate values for intersections of the cluster having the smallest size to calculate an average x-coordinate value, and averaging y-coordinate values for intersections of the cluster having smallest size to calculate an average y-coordinate value, where the location of the mobile client is specified by the average x-coordinate value and the average y-coordinate value.

The set of access points may include at least three access points. In an implementation, the set of access points are capable of receiving Wi-Fi signals. The dimension may be a radius having a length equal to the determined distance. The dimension may be a radius having a length equal to or greater than the determined distance.

In a specific implementation, determining for each Wi-Fi access point a distance between a Wi-Fi access point and the mobile client based on the strength of the signal detected at the Wi-Fi access point includes consulting a database that stores information correlating the strength of the signal detected at the Wi-Fi access point to a probability of a specific distance being between the Wi-Fi access point and the mobile client.

In another specific implementation, a method includes detecting at each of at least three Wi-Fi access points a strength of a signal from a mobile client, determining for each Wi-Fi access point a distance between a Wi-Fi access point and the mobile client based on the strength of the signal detected at the Wi-Fi access point, defining for each access point a circular boundary encompassing possible locations for the mobile client, the circular boundary including a radius having a length based on the determined distance between the Wi-Fi access point and the mobile client, identifying pairs of intersections formed by each circular boundary crossing another circular boundary, grouping the intersections into a set of clusters, each cluster including a single intersection from each of the pairs of intersections, analyzing the set of clusters, and based on the analysis, determining a location of the mobile client.

In a specific implementation, the intersections of the clusters include x-coordinates and y-coordinates, and define vertices of polygons, and the method includes calculating areas of the polygons, comparing the areas to identify a polygon having a smallest area, averaging the x-coordinates of the polygon having the smallest area to calculate an average x-coordinate value, and averaging the y-coordinates of the polygon having the smallest area to calculate an average y-coordinate value, where the average x-coordinate value and the average y-coordinate value specify the location of the mobile client. The length of the radius may be equal to or greater than the determined distance between the Wi-Fi access point and the mobile client.

In a specific implementation, determining for each Wi-Fi access point a distance between a Wi-Fi access point and the mobile client based on the strength of the signal detected at the Wi-Fi access point includes consulting a database that stores information correlating the strength of the signal detected at the Wi-Fi access point to a probability of a specific distance being between the Wi-Fi access point and the mobile client.

In another specific implementation, a method includes detecting at each of a set of access points a strength of a signal from a mobile client, determining for each access point a distance between an access point and the mobile client based on the strength of the signal detected at the access point, defining for each access point a circular boundary including a radius having a length based on the determined distance between the access point and the mobile client, identifying pairs of intersections formed by each circular boundary crossing another circular boundary, grouping the intersections into a set of clusters, each cluster including a single intersection from each of the pairs of intersections, analyzing the set of clusters, and based on the analysis, determining a location of the mobile client. There can be at least three pairs of intersections.

Other objects, features, and advantages of the present invention will become apparent upon consideration of the following detailed description and the accompanying drawings, in which like reference designations represent like features throughout the figures.

DETAILED DESCRIPTION

Figure 1:
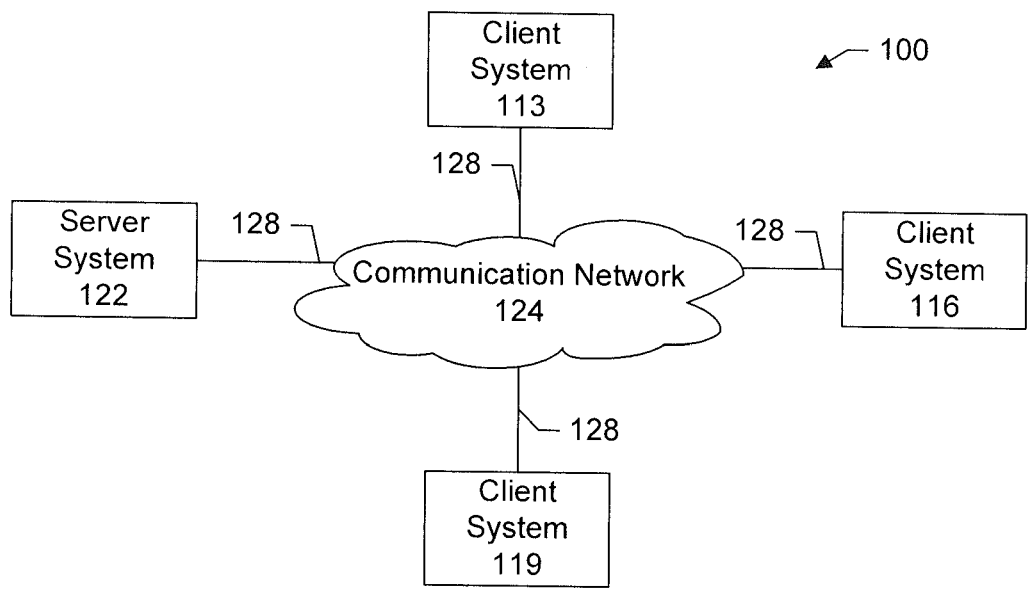
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
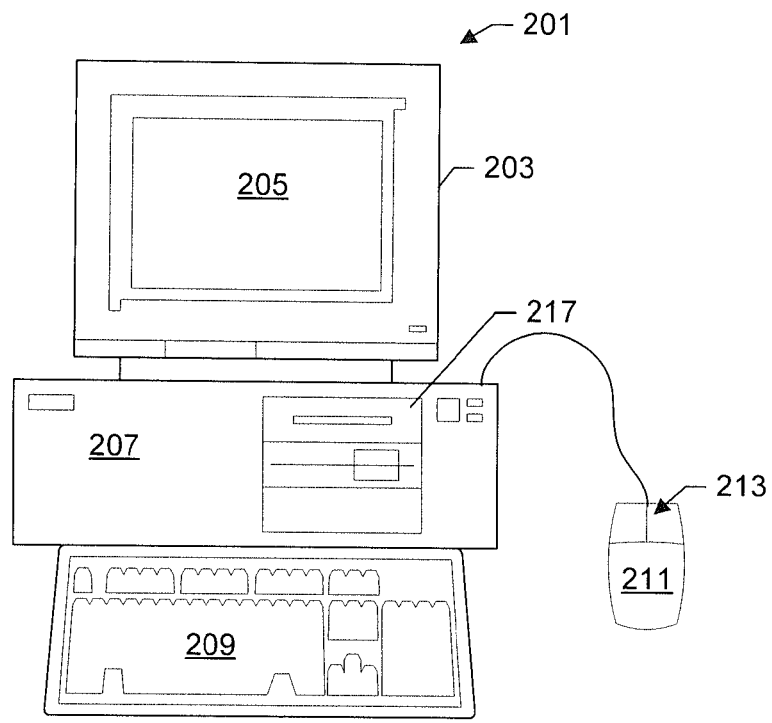
FIG. 2 shows a more detailed diagram of an example of a client or computer which may be used in an implementation of the invention.

FIG. 2 shows an example of a client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3A:
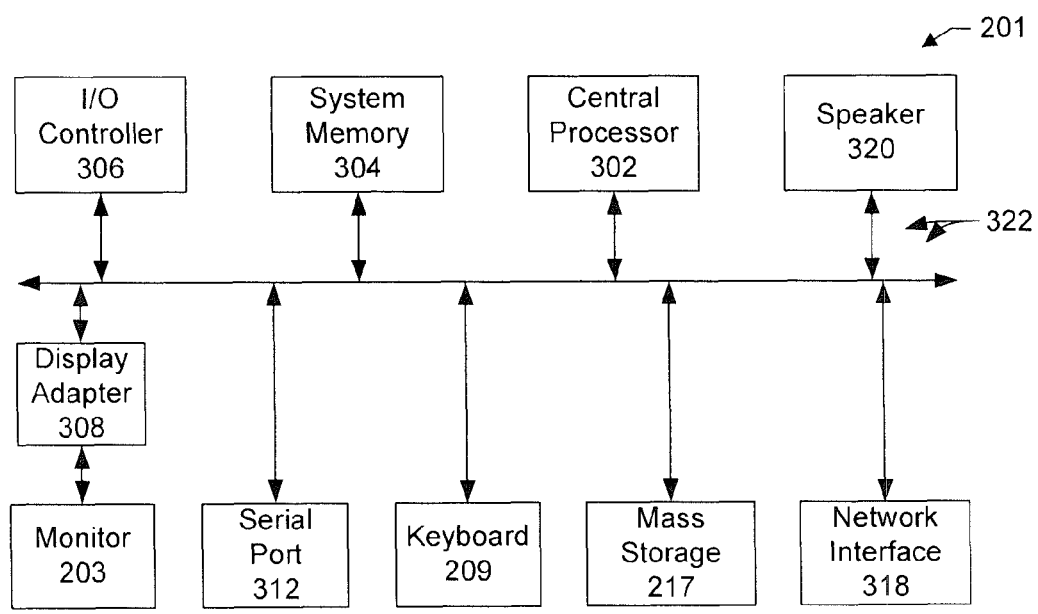
FIG. 3A shows a system block diagram of a client computer system.

FIG. 3A shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®, Windows 8®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 3B:
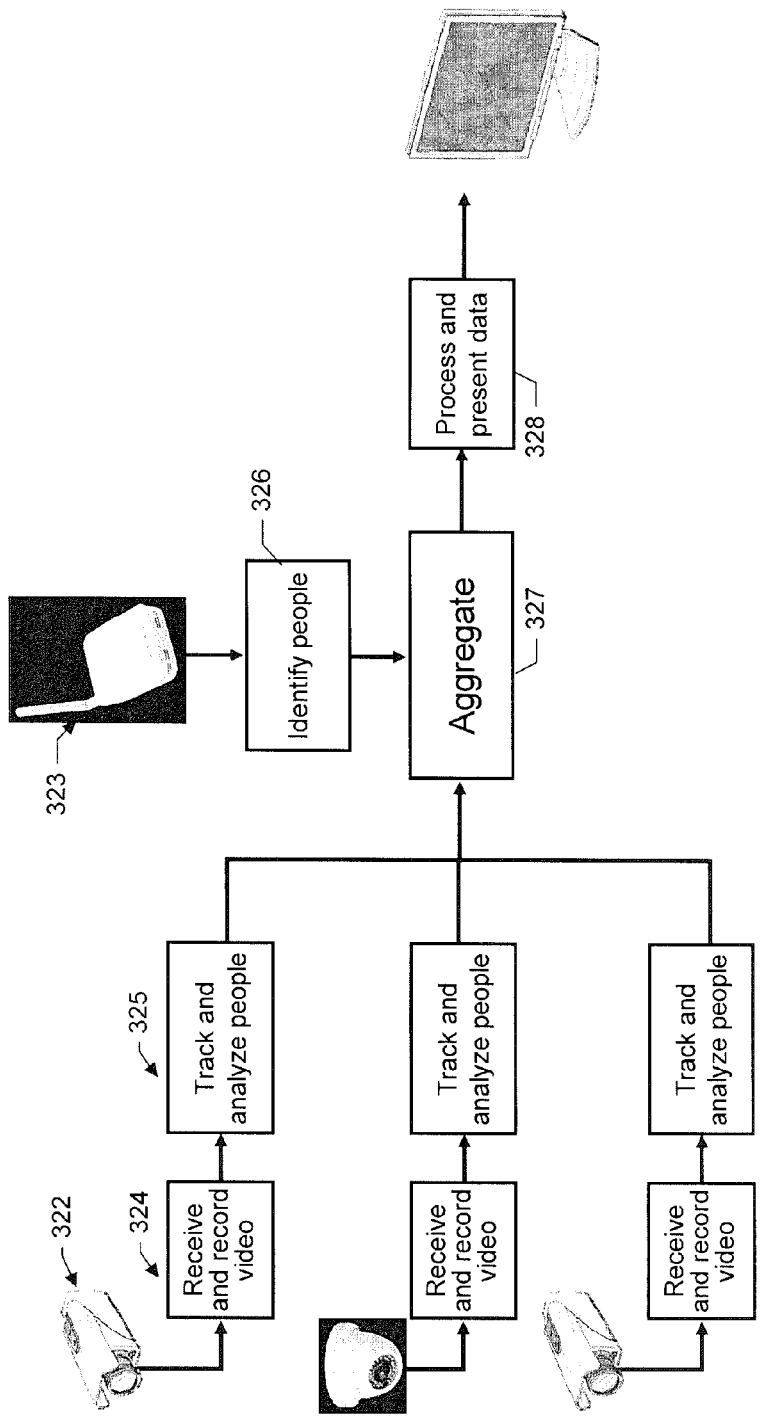
FIG. 3B shows a schematic overview of a system for interaction analysis.

FIG. 3B shows a schematic overview of a system for analyzing interactions between different types of subjects in a real space. In a specific embodiment, the real space is a store and the subjects are people (e.g., customers and salespersons) in the store. This diagram shows a set of cameras 322 and wireless access points (APs) or routers 323 that are positioned in the store. Although this example shows a single access point, there can be at least three access points.

In an implementation, the system receives and records video 324 captured by the cameras. The recorded video may include both the customers and salespersons. The system analyzes the video in order to generate video tracks 325 representing the movement paths of the customers and salespersons. The access points are used to track tags carried by the salespersons. The tracking of the tags is used to generate Wi-Fi tracks representing the movement paths of the salespersons.

The system compares the Wi-Fi and video tracks to identify people 326. More particularly, in a specific implementation, the tracks are compared in order to distinguish, segregate, label, or identify which video tracks are associated with salespersons and which video tracks are associated with customers. Knowing which track is a customer and which track is a salesperson allows for examining customer behavior, identifying the number of customers who entered the store, and much more. In particular, an aggregation module 327 can analyze the identified tracks to provide information about interactions between the customers and salespersons. The system can process and present the information 328 to a user such as the store owner or manager.

A use case for matching WiFi with video would be to perform interaction analysis in a store. The system tracks all people throughout the store. Sales associates are carrying Wi-Fi tags, and so are also tracked using the Wi-Fi tracking system. We match those tracks to video tracks, so that we have a set of (video-based) tracks with sales associate tracks labeled. We can then look for instances where a customer track interacts with a sales associate track (with "interact" defined as being in proximity to for some period of time). These interactions between associates and customers are useful data points for retailers so that they can better train sales staff and modify staffing levels to affect positive outcomes in the store.

Some other examples of interaction analyses that the system can provide include time to interaction (e.g., "When a customer enters the store, how long is it before a sales associate interacts with them?"), time spent interacting (e.g., "What is the average amount of time a customer spends interacting with a sales associate?"), distance traveled while interacting (e.g., "Do sales associates tend to walk around while interacting with customers, or are they stationary?"), correlation of interaction time to sale amount (e.g., "Do longer interactions result in higher dollar amount sales?"), identifying salesperson behavior (e.g., "Do salespeople typically cluster around a particular area on the store or do they spread out in the store?"), or combinations of these. Analysis can be on a micro-level (e.g., analyzing interaction between a single salesperson and a single customer), on a macro-level, or both.

The definition of an "interaction" can be flexible and can be tuned to different environments. For example, one retailer might be interested in understanding properties of "greeters" or people at the front door who say hello to customers (so an interaction might be defined as an associate and customer spending at least 5 seconds within 5 feet of each other), while another retailer might only want to understand longer interactions, i.e., those that constitute a conversation (where an interaction might be an associate and customer spending at least 2 minutes together while being within 15 feet).

Figure 3C:
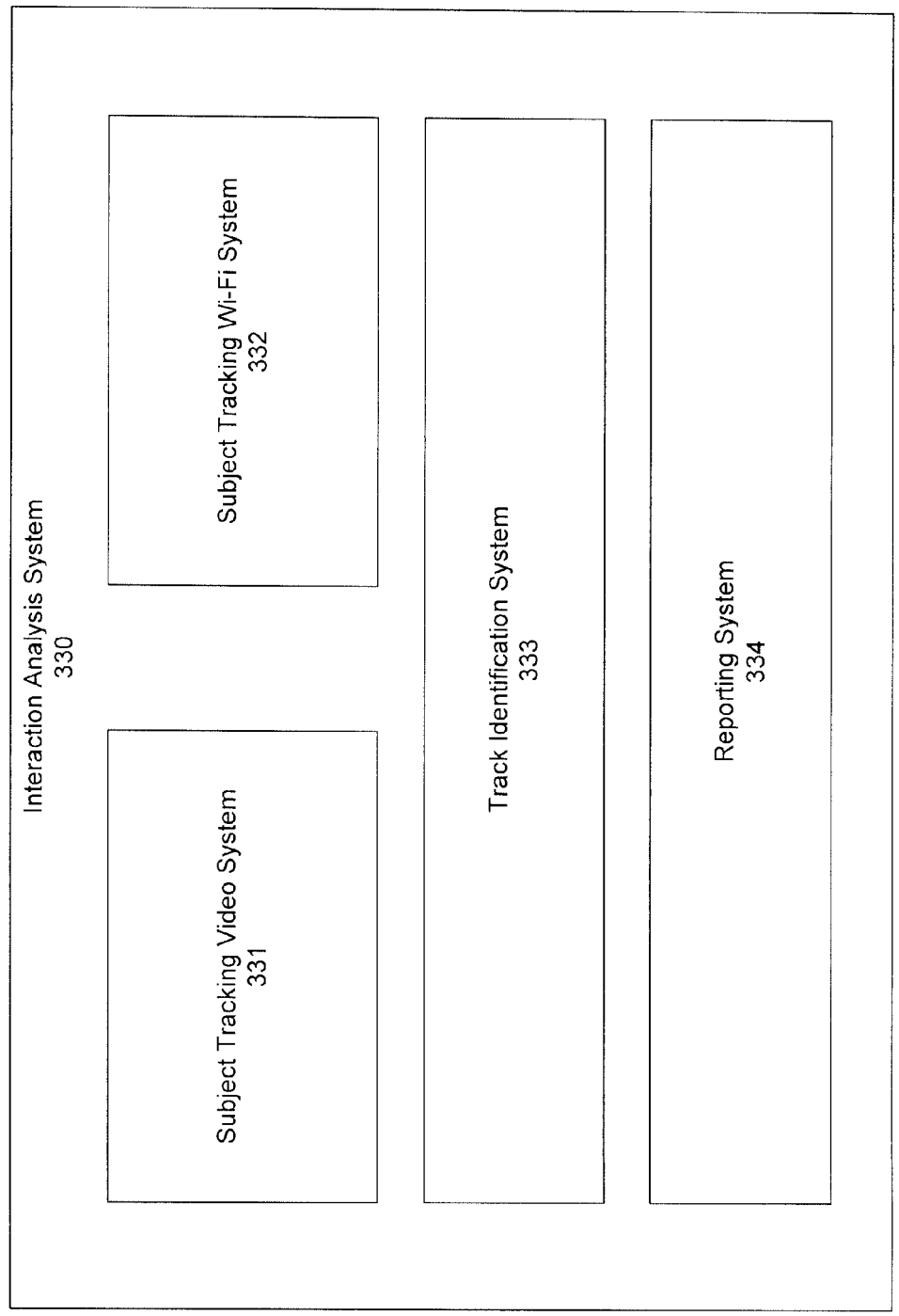
FIG. 3C shows a simplified block diagram of a system for interaction analysis.

FIG. 3C shows a block diagram of a specific embodiment of an interaction analysis system 330. System 330 includes several subsystems including a subject tracking video system 331, a subject tracking Wi-Fi system 332, a track identification and intelligence system 333, and a reporting system 334.

The subject tracking video system is responsible for video-based tracking of subjects in the store. In an implementation, the video tracking system tracks both salespersons and customers of a store. Salespersons are employees and may be referred to as sales associates, sales representatives, shop assistants, sales managers, or sales clerks. Customers may be referred to as guests, patrons, clients, shoppers, buyers, or purchasers.

The subject tracking Wi-Fi system is responsible for Wi-Fi-based tracking of subjects in the store. In an implementation, the Wi-Fi tracking system tracks the salespersons, but not the customers. That is, the customers are excluded from being tracked via Wi-Fi. In another specific implementation, the customers may be tracked via Wi-Fi such as tracked via their smartphones.

The track identification and intelligence system uses the Wi-Fi-based tracking of salespersons to identify which of the video-based tracks are salespersons and which of the video-based tracks are customers. For example, the system can compare a Wi-Fi-based salesperson track with a video-based track. If features of the Wi-Fi based salesperson track correspond to features of the video-based track, the system can tag or label the video-based track as being that of a salesperson. Once the tracks are labeled, the system can perform data analysis (e.g., interaction analysis). The analysis can include trend analysis, resource utilization analysis, workforce productivity analysis, event correlation (e.g., correlating customer assistance with customer purchases), anomaly detection, threshold violation detection, or traffic flow analysis—just to name a few examples.

The reporting system acts as a user interface to the system for displaying reports and results from the analysis. Reports may be shown graphically such as on an electronic screen, printed on paper, or both.

Figure 3D:
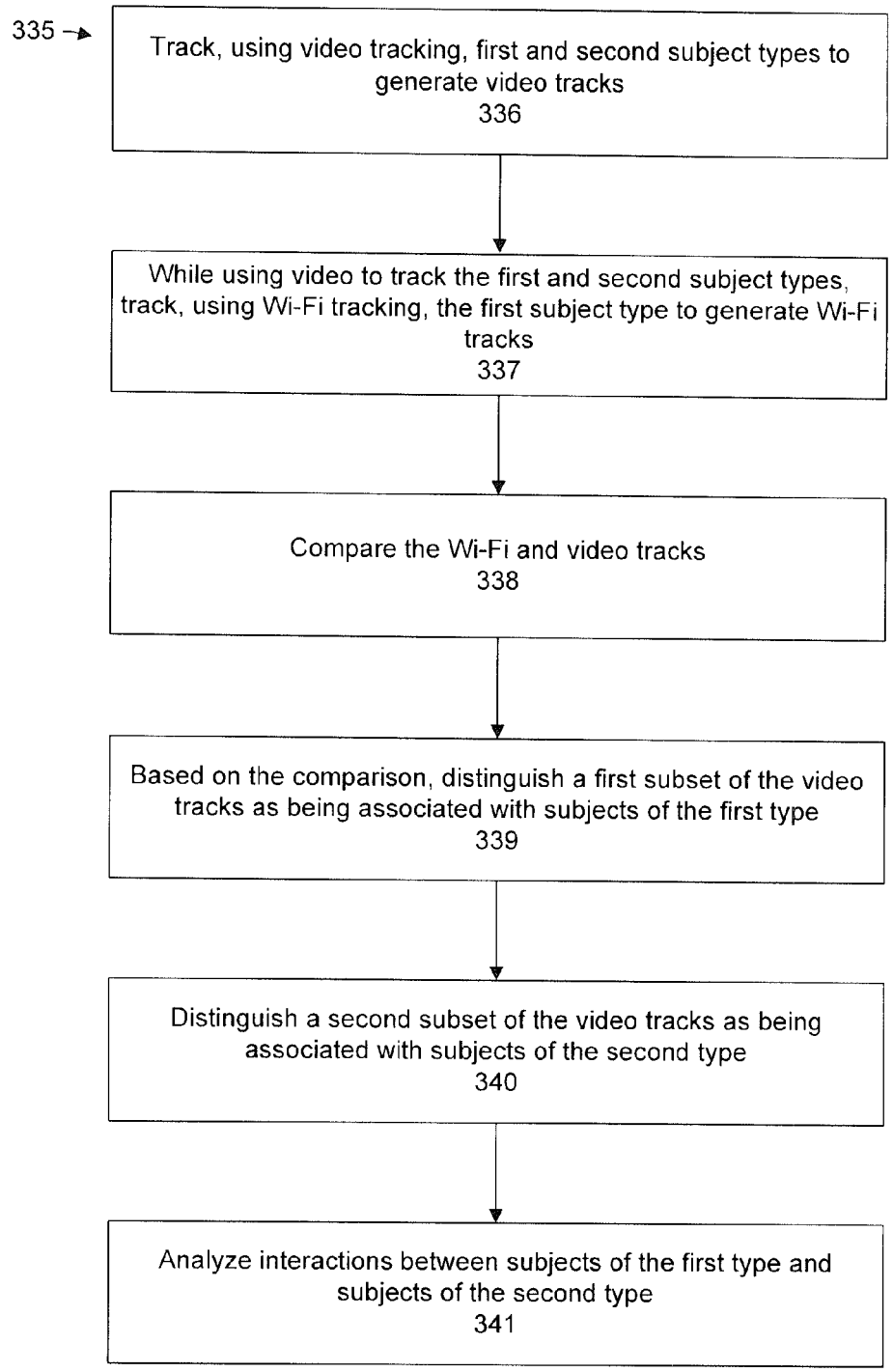
FIG. 3D shows an overall flow for interaction analysis.

FIG. 3D shows an overall flow 335 of the interaction analysis system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 336, the system tracks, using video, subjects of a first type and subjects of a second type, different from the first type to generate video tracks. The video tracks thus includes subjects of the first type and subjects of the second type. In a specific implementation, subjects of the first type are salespersons and subjects of the second type are customers. In a step 337, while the subjects of the first and second type are being tracked using video, the system tracks, using Wi-Fi, subjects of the first type to generate Wi-Fi tracks. The subjects of the first type thereby being tracked using video and Wi-Fi. The subjects of the second type are tracked via video and are not tracked via Wi-Fi.

In a step 338, the Wi-Fi tracks (representing movement paths of first type subjects) and the video tracks (representing movement paths of first and second type subjects) are compared. In a step 339, based on the comparison, the system distinguishes a first subset of the video tracks as being associated with subjects of the first type (e.g., salespersons). In a step 340, a second subset of the video tracks or video tracks outside the first subset can be associated with subjects of the second type (e.g., customers). In a step 341, upon the video tracks having been distinguished, the system can analyze interactions between subjects of the first and second type (e.g., analyze interactions between salespersons and customers).

Figure 36:
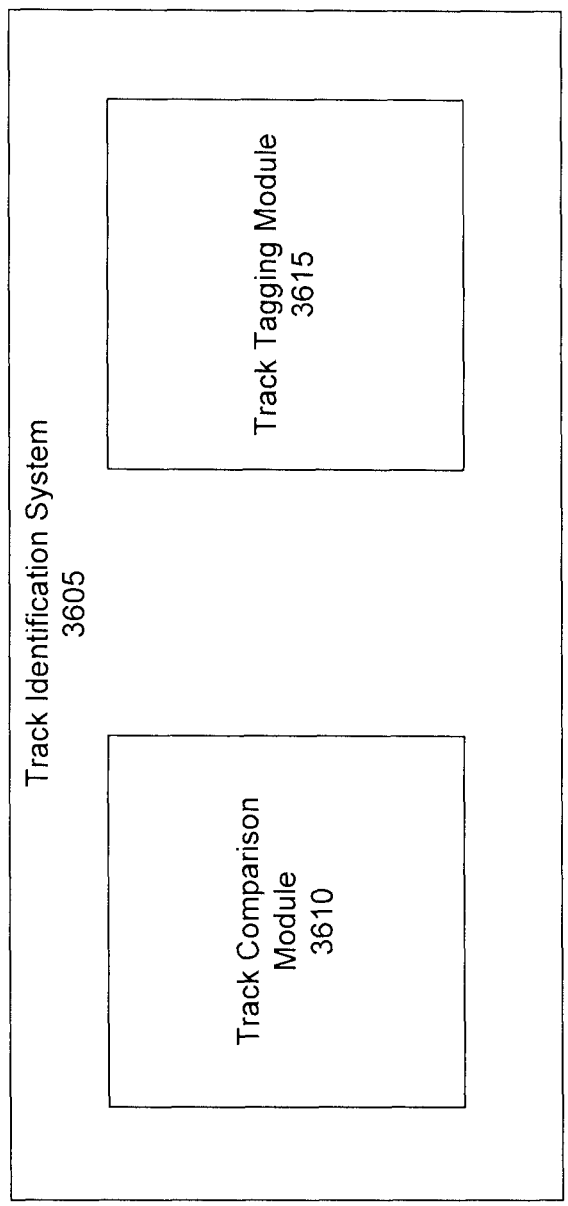
FIG. 36 shows a simplified block diagram of a system for identifying tracks.
Figure 37:
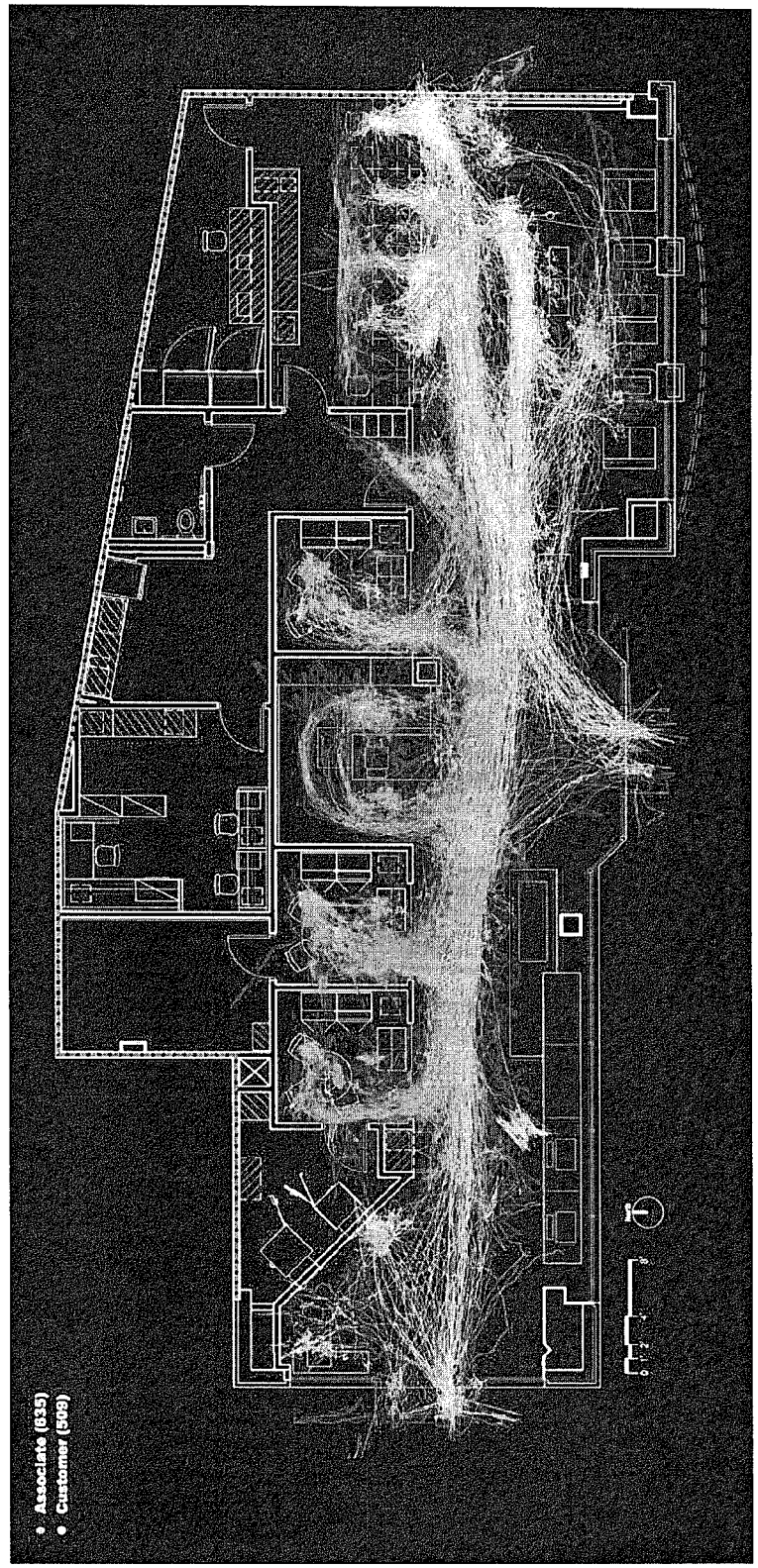
FIG. 37 shows a graphical example of the tracks having been labeled as a customer track or a sales associate track.
Figure 38:
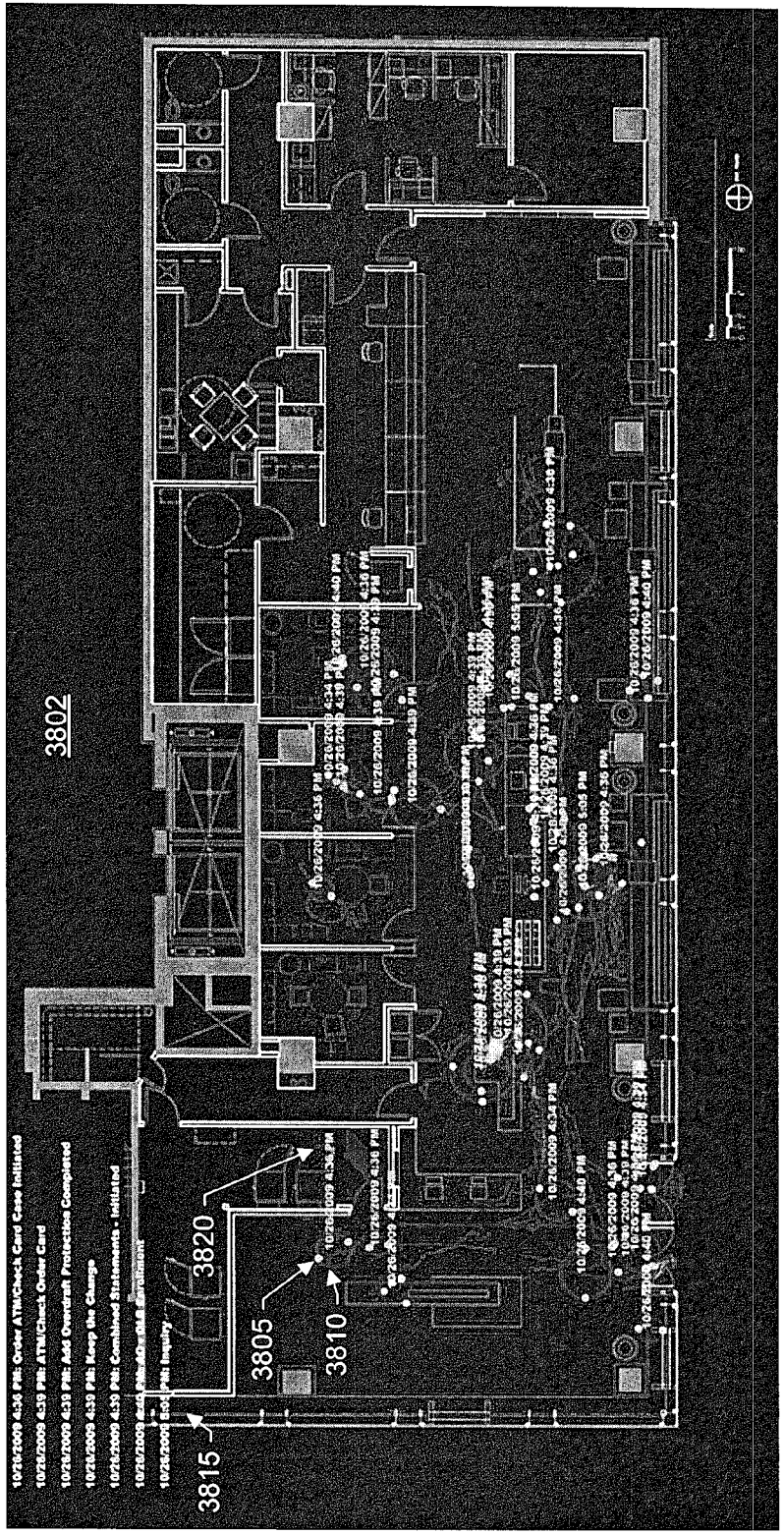
FIG. 38 shows another graphical example for analyzing interactions.
Figure 39:
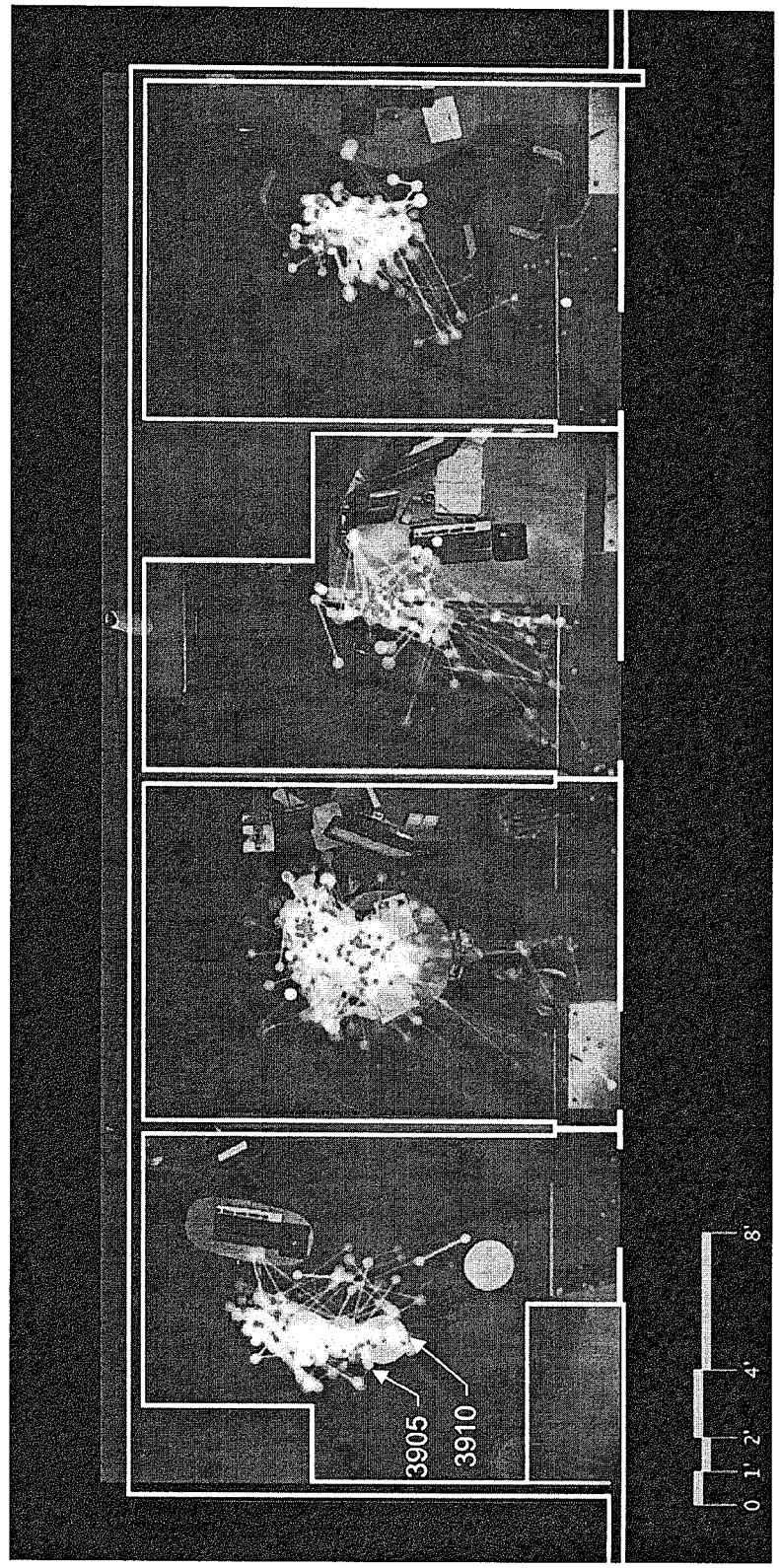
FIG. 39 shows another graphical example for analyzing interactions.

Further discussion is provided below. In particular, FIGS. 3E-26 and the discussion accompanying the figures describe techniques for video-based tracking. FIGS. 27-35 and the discussion accompanying the figures describe techniques for Wi-Fi-based tracking. FIG. 36 and the accompanying discussion describe techniques for identifying which video tracks are associated with subjects of the first type (e.g., salespersons) and which video tracks are associated with subjects of the second type (e.g., customers). FIGS. 37-39 and the accompanying discussion show examples of the data analysis that may be provided by the system.

Figure 3E:
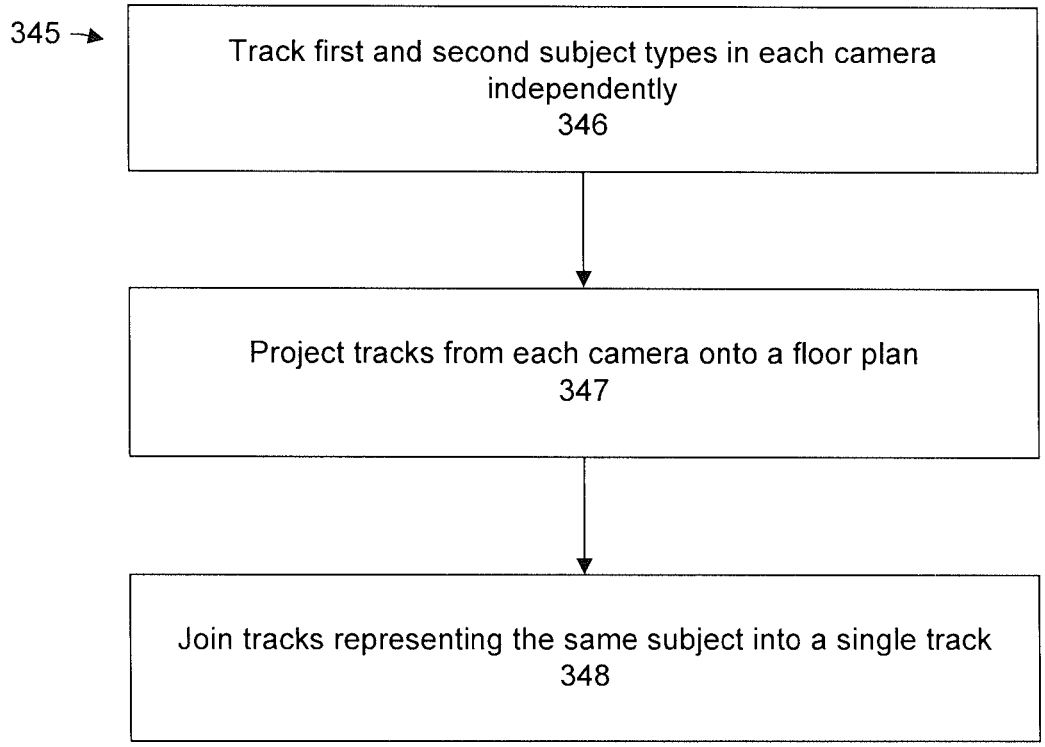
FIG. 3E shows an overall flow for video-based subject tracking.

Referring now to FIG. 3E, this figure shows an overall flow 345 for video-based tracking. In brief, in a step 346, a set of video cameras independently track subjects of the first and second types. In other words, a first video camera tracks subjects of the first type and subjects of the second type. A second video camera, operating independently of the first video camera, similarly tracks subjects of the first type and subjects of the second type. In a step 347, tracks from each camera are projected onto a floor plan of the store. In a step 348, the system joins tracks (i.e., video tracks) representing a same subject into a single video track.

Figure 3F:
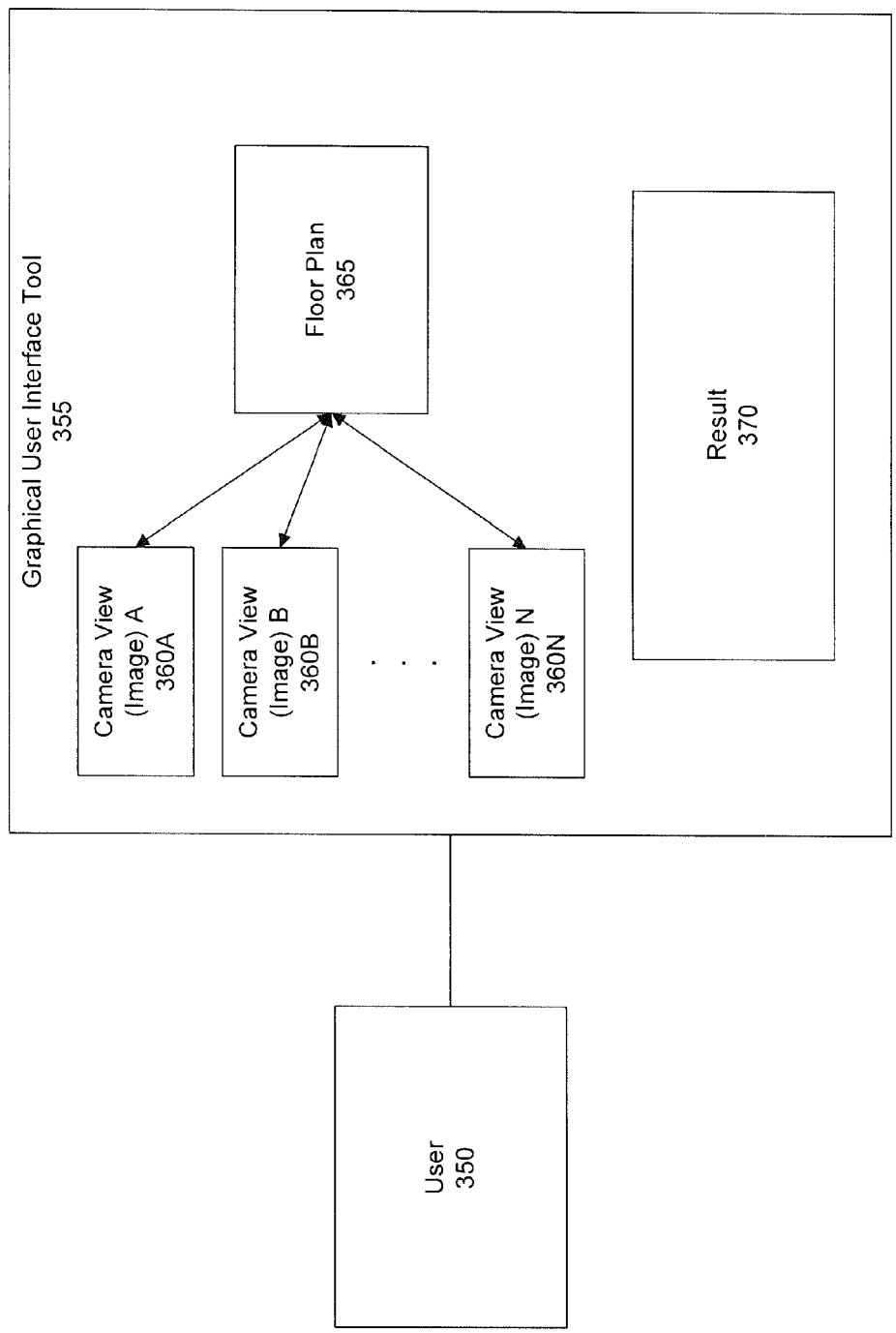
FIG. 3F shows a simplified block diagram of a tool for configuring a subject-tracking system.

FIG. 3F shows a simplified block diagram of a system for creating a model of a space for video-based tracking of subjects. There is a user 350 and a graphical user interface tool 355. The tool shows views or images 360A-360N from various cameras in the space and a floor plan 365 of the space.

In an implementation, the user uses the tool to place calibration or control points on one of the floor plan or a camera view and corresponding calibration or control points on another of the floor plan or the camera view. The system uses these point-to-point correspondences to generate a model for the view. The tool displays a result 370. The result provides the user with an indication of an ability or capability of the model to properly map a point in the camera view or image to a location on the floor plan.

If the user, upon reviewing the result, sees that there may be a problem with the model, the user can use the tool to adjust the placement of the points, add new points, remove points, or combinations of these. The system then generates or updates the model and the tool shows an updated result. Once the user is satisfied with the model, the model can be used to track subjects through the space. The tool is designed so that non-technical users can quickly and easily setup and configure a subject tracking system.

Figure 4:
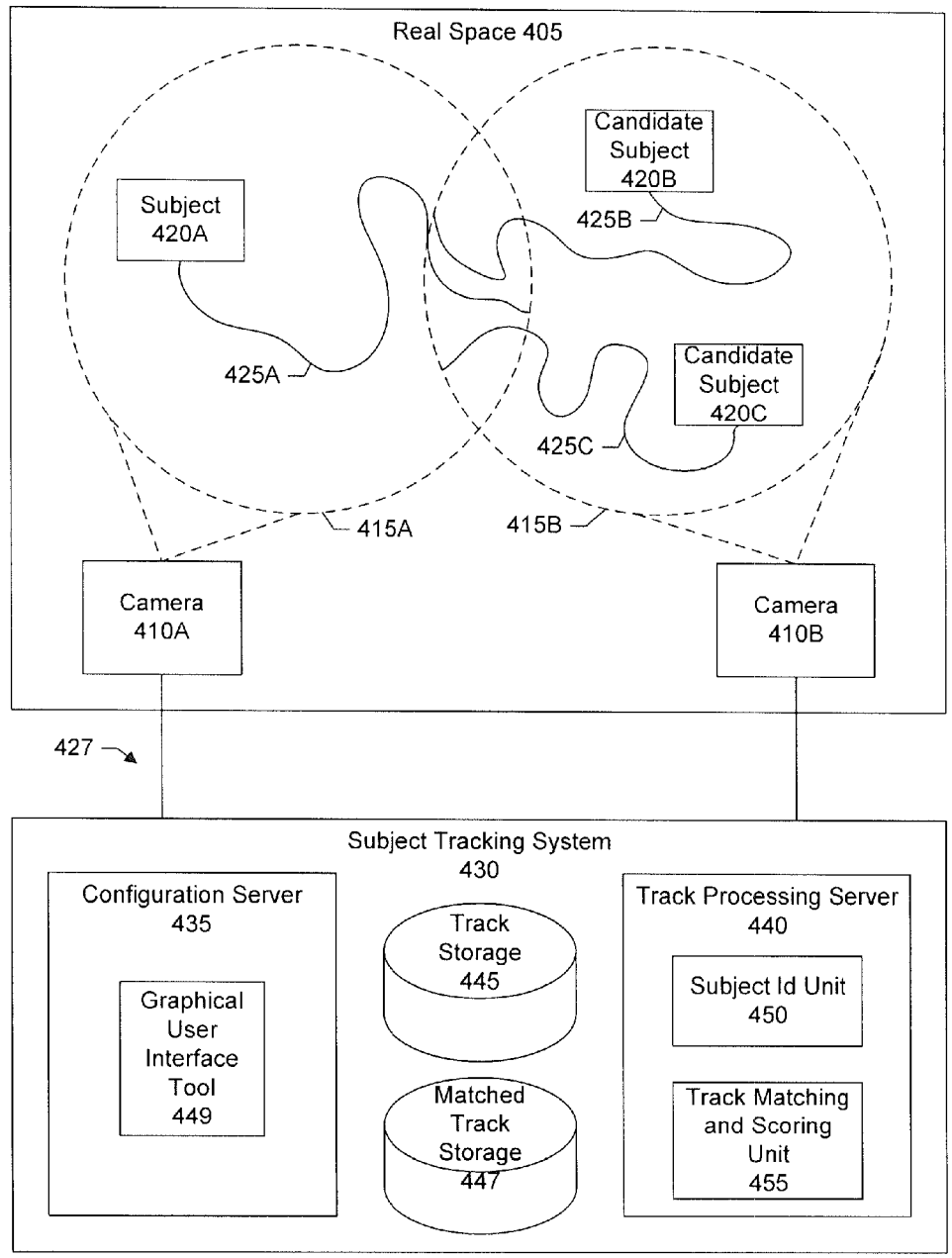
FIG. 4 shows a simplified block diagram of an environment incorporating a system for tracking subjects through a real world space.

FIG. 4 shows a simplified block diagram of an environment incorporating a system for video-based tracking of subjects through a real world physical space 405. As shown in FIG. 4, the real space 405 may include first and second cameras 410A and 410B. The first camera captures a first view 415A of a portion of the real space. The second camera captures a second view 415B of another portion of the real space. Within the real space there can be a set of subjects including a first subject 420A, a second subject 420B, and a third subject 420C. A first path 425A represents a path of the first subject moving through the real space. A second path 425B represents a path of the second subject moving through the real space. A third path 425C represents a path of the third subject moving through the real space.

The number of cameras and subjects shown in FIG. 4 is merely for purposes of example and explanation. An environment, such as a retail store, can have any number of cameras such as tens or even hundreds or more cameras. There can be a single camera. Further, at any given time the environment may have no subjects, a single subject, or multiple subjects (e.g., tens or even hundreds or more subjects).

In an embodiment, the cameras are connected through communication links 427 or a communication network to a system 430 that collects and analyzes the video feeds captured by the cameras. The system includes a configuration server 435, a track processing server 440, and storage including a database 445 for storing tracks, and a database 447 for storing matched tracks.

The communication links or network is as shown in FIG. 1 and described above. The servers include components similar to the components shown in FIG. 3A and described above. For example, a server may include a processor, memory, applications, and storage.

In a specific embodiment, the real space is a retail space (e.g., "brick and mortar" business) and the subjects are people or human beings (e.g., customers or shoppers) walking and browsing through the retail space. The retail space may be a grocery store, supermarket, clothing store, jewelry store, department store, discount store, warehouse store, variety store, mom-and-pop, specialty store, general store, convenience store, hardware store, pet store, toy store, or mall—just to name a few examples.

A specific implementation of the system is referred to as RetailNext from RetailNext, Inc. of San Jose, Calif. This system provides a comprehensive in-store analytics platform that pulls together the full set of information for retailers to make intelligent business decisions about their retail locations and visualizes it in a variety of automatic, intuitive views to help retailers find those key lessons to improve the stores. The system provides the ability to connect traffic, dwell times, and other shopper behaviors to actual sales at the register. Users can view heat maps of visitor traffic, measure traffic over time in the stores or areas of the stores, and connect visitors and sales to specific outside events. The system can provide micro-level conversion information for areas like departments, aisles, and specific displays, to make directly actionable in-store measurement and analysis.

The cameras can be any type of camera capable of motion picture acquisition. The real time images captured by the camera may be recorded to a storage device for processing. The camera may feed real time images directly to a screen for immediate observation. The camera may be part of a closed-circuit television ("CCTV") system and may include features such as pan, tilt, and zoom ("PTZ") for security, surveillance, and monitoring purposes.

Some examples of the different type of cameras that may be used with the system include bullet cameras, dome cameras, covert cameras, outdoor cameras, day/night cameras, varifocal cameras, network/IP cameras, wireless cameras, PTZ cameras, speed domes, high-definition cameras, infrared cameras, and many others. Depending upon the type of application, the camera lens may be a fisheye lens, normal lens, a fixed focal-manual iris, fixed iris-manual focus, varifocal, a motorized zoom lens, or a pinhole lens. For example, auto iris lenses are designed for outdoor use, or applications with variable lighting conditions. Fixed lenses provide fixed focal lengths from super wide angle to telephoto depending on the camera format and intended application. Varifocal lenses are designed to meet a variety of applications, providing the flexibility to adjust between different focal lengths with a single lens. The size of a fixed lens may range from about 2.8 millimeters ("mm") to about 16 mm. The larger the size of the lens, the more narrow and zoomed in the field of view is. A 3.6 mm fixed lens can provide about a 72 degree field of view. A 6 mm fixed lens can provide about a 43 degree field of view. A 12 mm fixed lens can provide about a 22 degree field of view. A 16 mm fixed lens can provide about a 19 degree field of view.

A feature of the system includes an ability to generate a model of a space for subject tracking using any type of existing camera system that may be in place. This helps to lower installation costs because new system-specific cameras do not have to be installed. The system can be used in cases where two or more cameras are from different manufacturers, have different camera lenses, have different camera lens sizes, have different camera viewing angles, are of different types, are of different makes, are of different models, or combinations of these. Further, it is not necessary that the camera be mounted directly overhead the space that is to be monitored. For example, a camera may be mounted at on the ceiling at an angle or on a wall. A new camera can be installed in the space. The new camera can be configured without having to reconfigure the other existing cameras.

The configuration server is responsible for receiving user input to create a mathematical model or homography of the space. The model allows the mapping of a point in the camera's view onto the floor plan and vice-versa, i.e., the mapping of a point on the floor plan into the camera's view. The configuration server includes a graphical user interface tool 449 that a user uses during the setup process to generate a model of the space captured by the cameras. The tool may be referred to as a calibration tool, setup tool, or camera-view to floor plan mapping tool. The tool allows a model of the space to be created without having to place physical calibration markers in the real space. The tool is designed to be easy to use so that non-technical users can quickly setup the system. In various specific implementations, the tool can be accessed over a network at a client computer. For example, the tool may be accessed from within a Web browser application program. The tool may be installed as an application program on the client computer.

Database 445 stores tracking information for the subjects which represent the subjects' movements through the various camera views. For example, the database may store track 425A representing first subject 420A moving through first camera view 415A, track 425B representing second subject 420B moving through second camera view 415B, and track 425C representing third subject 420C moving through second camera view 415B.

The track processing server includes a subject identification unit 450 and a track scoring and matching unit 455. The subject identification unit is responsible for identifying the tracked subject. In a specific implementation, the subjects are identified using a set of attributes that may be associated with a subject track. The set of attributes may be stored at the server as a profile of the subject.

The track scoring and matching unit is responsible for analyzing the tracks stored in database 445 and joining or matching the tracks such that a joined track represents a single subject as the subject moves through the real space from one camera to another camera. The joined tracks are stored in matched tracks database 450.

Figure 5:
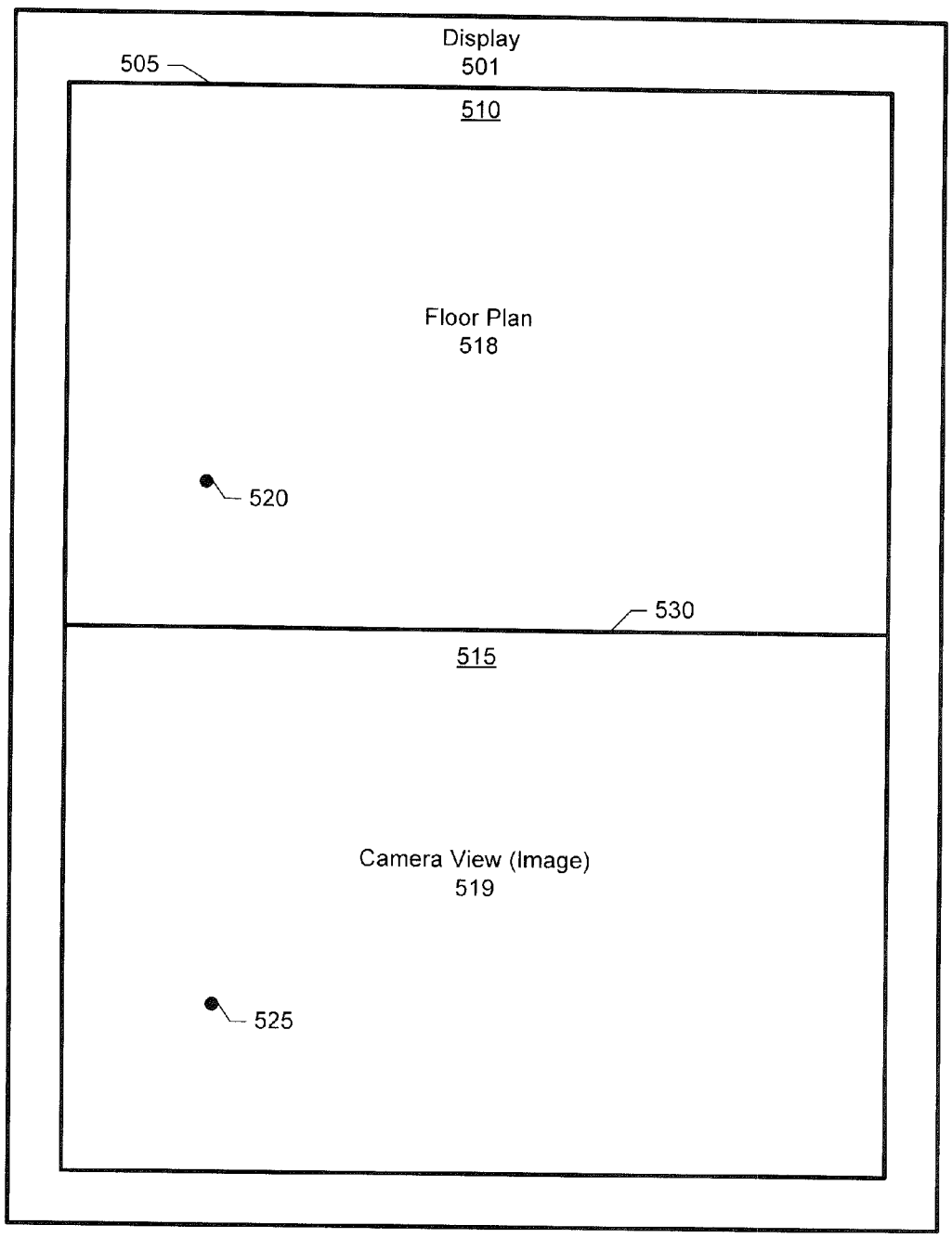
FIG. 5 shows an example of an interface of the tool having a floor plan of a space and an image capturing a portion of the space in a side-by-side vertical layout.

FIG. 5 shows a specific implementation of a graphical user interface (GUI) of the tool as shown on a computer display or screen 501. The interface includes an application window 505 provided by the tool for modeling a physical space. This application window includes a first section 510 and a second section 515. The first section shows a floor plan 518 of a real space. The second section shows an image 519 from a camera in the real space that captures at least a portion of the real space.

A floor plan is a diagram of a floor of a store, building, or room. Typically, a floor plan is drawn to scale. A floor plan can show real objects with accurate sizes that have been reduced by a certain amount (i.e., scale). For example, a floor plan having a scale of 1:10 would indicate that anything drawn with a size of "1" would have a size of "10" in the real world. The floor plan coordinates may be based on a global or world coordinate system. Examples of systems of measurements for the floor plan include the metric system (e.g., millimeters or centimeters), or US customary units (e.g., inches or feet). The floor plan may be obtained by making a survey or measurement of the real space and inputting or uploading the measurements to the system.

Figure 8:
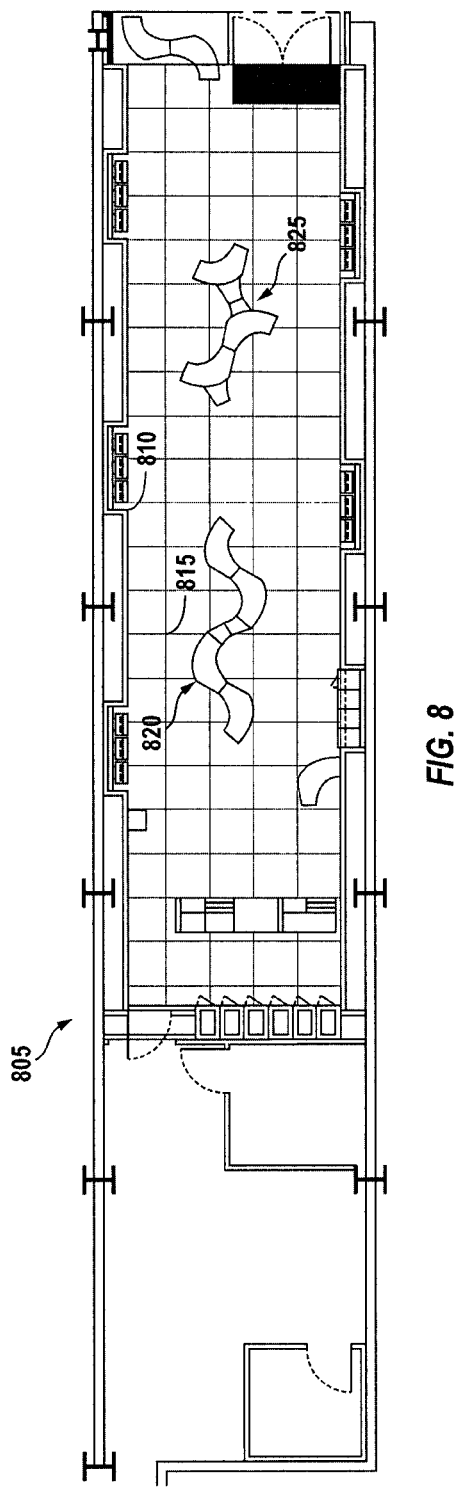
FIG. 8 shows an example of a floor plan.

FIG. 8 shows an example of a floor plan 805 that may be shown within the first section of the application window. The floor plan includes various architectural features such as a corner 810 of a floor, a corner 815 of a tile, and so forth. This example of the floor plan further includes a display case such as display cases 820 and 825.

Referring now to FIG. 5, the image may be a still or video image of at least a portion of the real space. The image is captured by a camera within the real space. For example, the camera may be mounted to a ceiling or wall in the real space.

Figure 9:
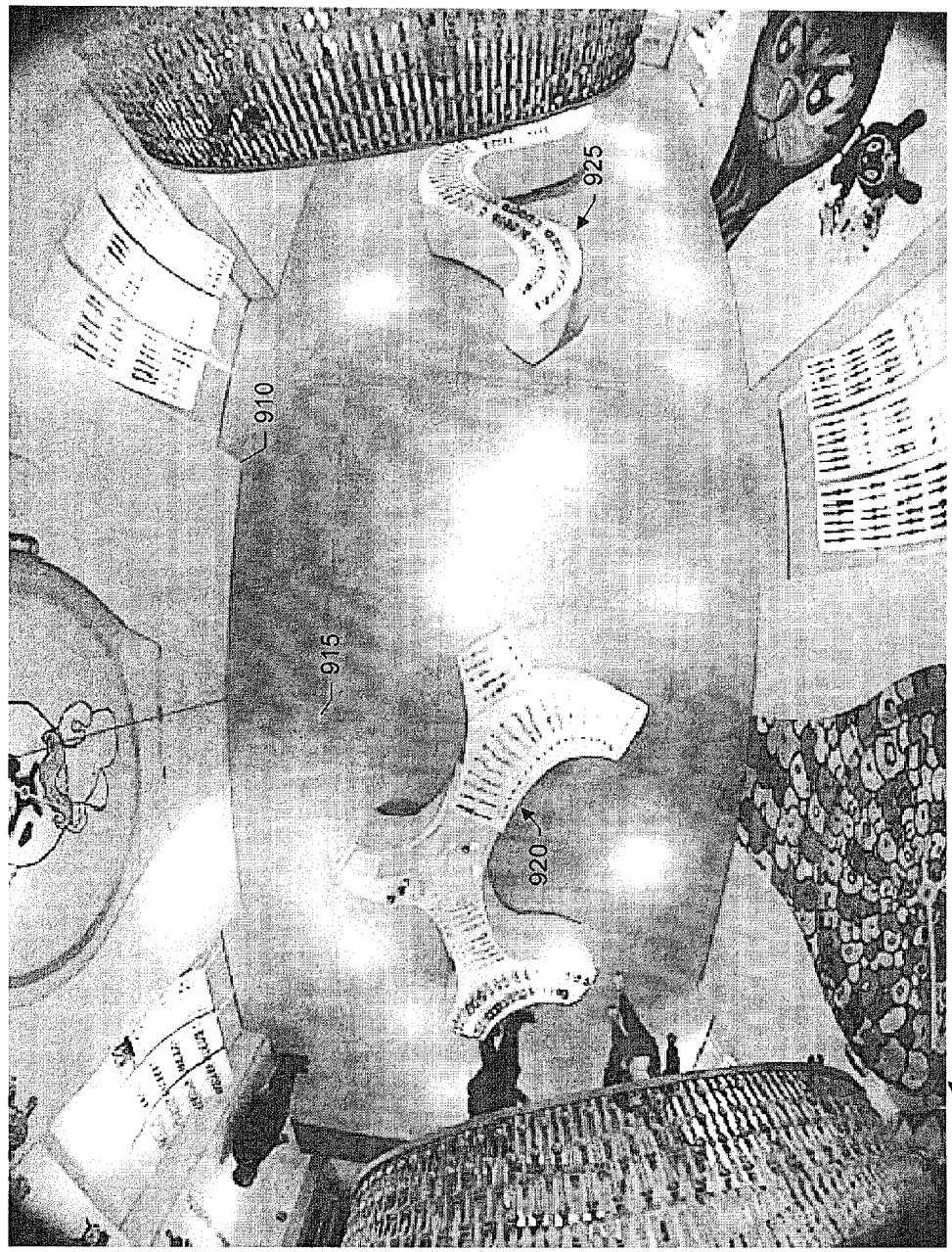
FIG. 9 shows an example of a view or image from a camera.

FIG. 9 shows an example of an image 905 that may be shown within the second section of the application window. This image is from a camera having a fisheye lens. The fisheye lens is an ultra wide-angle lens that produces strong visual distortion intended to create a wide panoramic or hemispherical image. Fisheye lenses achieve wide angles of view by forgoing producing images with straight lines of perspective (rectilinear images), opting instead for a special mapping (e.g., equisolid angle), which gives images a characteristic convex non-rectilinear appearance.

Image 905 shows a corner 910 of the floor, a corner 915 of the tile, a display case 920, and a display case 925. Corner 910 corresponds to (or is the same as) corner 810 on the floor plan (FIG. 8). Compare FIG. 8 with FIG. 9. Image 905 shows some features found on floor plan 805 as shown in FIG. 8. For example, corner 915 corresponds to corner 815 on the floor plan. Display case 920 corresponds to display case 820 on the floor plan. Display case 925 corresponds to display case 825 on the floor plan.

Referring now to FIG. 5, a user uses the tool to place, select, specify, or identify a point on the floor plan and a corresponding point on the image, or vice-versa, i.e., to place a point on the image and a corresponding point on the floor plan. The system uses these point-to-point identifications of correspondences to generate a model of the space.

More particularly, in a specific implementation, a user uses a pointing device such as mouse or other input device to place a first calibration or control point 520 over a first reference location shown on the floor plan. For example, the user can hover the mouse cursor over the first reference location and then click the mouse button to drop the first calibration or control point. In this specific implementation, after placing the first calibration point, the user places a second calibration or control point 525 on the image. The second calibration or control point is intended to correspond to the first calibration point. That is, the second calibration point is to be placed over a second reference location on the image where the first and second reference locations are to be at the same or at about the same location. Based on the placement of these calibration or control points, the system generates a model of the space captured by the camera. The system computes two-way transformation equations to map any point in the camera's view onto the floor plan and any point on the floor plan into the camera's view.

Figure 6:
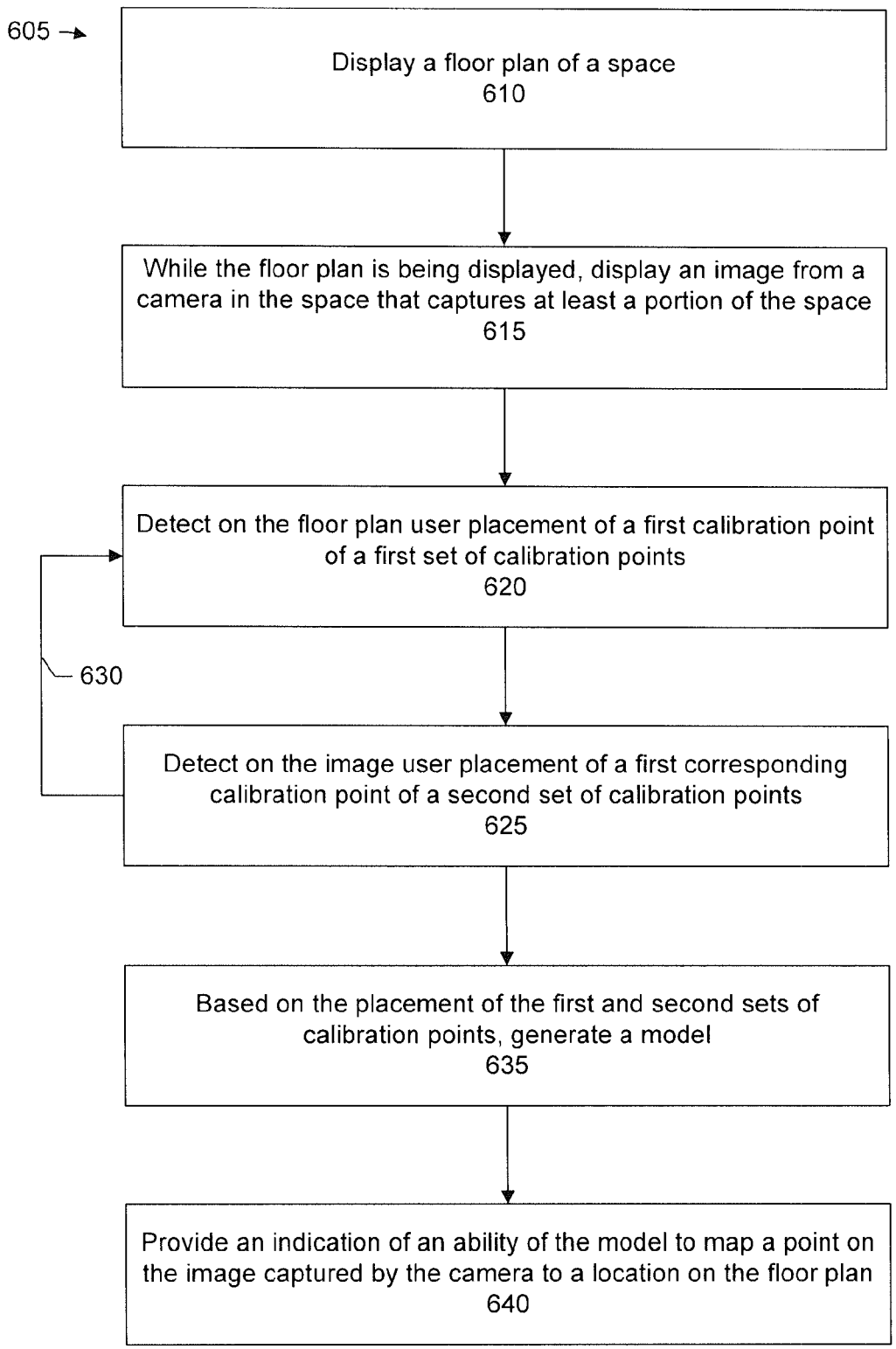
FIG. 6 shows a flow diagram for using the tool.

FIG. 6 shows an overall flow 605 for using the tool. In a step 610, the tool displays a floor plan of a space. In a step 615, while the floor plan is being displayed, the tool displays an image from a camera in the space that captures at least a portion of the space. In a specific implementation, the floor plan and the image are displayed on the screen concurrently or simultaneously. That is, during or while the displaying the floor plan of the space on the screen, the system displays the image capturing at least a portion of the space. Displaying the floor plan and image simultaneously helps the user to identifying a point on, for example, the floor plan, and a corresponding point on the image where both the point and corresponding point identify the same location. The user can remain focused on a single application window and not lose context. The user does not have to switch to different tools in order to identify the point-to-point correspondences.

In a step 620, the tool detects on the floor plan user placement or input of a first calibration point of a first set of calibration points. In a specific implementation, the system prompts the user to select or identify a reference location on the floor plan and to place the first calibration point at the reference location. The system may provide the user with some instructions or guidance on how to select the reference locations. For example, the system may advise the user to select a reference location that is on the floor or ground plane, select at least four reference locations, select at least ten reference locations, select a random or scattered distribution of reference locations (e.g., ensure that the selected reference locations do not lie on a single line or are collinear), or combinations of these. The instructions may be provided as a "Help" menu item of the tool, on a printed (e.g., paper) user manual, a video (e.g., online video tutorial), or combinations of these.

Locations can be any feature that is readily and precisely locatable in both views (e.g., floor plan view and image view). Examples include corners of the floor, architectural features such as columns, and edges of doorways. A reference location can be a stationary object. A reference location can be a non-stationary object as long as the non-stationary object can be located in the image and floor plan. For example, the image may include a movable display case. As long as the display case is represented on the floor plan and is in the same or about the same location as shown on the image, the display case can be selected as a reference location. Allowing non-stationary objects to be selected as reference locations helps with the usability of the system because in some cases architectural features such as columns, and other features on the floor may be obscured such as by a display case.

Generally, the number of reference locations needed for generating the model is dependent on factors such as the camera lens rather than the square footage of the space. To an extent, the greater the number of reference locations, the more precise the generated model. However, too many reference locations can result in "over modeling" the space. In a specific implementation, the number of reference locations selected for a camera ranges from about 4 to about 25 reference locations. This includes, for example, 5, 6, 7, 8, 9, 10, 11, 12, 13, 14, 15, 16, 17, 18, 19, 20, 21, 22, 23, 24, or more than 25 reference locations.

In a step 625, the tool detects on the image user placement of a first corresponding calibration point of a second set of calibration points. In a specific implementation, after placement of the first calibration point on the floor plan has been detected the system prompts the user to select a corresponding reference location on the image and to place the first corresponding calibration point at the corresponding reference location.

As shown by a loop 630, steps 620 and 625 may be repeated multiple times. In a specific implementation, the steps are repeated at least four times so that at least four calibration points have been placed on the floor plan and a matching number of corresponding calibration points have been placed on the image.

Figure 10:
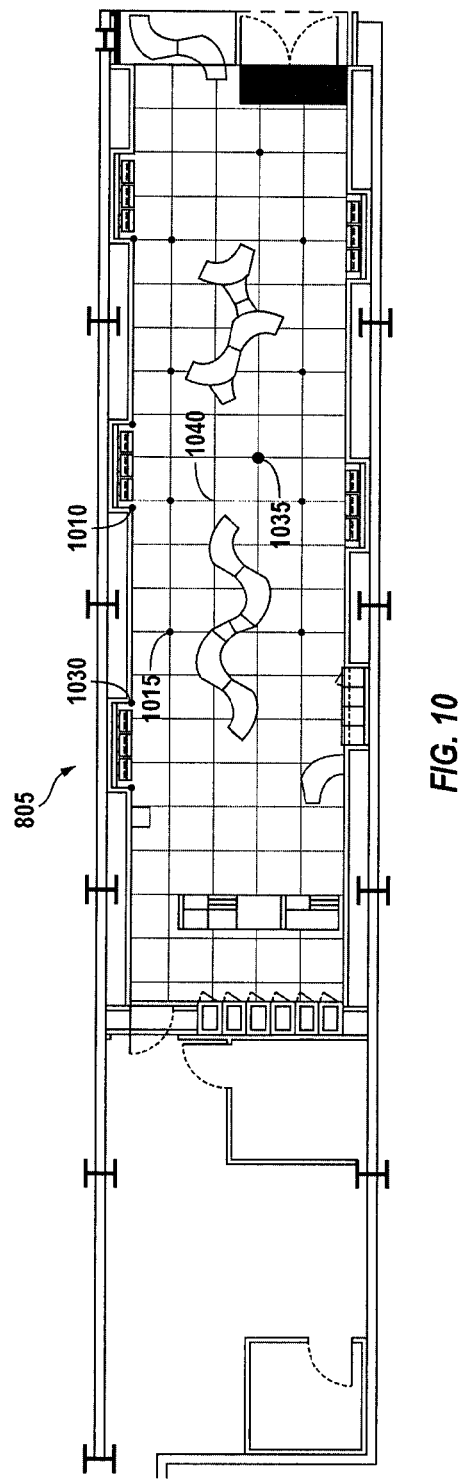
FIG. 10 shows an example of calibration or control points placed on the floor plan using the tool.
Figure 11:
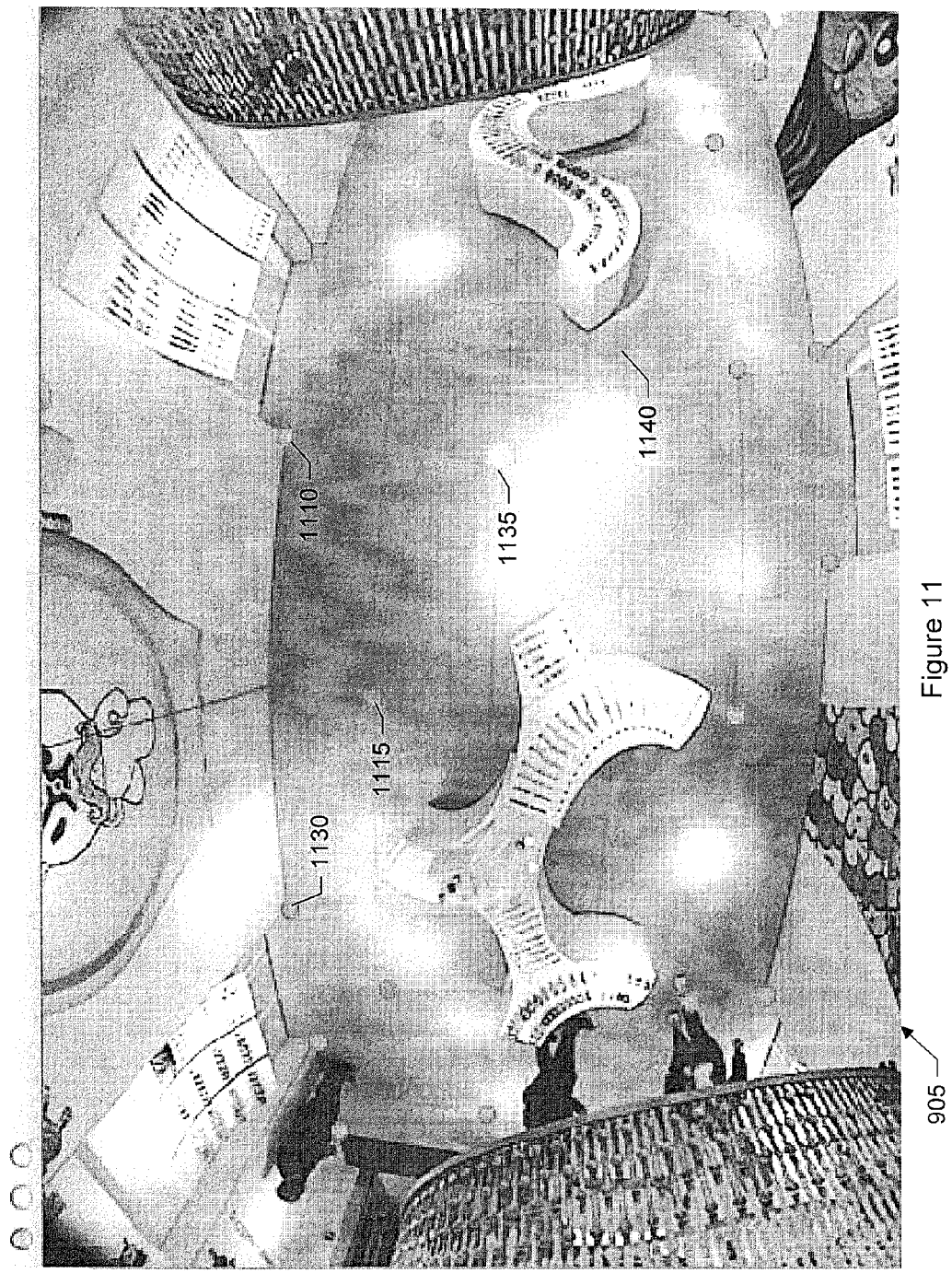
FIG. 11 shows an example of corresponding calibration or control points placed on the camera view or image using the tool.

FIGS. 10 and 11 show the calibration (or control) points and corresponding points identifying the reference locations being placed on floor plan 805 and image 905. As shown in FIG. 10, the user has used the tool to place a calibration point 1010 that identifies a reference location on the floor plan. In FIG. 11, the user has used the tool to place a corresponding calibration point 1110 on the image that identifies the same reference location as shown on the floor plan in FIG. 10 (see steps 620-630, FIG. 6).

The user repeats the process of placing points and corresponding points several times for camera each in the space. For example, FIG. 10 further shows the placement of calibration points 1015, 1030, and 1035. FIG. 11 shows the placement of calibration points 1115, 1130, and 1135. Calibration point 1015 (FIG. 10) on the floor plan is intended to correspond to (e.g., identify the same location) as calibration point 1115 (FIG. 11) on the image. Calibration point 1030 is intended correspond to calibration point 1130. Calibration point 1035 is intended to correspond to calibration point 1135.

In an implementation, the user can select a point placed on one of the image or floor plan, and the tool highlights a corresponding point that has been placed on another of the image or floor plan. This helps the user check their placement of a point pair to ensure that the point and corresponding point of the pair are identifying the same locations.

For example, upon selecting one of points 1035 (FIG. 10) or 1135 (FIG. 11), the tool highlights another of points 1035 or 1135. In this example, points 1035 and 1135 identify different reference locations. This could result in generating an inaccurate model. The reference location identified by point 1035 on the floor plan is at a location 1140 on the image. The reference location identified by point 1135 on the image is at a different location 1040 on the floor plan. The user should adjust the points so that the points identify the same reference locations. For example, the user can use the tool to move (e.g., drag and drop) point 1035 (FIG. 10) to location 1040 on the floor plan. Alternatively, the user can move point 1135 (FIG. 11) to location 1140 on the image.

Any technique or combinations of techniques may be used to highlight a selected point and its corresponding point. For example, the pair of points may be shown in a color that is different from a color of the other point pairs, in a size (e.g., area) that is different from a size of the other point pairs, or both. In a specific implementation, the pair of points is colored red and the other point pairs are colored green. In this specific implementation, the pair of points is shown in a diameter that is greater than a diameter of the other point pairs. Other highlighting techniques that may be implemented include animation (e.g., blinking or flashing), different shapes (e.g., dot or circle, triangle, square, rectangle, star, or diamond), different patterns (e.g., solid fill pattern, no fill pattern, vertical line pattern, horizontal line pattern), text (e.g., bubble pops up next to the corresponding point having the words "corresponding point"), or arrows—just to name a few examples.

Referring now to FIG. 6, in a step 635, based on the placement of the first and second sets of calibration or control points, the system generates a model of the space. In an implementation, after the user has established the calibration points for a camera, the user clicks a button or other graphical control provided by the tool to generate the model. In a step 640, upon receiving the input, the tool provides an indication of an ability of the model to map a point on the image captured by the camera to a location on the floor plan. In a specific implementation, the system provides the indication by displaying on the floor plan, image, or both a set of coverage markers.

Figure 12:
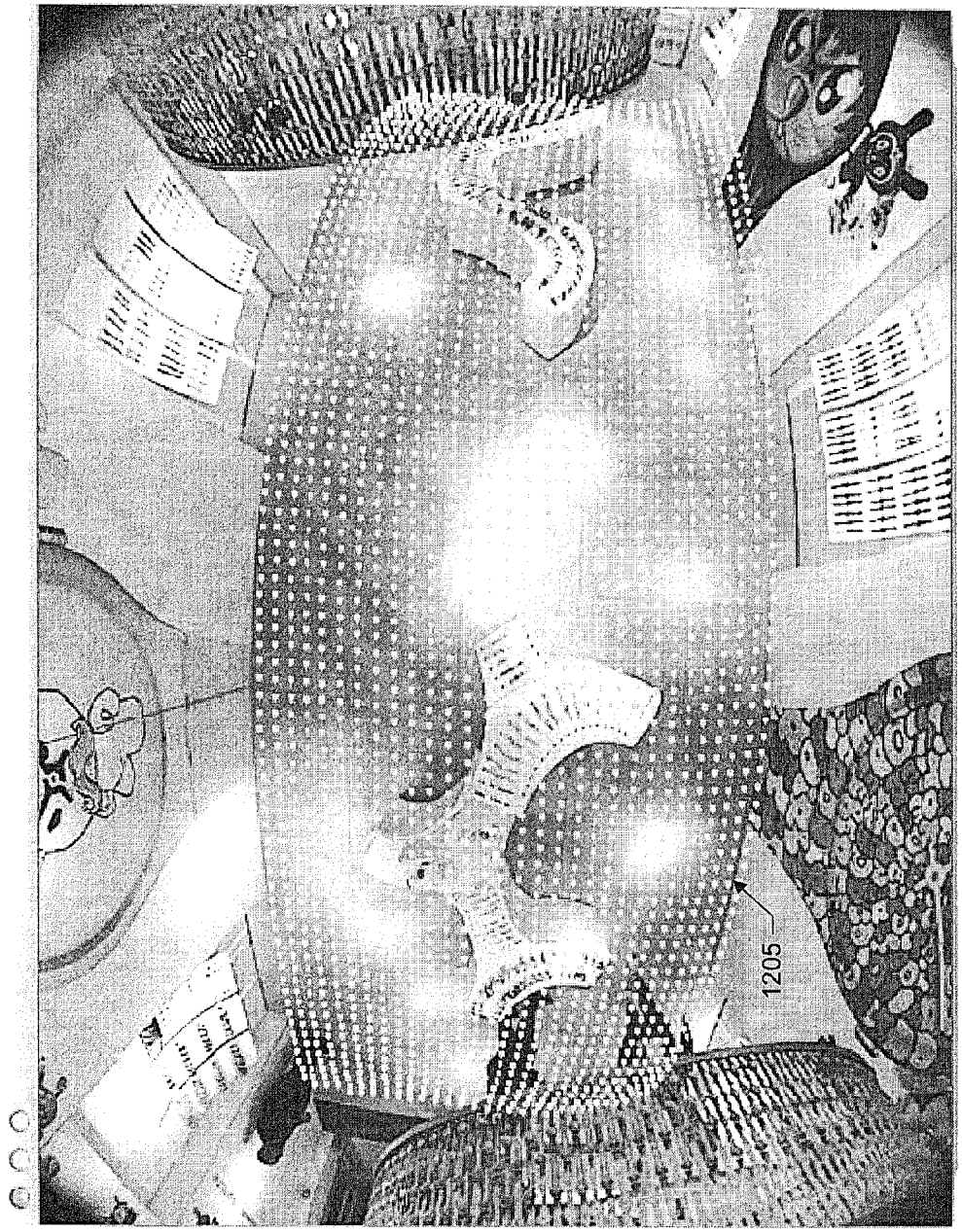
FIG. 12 shows an example of a good distribution of coverage markers on the camera image.
Figure 13:
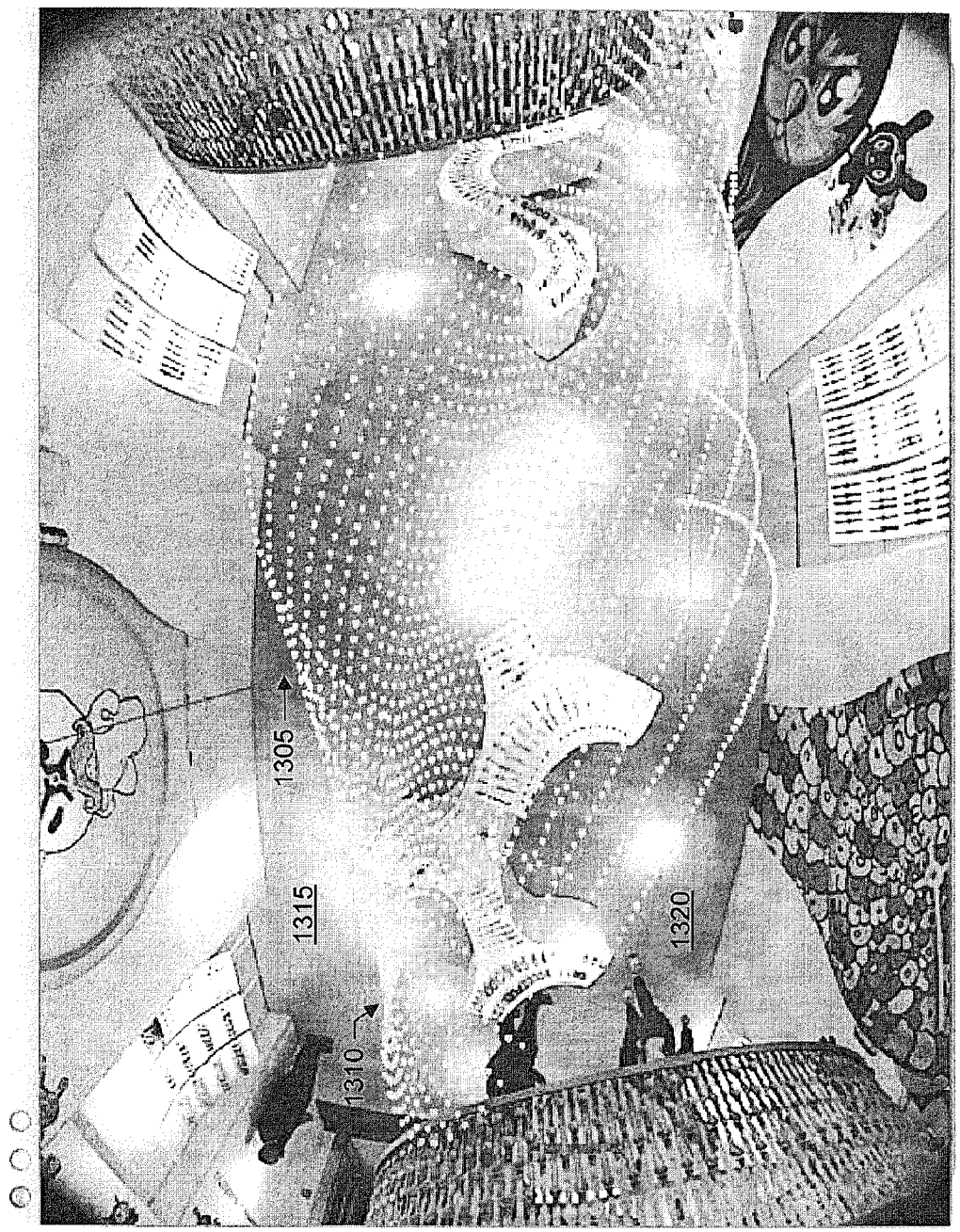
FIG. 13 shows an example of a poor distribution of coverage markers on the camera image.

FIGS. 12 and 13 show the coverage markers being displayed on the image. FIG. 12 shows an example of a good distribution of coverage markers 1205. This distribution indicates that the generated model will be able to accurately map a point on the image to its proper location on the floor plan. FIG. 13 shows an example of a poor distribution of coverage markers 1305. This distribution indicates that the generated model will not be able to accurately map the point on the image to its location on the floor plan.

Compare the distribution of coverage markers shown in FIGS. 12 and 13. The distribution in FIG. 12 is different from the distribution in FIG. 13. In FIG. 13, the distribution includes a twist or swirl 1310 as if the coverage markers are folding over themselves. There are several large portions (e.g., portions 1315 and 1320) that are missing or are without coverage markers. The coverage markers appear distorted and do not follow a grid.

In contrast, in FIG. 12 the distribution does not have the twist shown in FIG. 13. The coverage markers do not appear to be folding over themselves. Further, there are no large portions of image that are missing coverage markers. Rather, the coverage markers are spread out across the floor.

Figure 14:
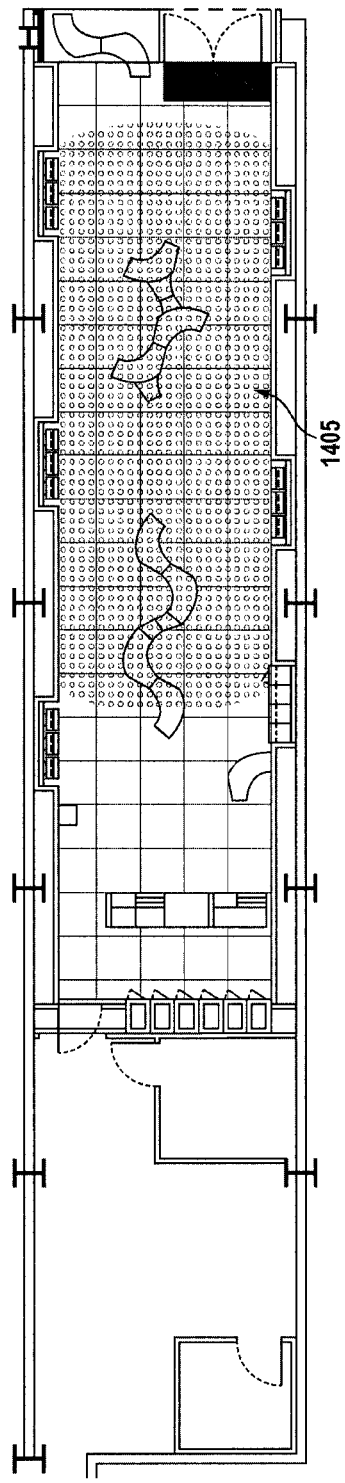
FIG. 14 shows an example of a good distribution of coverage markers on the floor plan.

The distribution has a convex non-rectilinear appearance as would be expected when viewing an even or uniform distribution grid of coverage markers through a camera having a fisheye lens. For example, FIG. 14 shows a top undistorted view of a good distribution of coverage markers 1405 over an area of the floor plan captured by the view of the camera. When distribution 1405 is viewed through the fisheye camera lens in this example, one would expect the appearance to be as shown in FIG. 12.

In an implementation, the user reviews, evaluates, or assesses the distribution using a holistic approach. The user may imagine that each coverage marker is locatable in both views (i.e., each coverage marker is treated as a calibration point). The user can then determine if the locations of all markers in one view correspond correctly to the locations in the other view. This imagined correspondence happens from the floor plan view (where locations are in a straightforward grid) to the camera view (where locations may become twisted, skewed, or otherwise distorted when the model fit is poor).

The user can review the distribution of coverage markers shown on the screen to determine whether or not the model will be able to properly map a point in the camera image to a location on the floor plan. If the distribution includes characteristics similar to that shown in FIG. 12, the user can conclude that the model is able to properly perform the mapping. If the distribution includes characteristics similar to that shown in FIG. 13, the user can conclude that the model will not be able to properly perform the mapping. This real time or near-real time visual feedback of the model makes it easy for the user to know whether they can move forward with the model or whether adjustments should be made. The user does not have to interpret a complex set of equations or output. Rather, with the tool, the user can simply place sets of points and corresponding points, press a button, and view the graphical results.

If the result is a distribution similar to that shown in FIG. 13, the user can use the tool to make adjustments. The system generates a new model and shows a new distribution of coverage markers that indicate an ability of the new model to map points between the image and floor plan. The user can review the new distribution. If the new distribution is not satisfactory, the user can quickly make more adjustments and iterate. Adjustments may include, for example, moving a point on the image, moving a point on the floor plan, adding a point on the image, adding a point on the floor plan, removing or deleting a point on the image, removing a point on the floor plan, or combinations of these.

For example, upon reviewing the result and seeing a distribution having a twist (e.g., FIG. 13), the user can go back and check the placement of the points and corresponding points. As discussed above, the user may discover that point 1035 (FIG. 10) and corresponding point 1135 (FIG. 11) identify different locations. The user can use the tool to move one or both points (e.g., adjust or move their on-screen positions) so that they identify the same or about the same locations. The user may, for example, move a point on one of the image or floor plan to the left, right, up, down, or diagonally across the screen so that it matches the location identified by the corresponding point on another of the image or floor plan. Instead or additionally, the user may add an additional point to one of the image or floor plan and add an additional corresponding point to another of the image or floor plan.

The system is designed to tolerate some imprecision in the placement of the points. The tolerance may range from about 1 centimeter to about 10 centimeters, including less than 1 centimeter or more than 10 centimeters. Thus, the user does not have to be exact about the placement of a point on one of the image or floor plan and the placement of a corresponding point on another of the image or floor plan.

In the examples shown in FIGS. 12 and 13, the coverage markers have the shape of a circle or dot. It should be appreciated, however, that a coverage marker can have any shape such as a square, rectangle, triangle, diamond, and so forth. The coverage markers may as appear as a grid or mesh superimposed over the floor plan, image, or both. The coverage markers shown in FIGS. 12 and 13 are examples of a graphical visual indication. In other implementations, the indication may instead or additionally include text (e.g., "Model is good," or "Model may not be accurate"), audio (e.g., beeps), and so forth.

In an implementation, a user performs the calibration or setup flow shown in FIG. 6 for each camera in the space. In an implementation, the system generates per-camera models in real time (i.e., the model is updated after every new point is placed or after a point is moved or edited). These model updates happen transparently to the user, so that the coverage markers can be displayed at any time.

Figure 15:
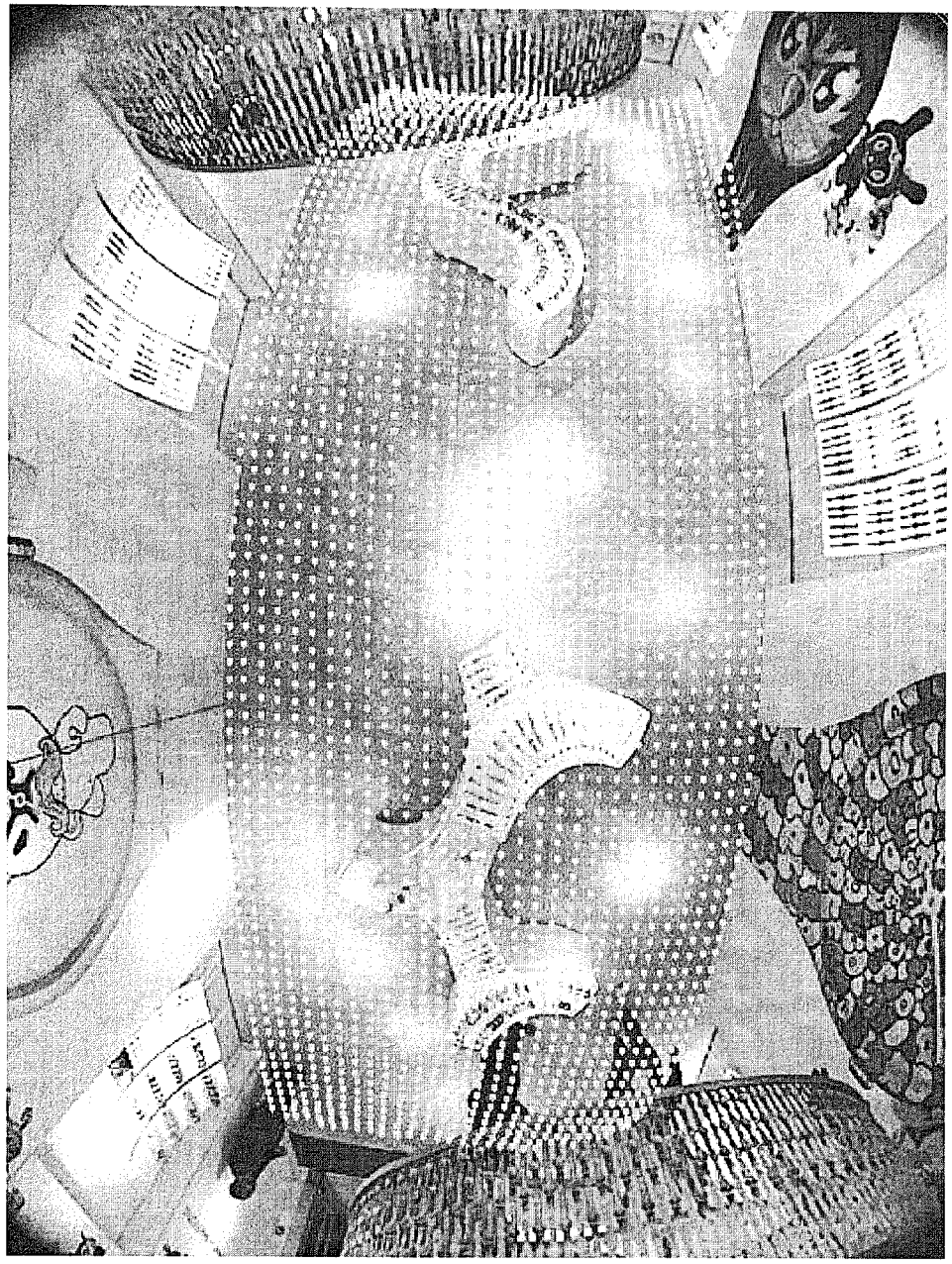
FIG. 15 shows an example of coverage markers on a camera image resulting from a polynomial transform.
Figure 16:
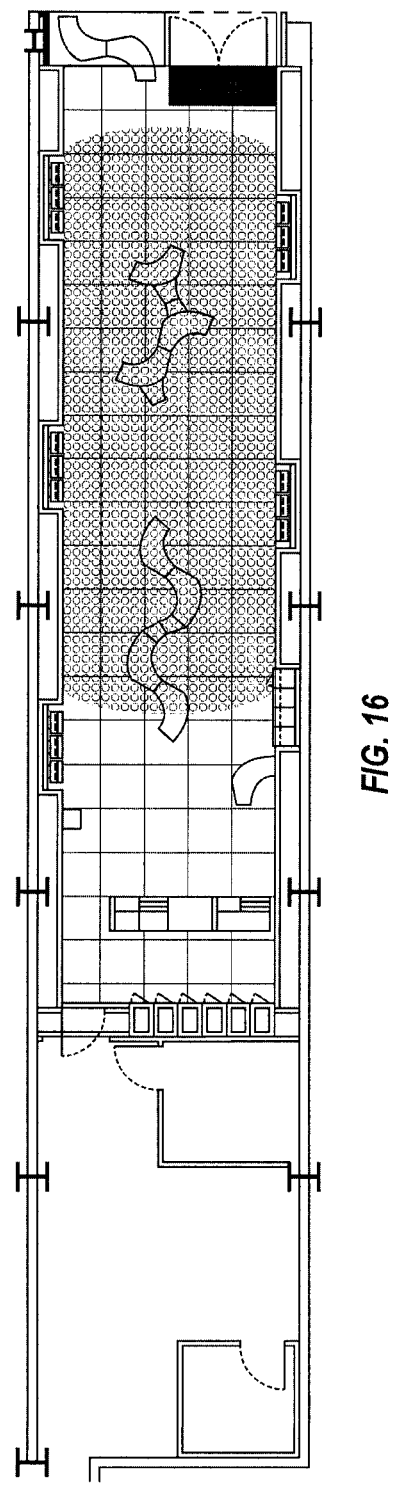
FIG. 16 shows an example of coverage markers on a floor plan resulting from the polynomial transform.
Figure 17:
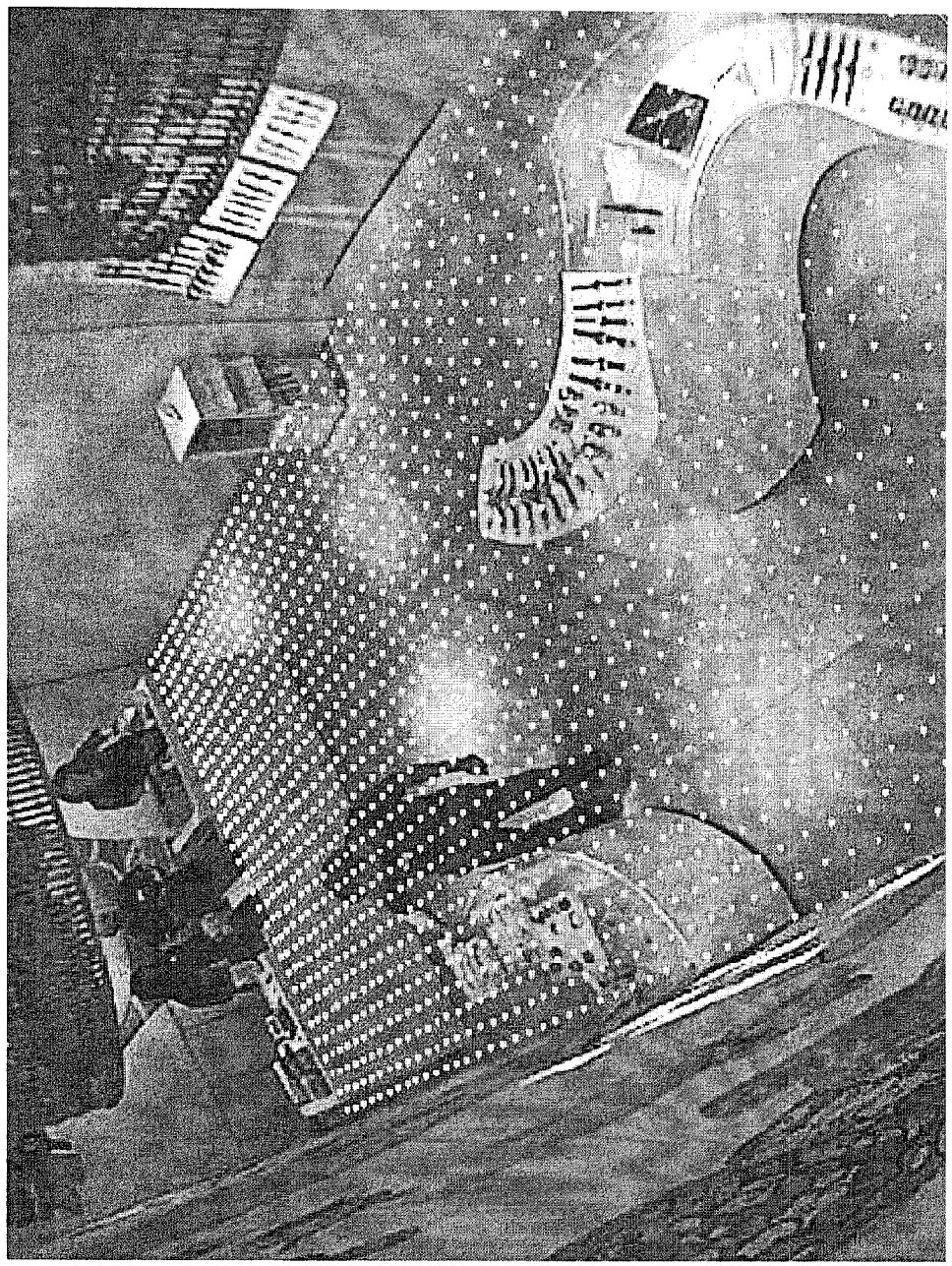
FIG. 17 shows an example of coverage markers on a camera image resulting from a projective transform.
Figure 18:
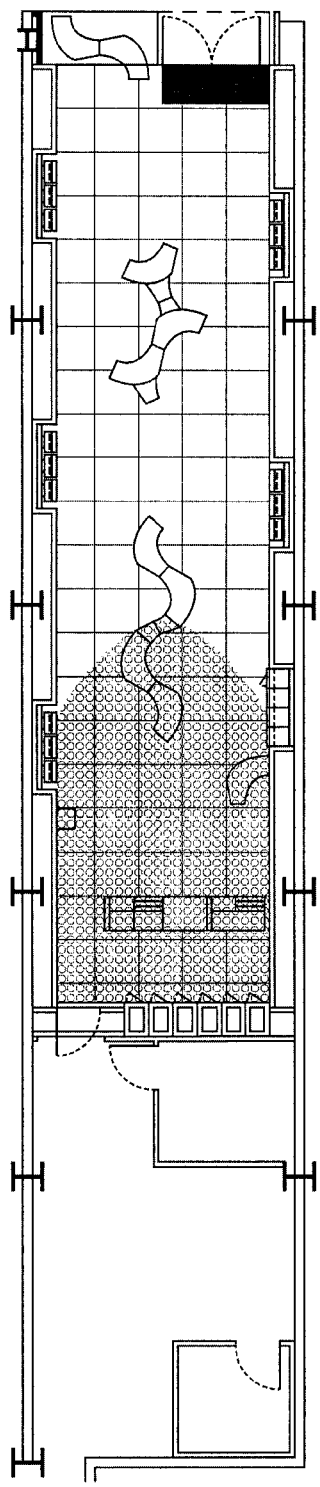
FIG. 18 shows an example of coverage markers on a floor plan resulting from the projective transform.

FIGS. 15 and 16 show a distribution result of using a polynomial transformation between the pairs of calibration points. FIGS. 17 and 18 show a distribution result of using a projective transformation between the pairs of calibration points. As discussed above, the transformation type can be based on the number of calibration points specified, input from the user after viewing the transformation results, type of camera lens, or combinations of these. A polynomial transformation may be used with a camera having a fisheye lens (see FIG. 15). A projective transformation may be used with a camera having a normal lens (see FIG. 17). In a specific implementation, the user indicates whether to use a polynomial or projective transformation type. In another specific implementation, the system automatically selects the transformation type to use.

Table A below shows the formula for a projective transform.

TABLE A

For a point p = [x, y] in camera-space we compute a point p' = [x', y'] in real-space via: p' = $T\bar{u}$ Where $T = \begin{pmatrix} t_{1,1} & t_{1,2} \\ t_{2,1} & t_{2,2} \\ t_{3,1} & t_{3,2} \end{pmatrix}$ And $\bar{u}$ = [x y 1]

Given a set of known corresponding $p_i \in P$ and $p'_i \in P'$, we perform a total least squares optimization to find T.

Table B below shows a formula for a polynomial transform.

TABLE B

For a point p = [x, y] in camera-space we compute a point p' = [x', y'] in real-space via: p' = $T\bar{u}$ Where $T = \begin{pmatrix} t_{1,1} & t_{1,2} \\ t_{2,1} & t_{2,2} \\ t_{3,1} & t_{3,2} \\ t_{4,1} & t_{4,2} \\ t_{5,1} & t_{5,2} \\ t_{6,1} & t_{6,2} \\ t_{7,1} & t_{7,2} \\ t_{8,1} & t_{8,2} \\ t_{9,1} & t_{9,2} \\ t_{10,1} & t_{10,2} \end{pmatrix}$ And $\bar{u}$ = [1 x y xy $x^2$ $y^2$ $yx^2$ $xy^2$ $x^3$ $y^3$]

Given a set of known corresponding $p_i \in P$ and $p'_i \in P'$, we perform a total least squares optimization via Singular Value Decomposition (SVD) to find T.

Referring now to FIG. 6, steps 620 and 625 describe a specific implementation of a flow where a user places a calibration or control point on the floor plan and, after placing the calibration point on the floor plan, places a corresponding calibration or control point on the image. In another specific implementation, the steps may be swapped. In this specific implementation, the user may place a calibration or control point on the image and, after placing the calibration point on the image, the user may place a corresponding calibration or control point on the floor plan. The system can accommodate users who prefer to place a point on the image first followed by placing the corresponding point on the floor plan—and users who prefer the opposite, i.e., placing a point on the floor plan first followed by placing the corresponding point on the image.

In another specific implementation, the user may place two or more calibration or control points on one of the image or floor plan, before placing the same number of calibration or control points on the other of the image or floor plan. For example, some users may prefer to not alternate between placing a calibration point on the floor plan and a corresponding calibration point on the image. In this specific implementation, the system allows the user to place two or more calibration points on, for example, the floor plan. After placing the two or more calibration points on the floor plan, the user may place a same number of corresponding calibration points on the image.

The system may highlight a calibration point to indicate that it is active so that the user can identify where a corresponding calibration point should be placed. For example, after the user places two or more calibration points on the floor plan, the system may highlight one of the two or more calibration points on the floor plan to indicate that the system is ready to detect on the image the calibration point that will correspond to the one highlighted calibration point on the floor plan.

The highlighting helps to inform the user that the next calibration point to be placed on the image will be identified by the system as the calibration point corresponding to the one highlighted calibration point. Thus, when the user places the calibration point on the image, the system will establish a correspondence between a reference location identified by the one highlighted calibration point and a corresponding reference location identified by the just placed calibration point. The highlighting may include flashing, blinking, animation, color, an arrow, or any other visual indication that allows a user to distinguish between a currently active calibration point and a currently inactive calibration point.

Referring now to FIG. 5, within the graphical user interface provided by the tool, a section may be referred to as a panel or region. These sections can be implemented as window panes that can be resized by the user (e.g., drag pane border to resize pane). Alternatively, the sections may be implemented as separate windows within the application window. For example, the windows may be floating windows that can be independently repositioned and resized within the application window (e.g., drag window via window title bar to reposition, or drag window corner to resize). This feature allows the user to reposition and resize the windows according to their preference.

As shown in the example of FIG. 5, the sections are arranged in a side-by-side layout. More particularly, in this example, the sections are arranged in a vertical side-by-side layout. The first section is above the second section. The second section is below the first section. There is a shared border 530 between the two sections. The first section is above the shared border. The second section is below the shared border. The side-by-side arrangement makes it easy for the user to identify a point on, for example, the floor plan, and a corresponding point on the image where both the point and corresponding point identify the same location. For example, the user can remain focused on the application window and not lose context because the application window can display both the floor plan of the space and the image or camera view of at least a portion of the space.

Figure 7:
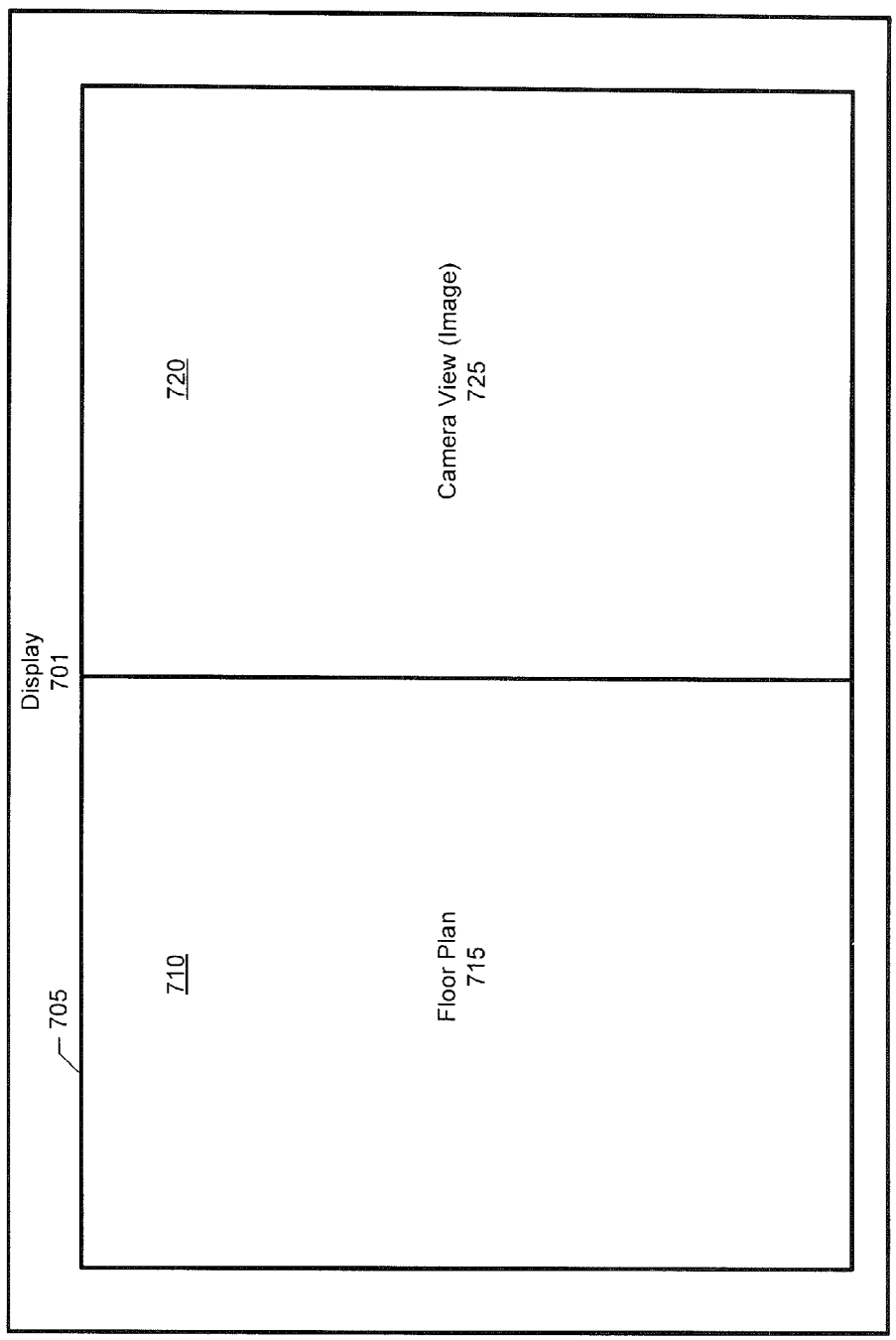
FIG. 7 shows a floor plan and image in a side-by-side horizontal layout.

FIG. 7 shows a computer screen 701 displaying an application window 705 having a first section 710 displaying a floor plan 715 of a space, and a second section 720 displaying an image 725 of at least a portion of the space as captured by a camera in the space. The information being displayed in application window 705 is similar to the information being displayed in application window 505 (FIG. 5). In application window 705, however, the layout or arrangement of the sections is a horizontal side-by-side layout. In other words, first section 710 is to the left or is on a left-hand side of second section 720. Second section 720 is to the right or is on a right-hand side of first section 710.

In a specific implementation, the system allows the user to choose whether they would like a horizontal side-by-side layout (FIG. 7) or a vertical side-by-side layout (FIG. 5). This is beneficial because different users may have different preferences on how they would like to see the information. The layout in FIG. 5 may be referred to as a portrait layout. The layout in FIG. 7 may be referred to as a landscape layout.

Figure 19A:
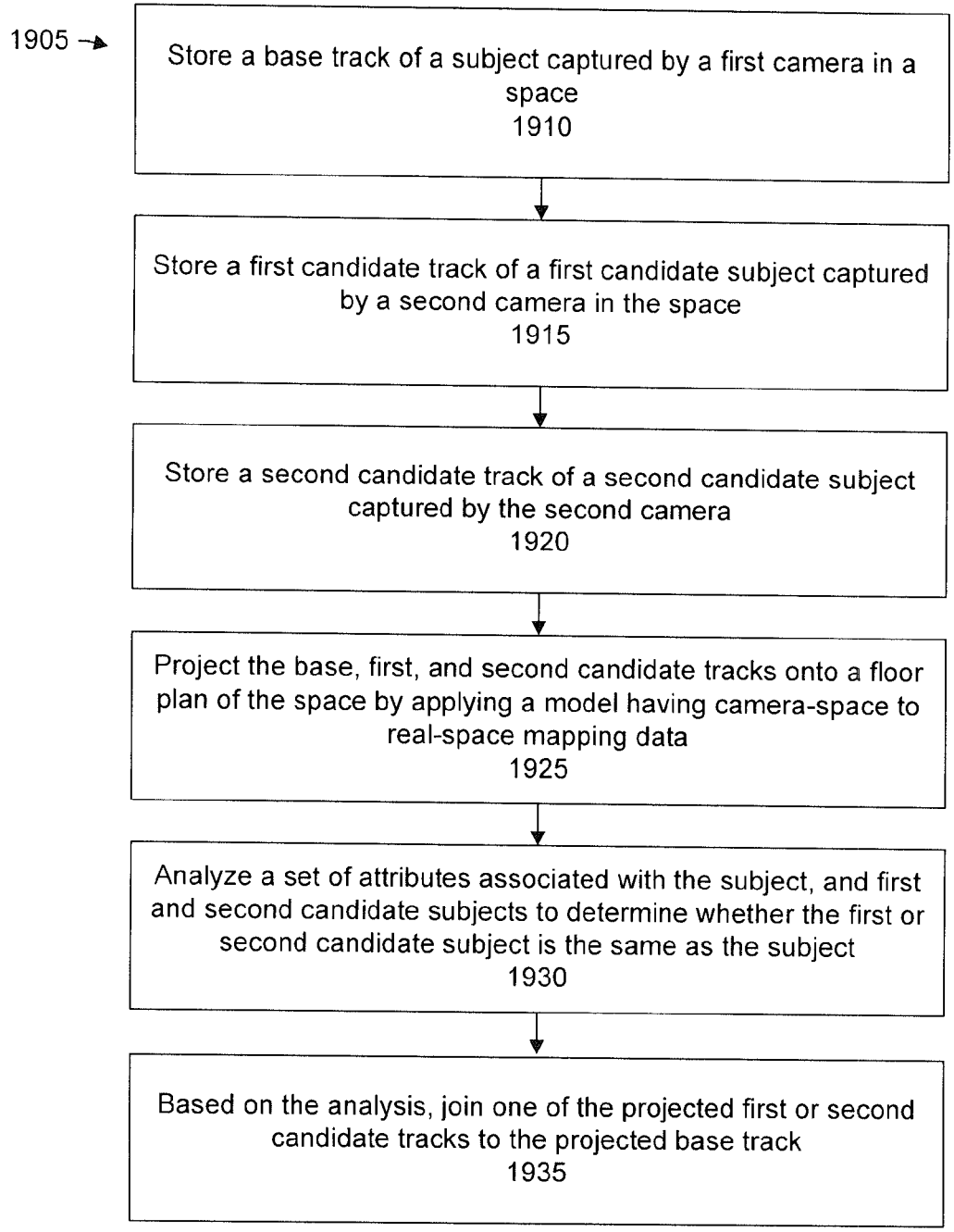
FIG. 19A shows an overall flow diagram for matching subject tracks.

FIG. 19A shows an overall flow 1905 for track matching. As discussed, in a specific implementation, within the view of each camera, subjects are tracked using various vision algorithms. The output of running these algorithms on a video stream are coordinates (in camera space) representing the locations of people in each frame of video. Additionally, the algorithms store shape (e.g., width and height), and color information for each tracked person.

In this specific implementation, with the projections derived above for each camera together with the output of person tracking from that camera, the system proceeds to project each individual track into real space. In doing so, the system places the location of the tracked subject onto the floor plan for each frame of video; the system uses a modified projection to project the subject's shape into real space (specified in centimeters, for example, rather than pixels).

In this specific implementation, matching then proceeds using a greedy algorithm as follows: for each base track, the system generates a score for all other available candidate tracks. This score describes the likelihood that the base track and the candidate track represent the same subject. The score takes into account temporal and spatial proximity (e.g., does one track end as the other begins?, are they nearby in real space?) as well as shape and color similarity (e.g., does the subject of each track have a similar appearance?).

The base track is joined to all candidate tracks whose score is above a user-specified threshold. These joined tracks are then compared to each other iteratively until no more joins are possible.

Referring now to FIG. 19A, in a specific implementation, in a step 1910, the system stores a base track of a subject captured by a first camera in a space. In a step 1915, the system stores a first candidate track of a first candidate subject captured by a second camera in the space. In a step 1920, the system stores a second candidate track of a second candidate subject captured by the second camera. The base, first, and second candidate tracks are defined in camera space (e.g., a pixel coordinate system). For example, each track may include a set of pixel coordinates (e.g., pixel coordinate X, pixel coordinate Y) which represents the subject's position within the camera view at a particular point in time.

Figure 20:
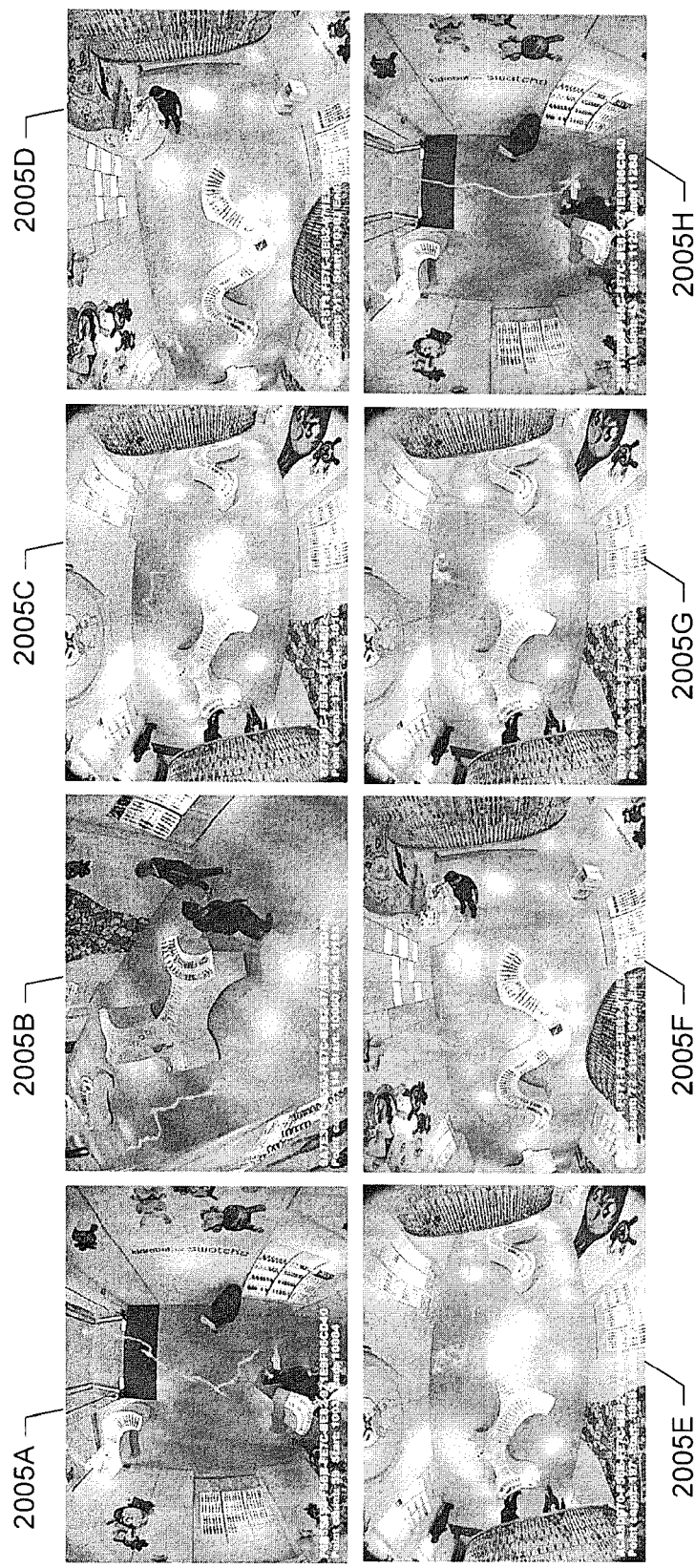
FIG. 20 shows a set of camera views or images.

FIG. 20 shows a set of images from the views of various cameras in a space. An image 2005A is from a first camera in the space. An image 2005B is from a second camera in the space. An image 2005C is from a third camera in the space. An image 2005D is from a fourth camera in the space. An image 2005E is from a fifth camera in the space. An image 2005F is from a sixth camera in the space. An image 2005G is from a seventh camera in the space. An image 2005F is from an eighth camera in the space. There is a track, superimposed over each image, which represents the movement of a subject within the view of a particular camera.

Figure 21:
FIG. 21 shows an enlarged camera view or image.
Figure 22:
FIG. 22 shows another enlarged camera view or image.
Figure 23:
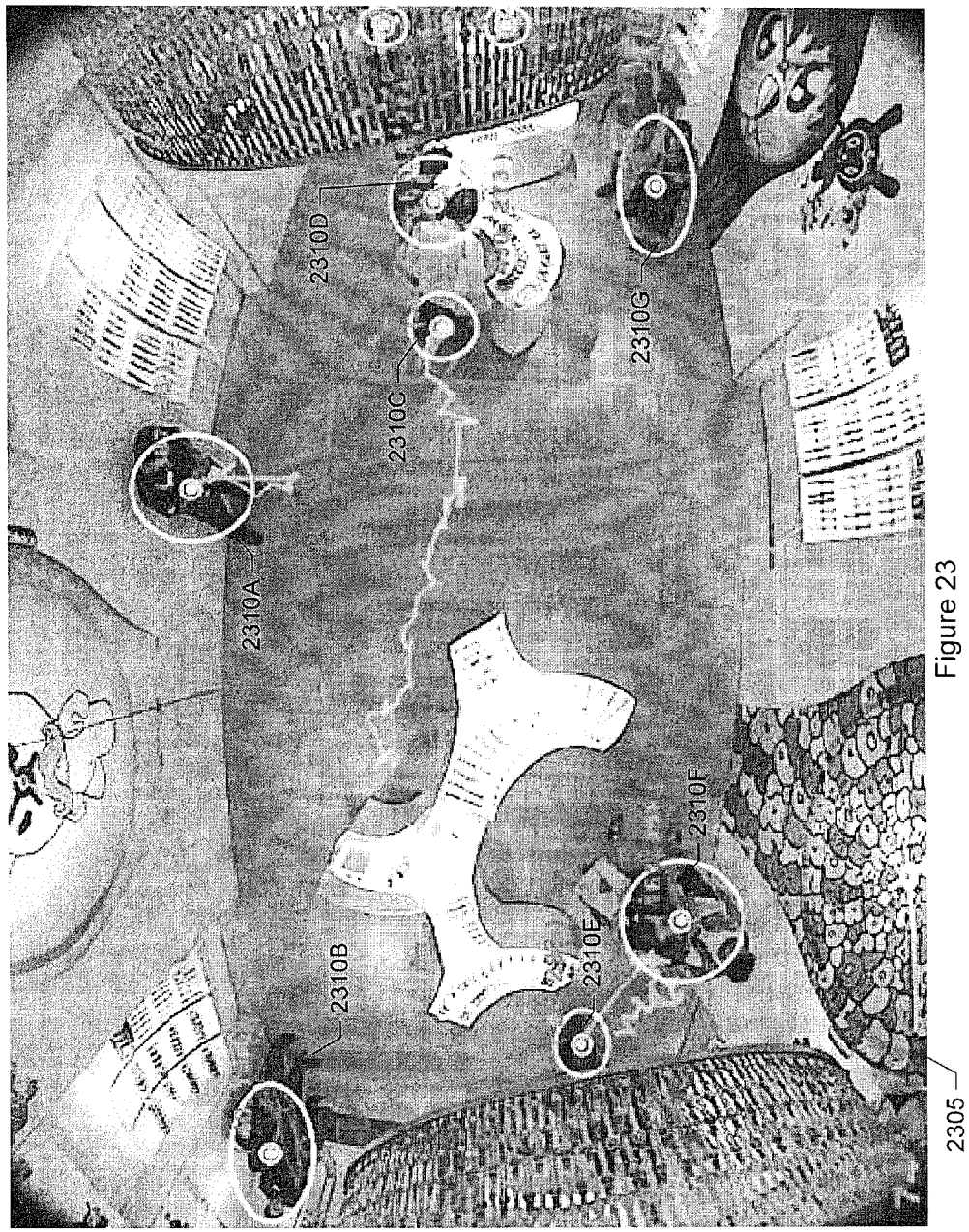
FIG. 23 shows an example of subjects being tracked within a view of a camera.

FIG. 21 shows an enlarged example of an image 2105 from a camera in the space. FIG. 22 shows an enlarged example of another image 2205 from another camera in the space. Each image includes a set of subjects (e.g., people). FIG. 23 shows an example of tracking subjects within a view of a camera. FIG. 23 shows an image 2305 from the camera where graphical tracking data has been superimposed over the image to identify the subjects and show their movement and position or location.

Image 2305 includes subjects 2310A-2310G that are being tracked by the system. A bounding box having a reference point or center point is drawn around each of the subjects. A size of the bounding box represents or is proportional to a size of the subject. A shape of the bounding box represents a shape of the subject. A bounding box may have the shape of circle, oval, ellipse, rectangle, square, or any other shape. A graphical tracking line or path is shown for each of the subjects and represents the subject's movements through the view of the camera. Depending upon the viewing options selected, the system may show a subject's coordinates. The coordinates may include pixel coordinates (e.g., coordinates x,y in camera-sapce), real coordinates (e.g., coordinates x',y' in real-space), or both.

Referring now to FIG. 19A, in a step 1925 the base, first, and second candidate tracks are projected onto a floor plan of the space. The floor plan is defined using a real-space, absolute, or ground plane coordinate system. In a specific implementation, the coordinate system includes Cartesian coordinates in real space. A Cartesian coordinate system specifies each point uniquely in a plane by a pair of numerical coordinates, which are the signed distances from the point to two fixed perpendicular directed lines, measured in the same unit of length.

A result of the projection is that the projected base, first, and second candidate tracks are defined using the real-space coordinate system. For example, each projected track may include a set of real-space coordinates x',y' which represents the subject's position on the floor plan at a particular point in time. In other words, the system places the location of the tracked subject onto the floor plan for each frame of video. A modified projection is used to project attributes such as the subject's shape into real-space.

Figure 24:
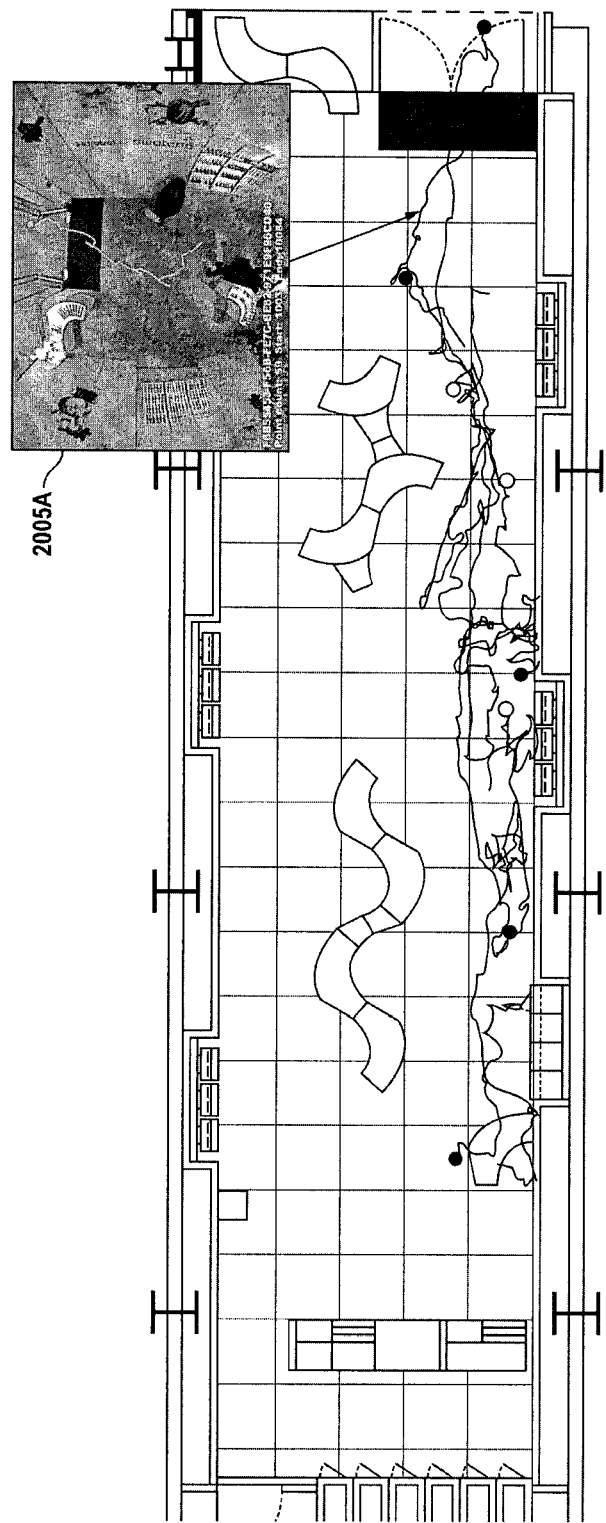
FIG. 24 shows unmatched or unjoined tracks on the floor plan.

FIG. 24 shows an example of tracks 2405 having been projected onto the floor plan. Each track represents the movement or tracking of a subject within a view of a particular camera in the space (e.g., camera view 2005A). The tracks may be shown using different colors, each color representing a particular camera in the space. Instead or additionally, the tracks may be shown using different patterns, each pattern representing a particular camera in the space (e.g., broken line pattern). In FIG. 24, the tracks are unjoined, unmatched, or not connected.

In a specific implementation, the unit of measurements for the real-space coordinate system is centimeters. In this specific implementation, a subject's position on the floor plan may be specified by a pair of coordinates (x',y'). For example, the coordinates (60, 100) may indicate the subject is 60 centimeters from an origin along the x'-axis and 100 centimeters from the origin along the y'-axis. The origin may be established at any arbitrary point on the floor plan (e.g., upper left hand corner, upper right hand corner, lower right hand corner, or lower left hand corner).

A subject's shape may be specified using width and height. For example, the shape measurements "170, 50" may indicate that the subject is 170 centimeters tall and 50 centimeters wide. A subject's size may be specified as an area measurement such as subject width multiplied by subject height (e.g., 50 centimeters*170 centimeters=8,500 square centimeters). A subject's velocity may include a first component indicating a speed of motion (e.g., 10 centimeters per second) and a second component indicating a direction of motion (e.g., east, west, north, or south). It should be appreciated that any unit of measurement may be used (e.g., millimeters, meters, inches, feet, degrees, radians, and so forth).

In a specific implementation, projecting the tracks includes applying or using a model that includes camera-space to real-space mapping or correspondence data. In a specific implementation, the model is the model of the space that was created using the graphical user interface tool (see FIGS. 3B and 6 and accompanying discussion). In other words, in this specific implementation, the mapping data is based on a set of calibration or control points identified on each view of each camera and a set of corresponding calibration or control points on identified on the floor plan, where each point and corresponding point is identified by a user using a graphical user interface tool.

Figure 19B:
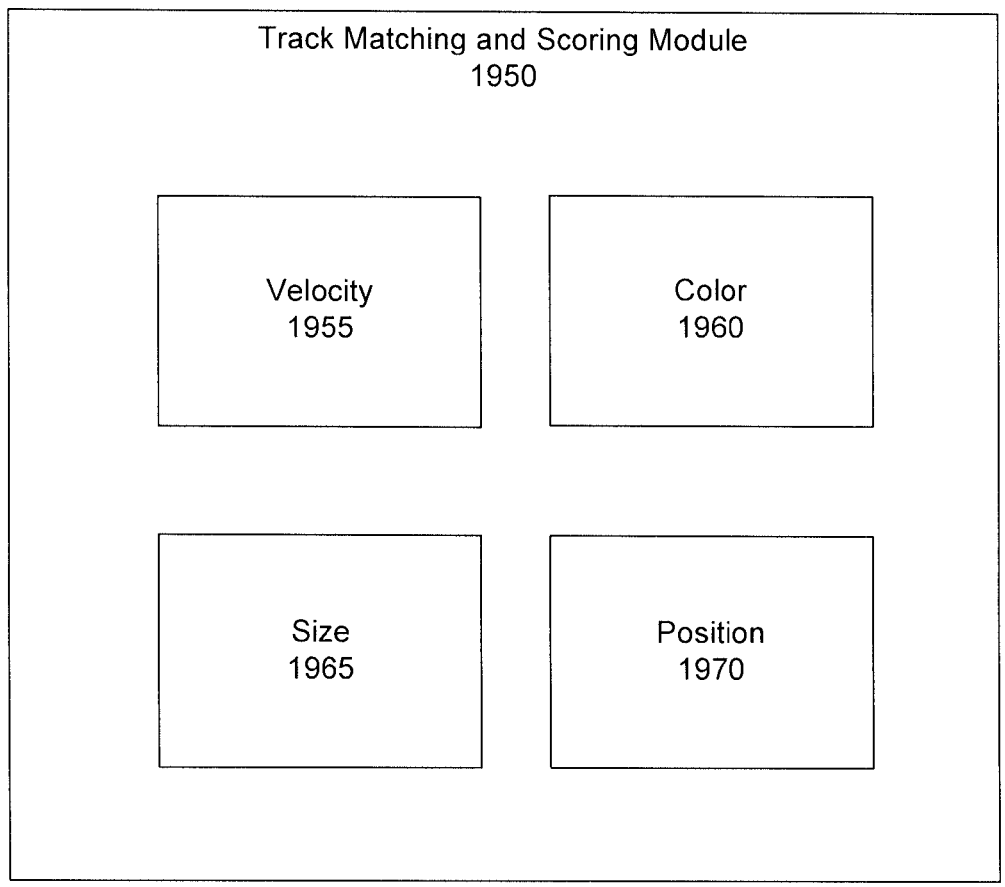
FIG. 19B shows subject attributes that may be used for track matching.

Referring now to FIG. 19A, in a step 1930, a set of attributes associated with the subject, and first and second candidate subjects is analyzed to determine whether the first or second candidate subject is the same as the subject. FIG. 19B shows a diagram illustrating the various subject attributes, parameters, characteristics, or properties that may be used by a track matching and scoring module 1950 of the system. As shown in the figure, track matching may be based on subject velocity 1955, color 1960, size 1965, position 1970, or combinations of these. Thus, in a specific implementation, a first attribute includes velocity, a second attribute includes color, a third attribute include size, and a fourth attribute includes position. In a step 1935, based on the analysis, the system joins one of the projected first or second candidate tracks to the projected base track.

In a specific implementation, matching a projected base track to projected candidate track uses a greedy algorithm as described above where the tracks are scored. In this specific implementation, given a single track as a starting point, we wish to find all tracks from other cameras that represent the same subject. Depending on the amount of camera overlap, we might expect to find a single track to join this track to, or many tracks to join to (for a given physical location, the number of tracks that will represent a subject corresponds to the number of cameras that can "see" that location). The goal is to find and connect all of these corresponding tracks.

Because this joining procedure can be inherently error prone (mainly due to errors in person tracking), an administrator can control the "aggressiveness" with which the system attempts to join tracks together. For example, the administrator can tell or otherwise indicate to the system to join any tracks that can POSSIBLY represent the same subject (resulting in more complete paths, but more errors) or to be more conservative, only joining tracks where it is CERTAINLY the same subject. This choice is generally a function of the specific use case for the tracked results.

For a candidate track, a score is generated to all potential matches that represents the likelihood that the two tracks represent the same subject. Table C below shows an example of the scoring algorithm used in this specific implementation.

TABLE C $\Theta(T_1, T_2) = 1 - (\alpha_V * \Delta V + \alpha_C * \Delta C + \alpha_S * \Delta S + \alpha_P * \Delta P)$
Where $T_1$ and $T_2$ are the tracks to be scored
$\Delta V$ is the difference in velocity between $T_1$ and $T_2$
$\Delta C$ is the difference in color between $T_1$ and $T_2$
$\Delta S$ is the difference in size between $T_1$ and $T_2$
$\Delta P$ is the difference in position between $T_1$ and $T_2$
And $\alpha$ are the weights applied to each $\Delta$ above.

Thus, in a specific implementation, scoring the projected base track and projected first candidate track includes calculating or measuring a first difference in velocity between the subject and first candidate subject and applying a first weight to the first difference, calculating a second difference in color between the subject and first candidate subject and applying a second weight to the second difference, calculating a third difference in size between the subject and first candidate subject and applying a third weight to the third difference, and calculating a fourth difference in position between the subject and first candidate subject and applying a fourth weight to the fourth difference.

Scoring the projected base track and projected second candidate track includes calculating a fifth difference in velocity between the subject and second candidate subject and applying the first weight to the fifth difference, calculating a sixth difference in color between the subject and second candidate subject and applying the second weight to the sixth difference, calculating a seventh difference in size between the subject and second candidate subject and applying the third weight to the seventh difference, and calculating an eighth difference in position between the subject and second candidate subject and applying the fourth weight to the eighth difference.

The weights applied to each of the attributes may be the same or different. The first weight may be the same as or different from the second, third, or fourth weight. The second weight may be the same as or different from the third or fourth weight. The third weight may be the same as or different from the fourth weight. This flexibility in weighting allows one attribute to be weighted more or less heavily than another attribute.

In a specific implementation, the scoring algorithm is biased or weighted towards subject color. Based on extensive experimentation, applicants have found that subject color can be a good factor in helping to determine whether the first or second candidate subject is the same as the subject. In this specific implementation, the second weight (i.e., weight to be applied to the difference in color) may be greater than the first, third, and fourth weights. However, this is not necessarily always the case. For example, in some applications the subjects to track may be wearing uniforms. So, color may be weighted less than other subject attributes such as velocity, size, shape, or position.

Velocity may include average speed, maximum speed, speed at a particular position or point in time (e.g., speed of subject upon leaving or exiting a first camera view, speed of subject upon entering a first camera view, speed of subject upon entering a second camera view while remaining within the first camera view, or speed of subject while in an overlapping camera views), direction (e.g., direction upon leaving or exiting a first camera view, direction upon entering a first camera view, direction upon entering a second camera view while remaining within a first camera view, or direction while within overlapping camera views), and so forth.

Color may include a color histogram of the subject. A color histogram is a representation of the distribution of colors associated with the subject. A color histogram can be used to represent the number of pixels that have colors in each of a fixed list of color ranges that span the image's color space. The color histogram may include the subject's skin color, hair color, clothing color, or combinations of these.

Position or spatial proximity may be include subject position upon entering a first camera view, the subject's position upon leaving the first camera view, the subject's position upon entering the second camera view while remaining within the first camera view, or combinations of these.

Figure 25:
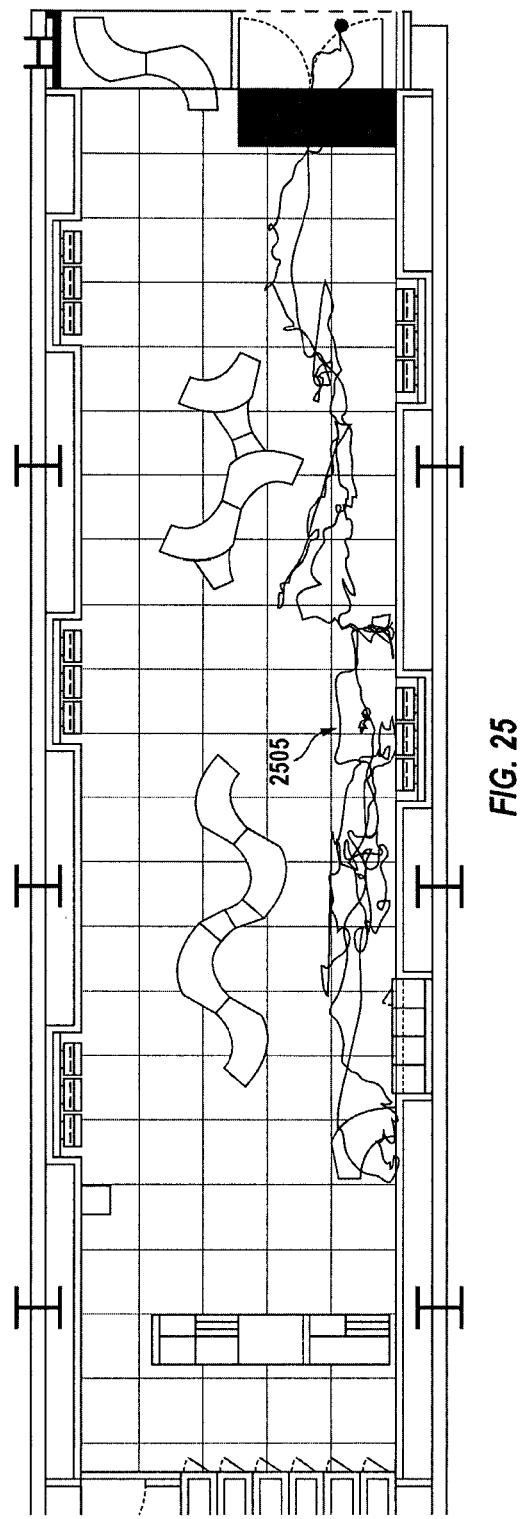
FIG. 25 shows a joined track on the floor plan.

FIG. 25 shows an example of a joined track 2505 that is displayed on the floor plan. The joined track represents the movement of subject through multiple camera views. For example, the joined track includes a first track of a subject within a first camera view, and a second track of a candidate subject within a second camera view, where based on the analysis (see step 1930, FIG. 19A and accompanying discussion), the subject and candidate subject were determined to be the same. The joined track may be referred to as a full path.

Figure 26:
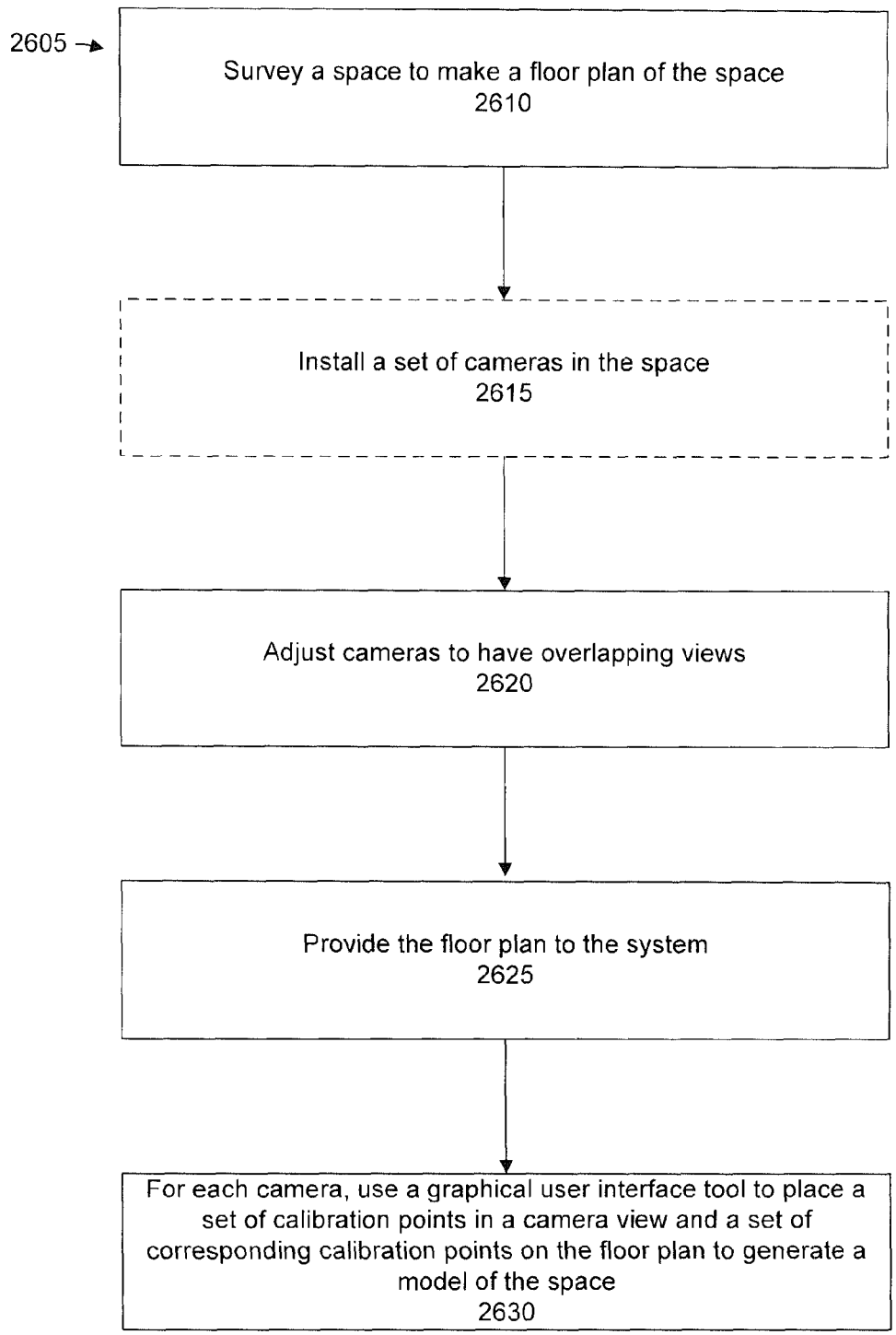
FIG. 26 shows an overall flow for installing a subject tracking system.

FIG. 26 shows a flow diagram 2605 for installing a system for tracking a subject across two or more cameras. In a step 2610, a user (e.g., installer) surveys a space to make a floor plan of the space. For example, the user may use a measuring tape, ruler, laser, or other measuring device to make measurements. Making the measurements of an existing space may include measuring a length of the space, measuring a width of the space, marking the location of structural and architectural elements, built-in elements, walls and partitions, display cases, racks, cash registers, doors, changing rooms, bathrooms, closets, columns, posts, poles, stairs, elevators, escalators, openings, features of the floor (e.g., floor mounted lighting, floor tile layout, floor mounted vents, floor mounted outlets or receptacles, carpet layout, floor penetrations, cracks, expansion joints, patterns, or floor drains)—just to name a few examples), and the like.

In a step 2615, the user installs a set of cameras in the space. The cameras may be mounted to a ceiling, wall, pole, or combinations of these. In a specific implementation, there are at least two cameras. However, this number can vary greatly. The number of cameras to install can depend on factors such as desired coverage, area of the space, or floor plan. For example, a large area such as a mall may require many more cameras than a small retail store in the mall.

Step 2615 is shown in broken lines to indicate that this step is optional and is not present in some implementations. In a specific implementation, the client, e.g., the retail store, does not have to install a new set of cameras in order to obtain the benefits of the system. In this specific implementation, the system can be used to retrofit or augment an existing security system having a set of existing cameras. Not having to purchase and install a new set of cameras helps to lower costs and reduces disruption. The system further allows for a new camera to be added to an existing set of cameras. The new camera may be different from the existing set of cameras. For example, the new and existing cameras may be from different manufacturers, may be different models, may have different lenses, and so forth.

In a step 2620, the user adjusts the cameras to have overlapping views. Adjusting a camera may include rotating the camera, tilting the camera, angling the camera, or relocating the camera. In a specific embodiment, there is a first camera having a first view that captures a first portion of a space. There is a second camera having a second view that captures a second portion of the space. One or both cameras are adjusted so that the first and second views are at least partially overlapping. When the views are at least partially overlapping, a third portion of the space is captured by both the first and second cameras.

In a step 2625, the user provides the floor plan to the system. For example, the user may use a computer-aided design (CAD) system to create the floor plan and upload the floor plan to the system.

In a step 2630, for each camera, the user uses a graphical user interface tool to place a set of calibration or control points in a camera view (e.g., camera image) and a set of corresponding calibration or control points on the floor plan to generate a model of the space (see FIG. 6 and accompanying discussion). As discussed above, the tool allows the user to place a calibration point on the image followed by a corresponding calibration point on the floor plan or vice-versa. Based on the input (i.e., user-specified point-to-point correspondences) the system generates a model and provides a visualization of the mapping capability of the model. In particular, after the placing of calibration points, the user views, reviews, evaluates, or assesses a distribution of a set of coverage markers shown on at least one of the first image or floor plan to determine an ability of the model to map a point in the first image to a point on the floor plan.

If the distribution indicates poor correspondence between the points and corresponding points (e.g., there is a twist in the coverage marker distribution, there are gaps in coverage, or the coverage markers are folding upon themselves—see FIG. 13), the user may use the tool to adjust, edit, or alter the points in order to generate a new model.

In a specific implementation, the method further includes after the reviewing a distribution, placing an additional first calibration point on one of the floor plan or first image to generate a new model. Placing an additional second calibration point on another of the floor plan or first image to generate the new model. And, after the placing an additional first and second calibration points, reviewing a new distribution of the plurality of coverage markers shown on at least one of the first image or floor plan to determine an ability of the new model to map the point in the first image to the point on the floor plan.

In another specific implementation, the method further includes after the reviewing a distribution, adjusting a position of a first calibration point of the set of first calibration points placed on one of the floor plan or first image to generate a new model, and after the adjusting a position, reviewing a new distribution of the set of coverage markers shown on at least one of the first image or floor plan to determine an ability of the new model to map the point in the first image to the point on the floor plan.

In a specific implementation, the space includes a second camera that provides a second image, and the method further includes placing a set of third calibration points on one of the floor plan or second image to generate the model, placing a set of fourth calibration points on another of the floor plan or second image to generate the model, where the set of fourth calibration points are to correspond to the set of third calibration points, and after the placing the set of third and fourth calibration points, reviewing another distribution of another set of coverage markers shown on at least one of the second image or floor plan to determine an ability of the model to map a second point in the second image to a second point on the floor plan.

Figure 27:
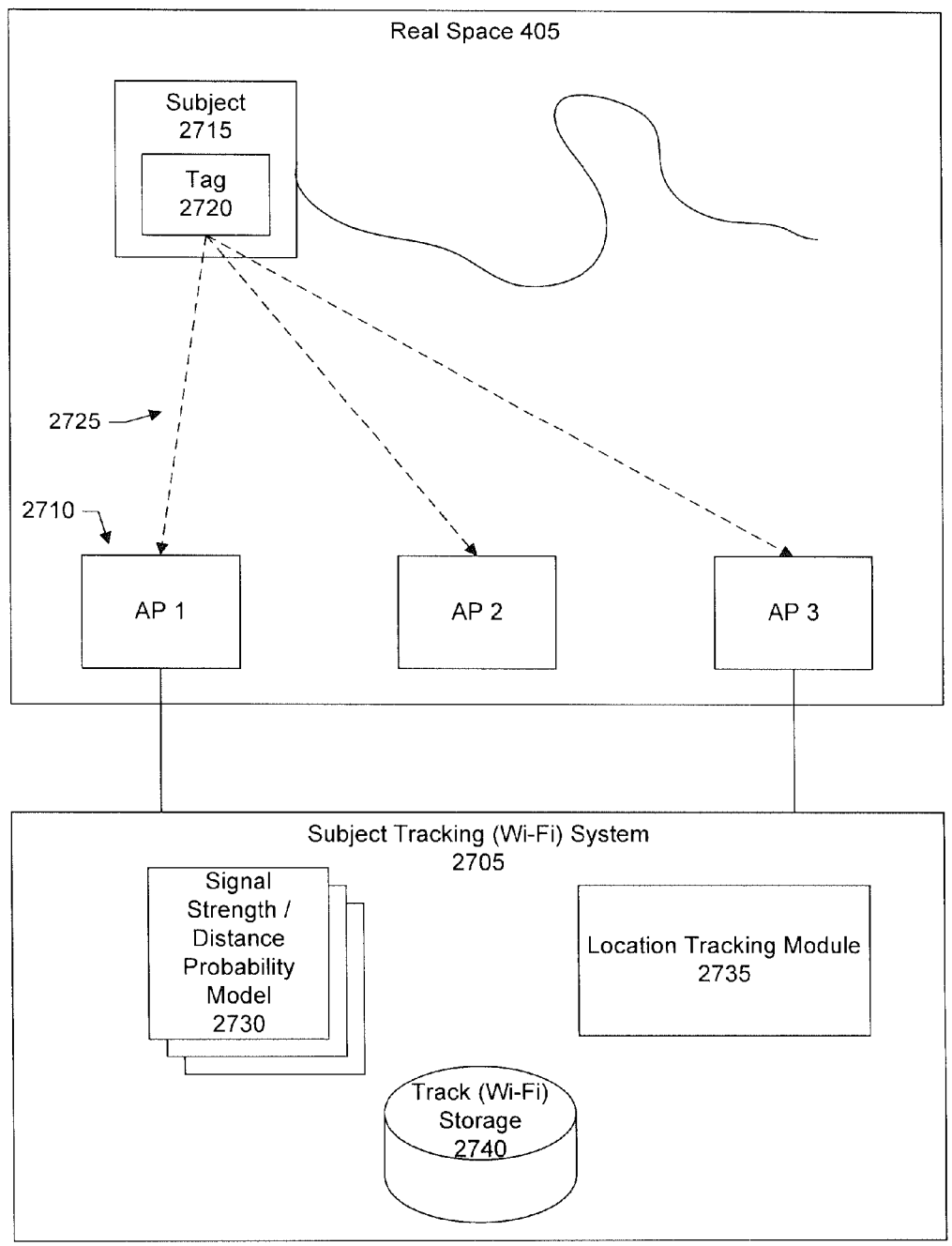
FIG. 27 shows a block diagram of a Wi-Fi-based tracking system.

FIG. 27 shows a simplified block diagram of an environment incorporating a system 2705 for Wi-Fi-based tracking of subjects through the real world physical space 405 shown in FIG. 4. In the example shown in FIG. 27, the space includes a set of wireless receivers or access points 2710 positioned at various locations throughout the space. There are subjects including a subject 2715 of the first type (e.g., salesperson) who carries a tag 2720. The tag periodically transmits a signal or beacon 2725. The access points are configured to listen for the beacons. The system further includes a signal strength-to-distance model for each access point 2730, a location tracking module 2735, and storage 2740 for the Wi-Fi tracks.

In a specific implementation, the signal from a tag is transmitted once every second, but the frequency of transmission can vary depending upon factors such as the application of the system, desired accuracy and precision, and so forth. The strength of the signal is detected at each of at least three access points. Each access point is associated with a signal strength-to-distance model. Based on the strength of the signal received at an access point, the system consults the model associated with the access point in order to determine, derive, or estimate the distance from the access point to the tag. The location tracking module analyzes the distances provided by the models to identify and track the location of the tag and thus the tag-carrying subject. The subject's tracks are stored in storage 2740. These tracks may be referred to as Wi-Fi tracks.

In an implementation, the signal transmitted by a tag includes a media access control (MAC) address or other identifier that can be used to help identify the tag. A MAC address is a globally unique identifier assigned to network devices, and may be referred to as hardware or physical address. Generally, MAC addresses are 6-byte (48-bits) in length, and are written in an MM:MM:MM:SS:SS:SS format. The first 3-bytes include the identification number of the manufacturer, which is assigned by an Internet standards body. The second 3-bytes include the serial number assigned by the manufacturer.

Figure 28:
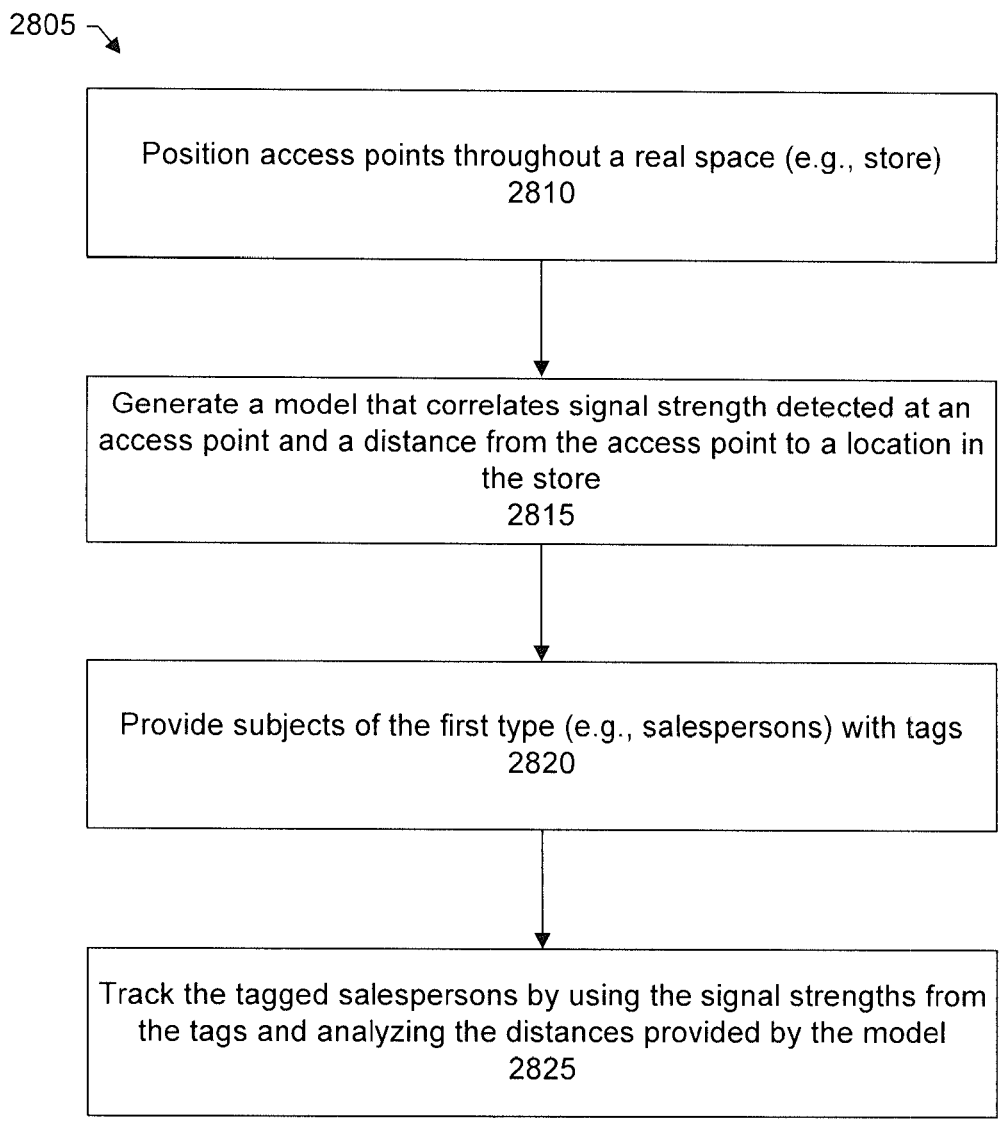
FIG. 28 shows an overall flow for configuring a Wi-Fi-based tracking system.
Figure 29:
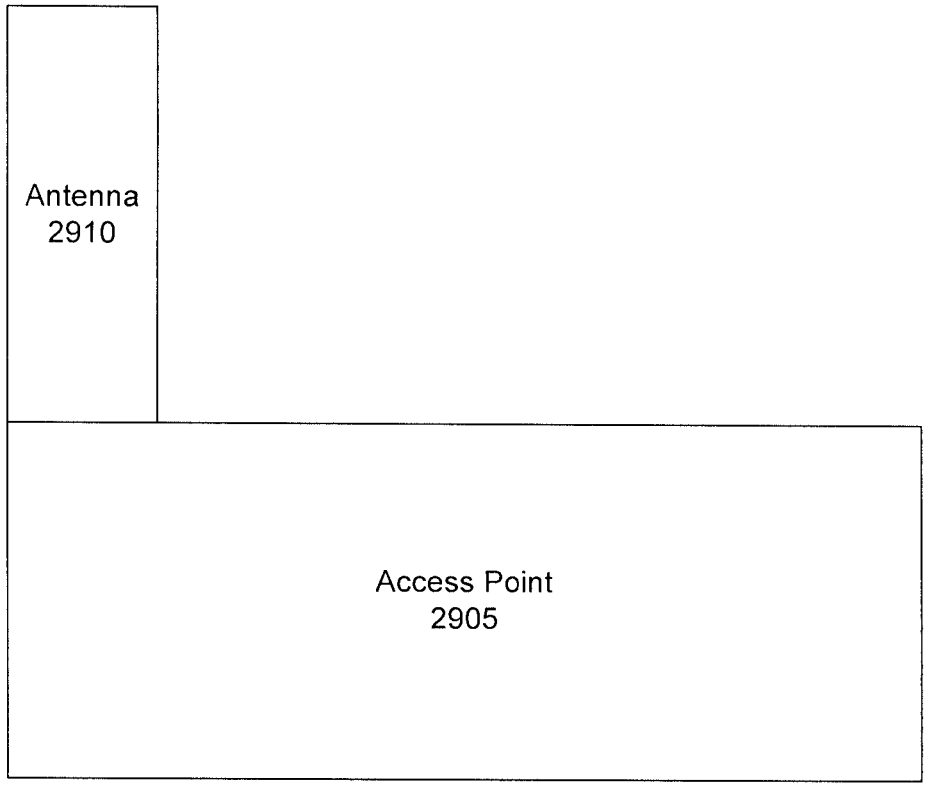
FIG. 29 shows an example of an access point.

FIG. 28 shows a flow 2805 for configuring the Wi-Fi-based tracking. In a step 2810, wireless access points are positioned at various locations throughout the space (e.g., store). FIG. 29 shows an example of a wireless access point 2905. The access point can include an antenna 2910 and other hardware and software (e.g., controller, memory, firmware, or firewall). A wireless access point is a device that allows wireless devices to connect to a wired network using Wi-Fi, or related standards. If the access point is a standalone device, the access point may connect to a router (via a wired network). Alternatively, the access point may be part of a router.

In a specific implementation, at least three access points are positioned throughout the store. There can be, for example, 5, 10, 15, 20, 25, 30, or more than 30 access points. The number and positioning of access points depends on factors such as the size or square footage of the store to be monitored, number and location of obstructions, type of obstruction, and others. Wireless coverage can be affected by factors such as metal obstructions (e.g., heating and air-conditioning ducts, large ceiling trusses, building superstructures, and power cabling runs), the density of the walls or materials used in the store, and so forth. Generally, it is desirable to have a sufficient number of access points and that the access points be positioned such that there will be at least some wireless coverage at all locations in the store for which monitoring and tracking is desired.

Referring now to FIG. 28, in a step 2815, a model is generated for each access point that correlates a strength of a signal detected at an access point to a distance. In a specific implementation, a flow for generating and developing the model includes, in brief, providing an installer with a tag, surveying the store while carrying the tag (e.g., installer walks around in the store), collecting signal strength samples at each of the access points, and recording the corresponding distances from the access points to the tag being carried by the installer.

Figure 30:
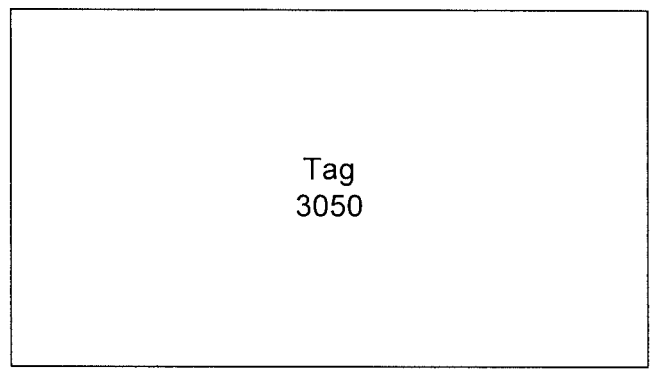
FIG. 30 shows an example of a tag.

FIG. 30 shows an example of a tag 3050. This example of a tag has dimensions similar to that of a credit card. For example, a length of the tag may be about 8.5 centimeters and a width of the tag may be about 5.3 centimeters. The tag is designed to be easily carried by a person such as in their pocket. The tag may be attached to a leash so that it can be worn around the neck. The tag may be attached to a clip so that it can be clipped to the person's clothing. The tag transmits a signal (e.g., Wi-Fi signal). In a specific implementation, the tag transmits the signal once per second. The tag may include a logo of the system provider. The logo may be a decal or sticker that is placed on a surface of the tag; or may be painted or printed on the tag surface.

As discussed, in order to configure the Wi-Fi tracking system, in a specific implementation, the installer carries the tag and walks through predefined reference paths in the store. The system captures and processes the received signal strength indicator (RSSI) from each AP for the tag. Signal strength is a proxy for the distance from the AP to the tag. If this proxy were an accurate mapping (i.e., if the relationship between RSSI and distance were purely linear) then tracking would be a simple matter of triangulating tag location from the distance readings to the three nearest APs. This is not the case, however. RSSI is affected by a multitude of issues, including signal inhibition by physical objects, multipath effects (when signal reaches the AP via two different routes), and signal reflectance and refraction.

A technique as described in this patent application allows the tags to be tracked with an improved level of precision. In a specific implementation, a first step in generating the model includes determining a tag's distance to an AP based on its RSSI. To accomplish this, in this specific implementation, samples of RSSI are taken at various known distances to the AP in question. Statistics (e.g., mu and sigma) are generated for the observed RSSI at each distance.

In an implementation, at least a thousand samples are collected from each AP. A sample can include a distance from the AP to the tag location and a corresponding signal strength or RSSI. In a specific implementation, a Kalman filter (also referred to as a linear quadratic estimation (LQE)) is applied to the collected signal strength samples in order to smooth the collected data. The Kalman filter includes an algorithm that uses a series of measurements observed over time, containing noise (random variations) and other inaccuracies, and produces estimates of unknown variables that tend to be more precise than those based on a single measurement alone. A Kalman filter operates recursively on streams of noisy input data to produce a statistically optimal estimate of the underlying system state. Other techniques of data smoothing, such as rolling averages, may instead or additionally be used.

The samples from an AP are used to develop a signal strength-to-distance model that can map signal strength to distance from the AP. In a specific implementation, the model is a probabilistic model that given a signal strength, outputs a probability of a particular distance being between the tag and the AP. The system can then take the highest probability distance as the estimated distance between the AP and tag. Thus, the model can characterize signal strength (e.g., signal intensity) as a function of distance. The model may be referred to as an RSSI distance model, localization model, Wi-Fi fingerprint, or distance probability model.

Referring now to FIG. 28, in a step 2820, a set of the tags are provided to the subjects of the first type, e.g., salespersons. For example, the salespersons, before starting their shift, may pickup a tag to be carried in their pocket or clipped to their clothing. In a step 2825, the salespersons are tracked by using the signal strengths from the tags and analyzing the distances provided by the RSSI distance models. In a specific implementation, tracking of the salespersons is anonymous. That is, the system will not identify particular salespersons. Tracking salespersons anonymously can help to address privacy concerns that the salespeople may have about being monitored and tracked. In another specific implementation, the tags can be used to identify particular salespersons. In this specific implementation, the system can be used for time and attendance tracking, e.g., to record when employees start and stop work. The tags may be used to identify the type of salesperson (e.g., manager, cashier, or stock person).

Figure 31:
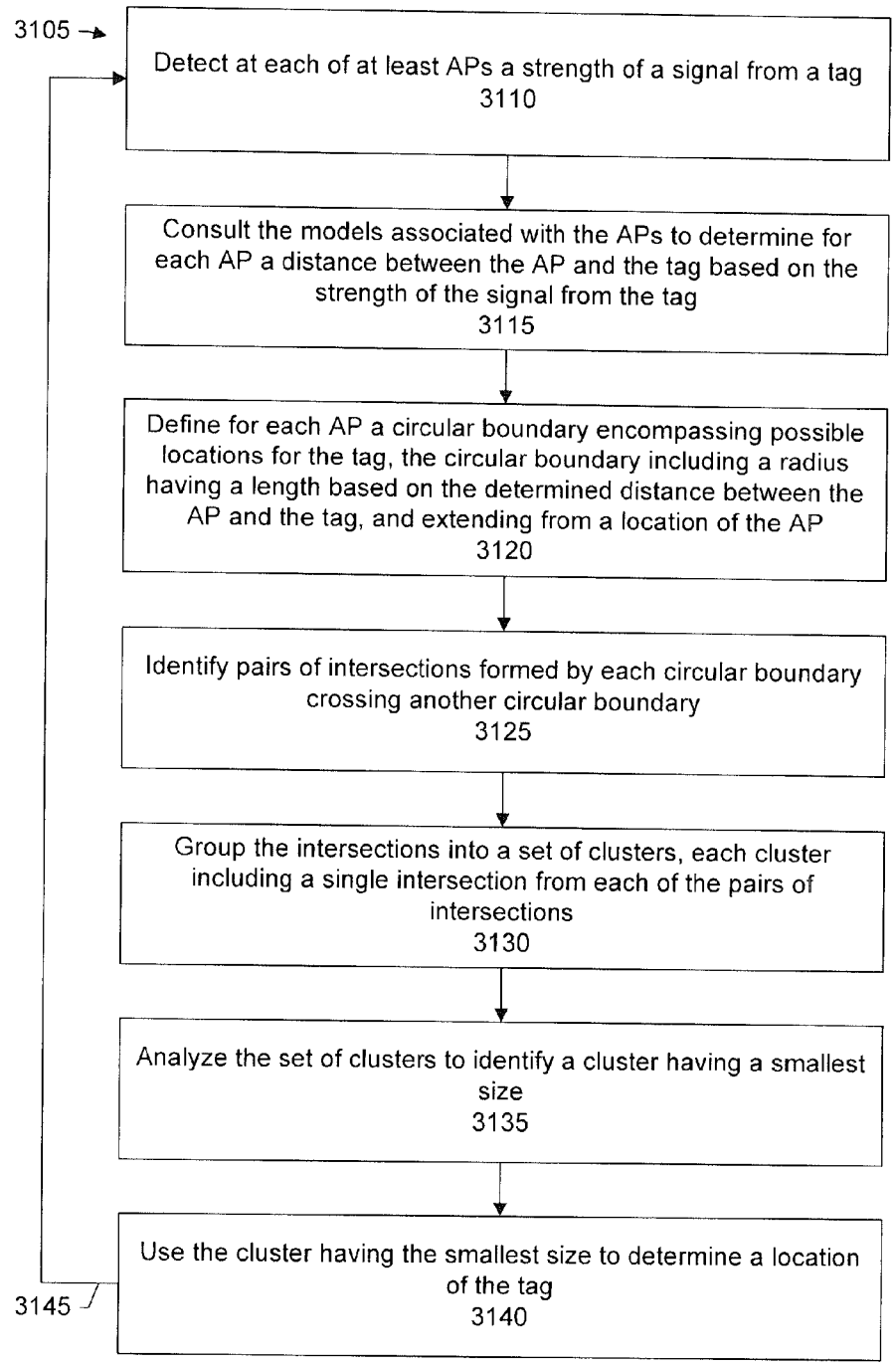
FIG. 31 shows a flow for Wi-Fi-based tracking.

FIG. 31 shows a more detailed flow 3105 for Wi-Fi tracking. In a specific implementation, when a new signal strength or RSSI reading is received, a gaussian mixture model (GMM) is employed in order to produce the maximum likelihood distance to the AP. In order to account for the limited number of distance samples taken during calibration (due to practical considerations), the system also employs a simple linear model of distance versus RSSI and combines this linear hypothesis with the GMM's hypothesis. The result of this step is a "best guess" as to the distance of the tag to the AP in question. A confidence score is attached to each distance hypothesis that equates roughly to the likelihood that the distance hypothesis is accurate.

In a specific implementation, the confidence score is based on the amount of potential error in the distance hypothesis. The GMM produces a likelihood for each possible distance, choosing the maximum likelihood distance as its output. If we take each distance hypothesis into account along with its corresponding likelihood, we get a confidence score for each distance from the GMM. We can then compare the GMM's output with the linear model's output to further refine our confidence score (if the GMM and linear model agree, overall confidence is higher).

A mixture model is a probabilistic model which assumes the underlying data to belong to a mixture distribution. In a mixture distribution, its density function is a convex combination (a linear combination in which all coefficients or weights sum to one) of other probability density functions:

$$p(x) = w_1 p_1(x) + w_2 p_2(x) + \ldots + w_n p_n(x)$$

The individual $p_i(x)$ density functions that are combined to make the mixture density $p(x)$ are called the mixture components, and the weights $w_1, w_2, \ldots, w_n$ associated with each component are called the mixture weights or mixture coefficients.

The Gaussian (Normal) density function is a specific mixture distribution in which each of the mixture components are Gaussian distributions, each with their own mean and variance parameters, e.g.:

$$p(x) = w_1 N(x|\mu_1, \Sigma_1) + w_2 N(x|\mu_2, \Sigma_2) + \ldots + w_n N(x|\mu_n, \Sigma_n)$$

In this specific implementation, given a set of distances (derived above), the system generates a best hypothesis as to the location of the tag. Again, with perfect distance readings this would be simply a matter of trigonometry. However, we must account for possibly very large inaccuracies in the distance estimates. We first notice that one AP and corresponding distance reading gives us a circle of possible tag locations. Two APs with corresponding distance readings gives us (potentially) two possible locations.

For each pair of AP's, we derive the pair of possible locations for the tag. Each pair of points is assigned a confidence score based on the scores assigned to the distances used to derive locations. Then the system generates all clusters of potential points, where a cluster includes exactly a one point hypothesis from each pair of AP's. Each cluster is also assigned a confidence score based on the scores of its points. In this specific implementation, the confidence score here is a linear combination of the score associated with each point (see above for per-point confidence scores) along with a representation of the overall size of the cluster. The assumption being that a smaller cluster represents more agreement between access points, while a larger cluster would result from more disagreement between AP's.

In this specific implementation, the system then takes the best cluster as the most likely tag location, with the mean of that cluster as the hypothesized point. In an implementation, the "best" cluster is defined as the one with minimum size and maximum confidence. The result of this part of the system is a location for each tag at each point in time. Taken together, these points make up tracks of individual tags as they move through a space.

Figure 32:
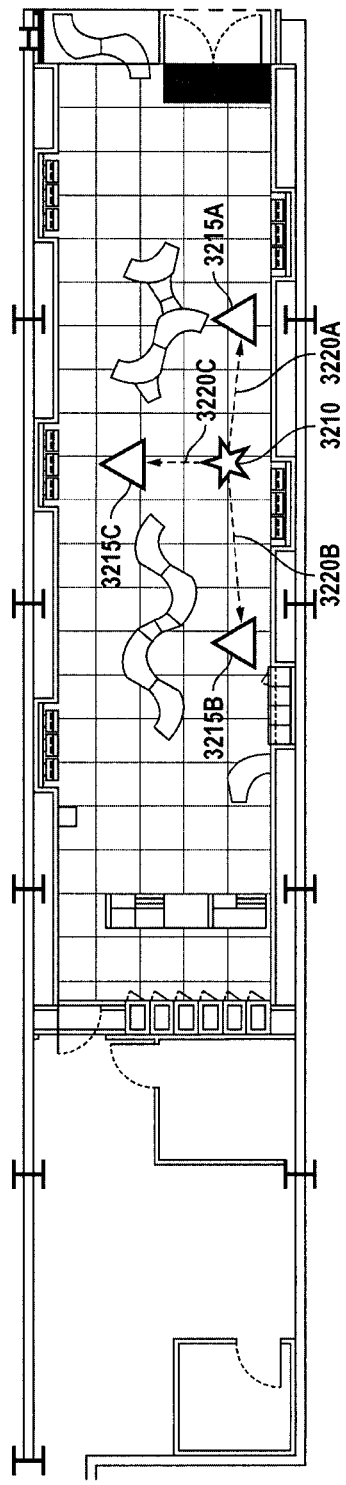
FIG. 32 shows a floor plan of a store having access points to track a tag-carrying subject.

More particularly, in a specific implementation, in a step 3110, the system detects at each of at least three APs, a strength of a signal from a tag carried by a salesperson. FIG. 32 shows an example of a floor plan of a store having Wi-Fi-based tracking. A star 3210 represents a tag-carrying salesperson. Triangles 3215A-C represent the at least three APs (e.g., first, second, and third APs). Broken lines 3220A-C represent the strength of the signal received at the APs.

In a specific implementation, signal strength is based on RSSI. RSSI is a measurement of power present in a received radio signal. In an IEEE 802.11 system RSSI is the relative received signal strength in a wireless environment, in arbitrary units. For example, RSSI values can range from 0 to 100. Any scale, however, may be used. RSSI is an indication of the power level being received by the antenna. Typically, the higher the RSSI number (or less negative in some devices), the stronger the signal.

Referring now to FIG. 31, in a step 3115, the models associated with the APs are consulted to determine the distances between the APs and the tag based on the strengths of the signal from the tag. For example, based on first signal strength 3220A (FIG. 32) received at first AP 3215A, the first model associated with first AP 3215A may be used to estimate a first distance as being between first AP 3215A and salesperson 3210. Based on second signal strength 3220B received at second AP 3215B, the second model associated with second AP 3215B may be used to estimate a second distance as being between second AP 3215B and salesperson 3210. Based on third signal strength 3220C received at third AP 3215C, the third model associated with third AP 3215C may be used to estimate a third distance as being between third AP 3215C and salesperson 3210.

Referring now to FIG. 31, in a step 3120, the system defines for each of the at least three access points a boundary, area, or region. The boundary can be of any shape. The boundary encompasses possible locations for the tag. In a specific implementation, a shape of the boundary is a circle. The boundary (e.g., circular boundary) includes a dimension such as a radius having a length based on the determined distance estimated to be between the AP and the tag. The radius can extend from a location of the AP.

Figure 33:
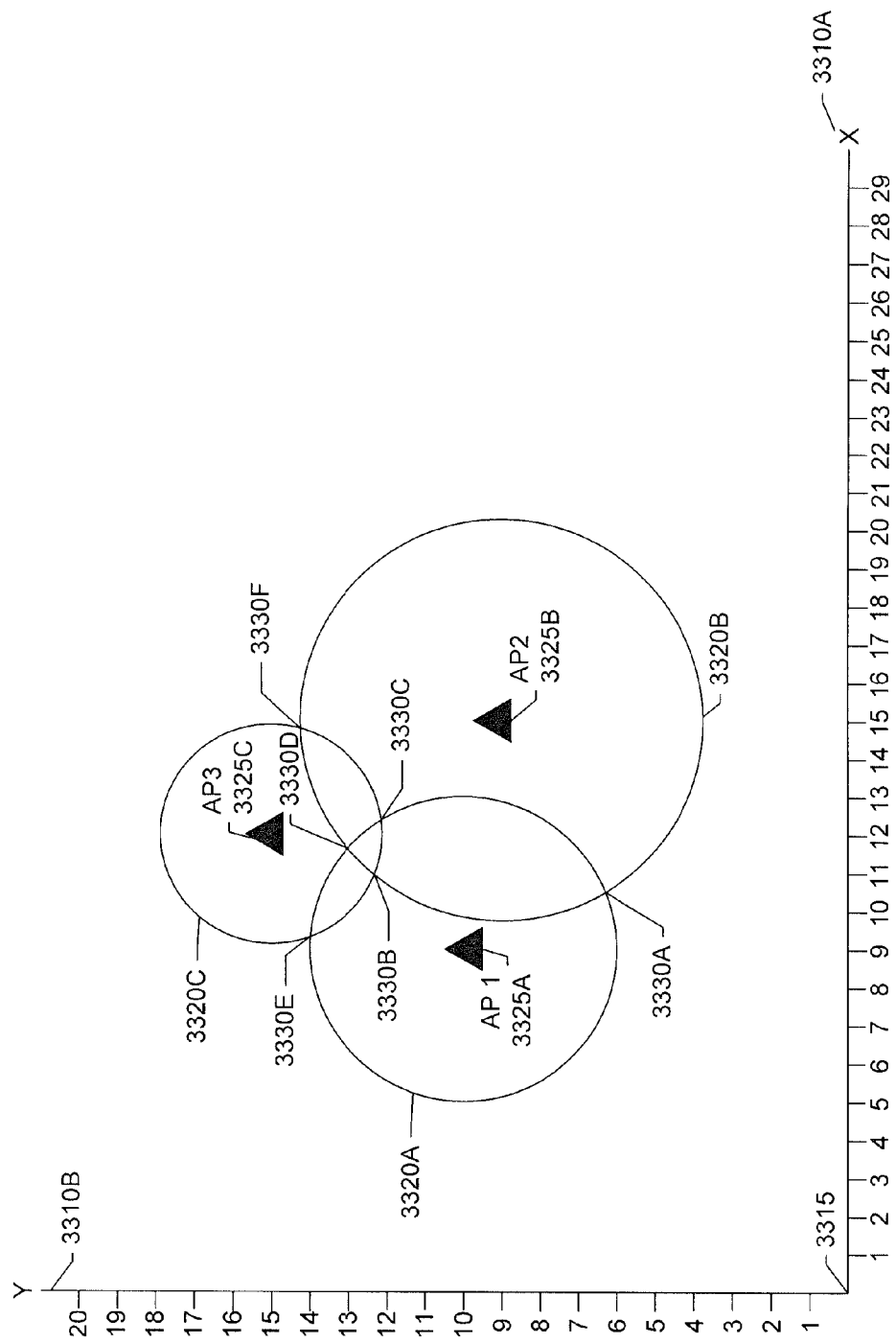
FIG. 33 shows possible locations of the tag-carrying subject based on signal strength detected at the access points.

FIG. 33 shows an example of the circular boundaries having been plotted in the coordinate system of the real space. As shown in FIG. 33, there is an x-axis 3310A and a y-axis 3310B. The x- and y-axis intersect at an origin 3315. The origin may be any arbitrary reference point on the store floor plan. For example, the origin may be established at a particular corner of the store (e.g., northeastern-most corner) or any other location as desired.

FIG. 33 further shows a first circle 3320A, a second circle 3320B, and a third circle 3320C. The first circle includes a first center 3325A having an x-coordinate value 9 and a y-coordinate value 10. Coordinates (9, 1) identify or correspond to a location of first access point 3215A (FIG. 32) in the store. A first radius of the first circle is based on the determined distance between the first access point and the tag (see step 3115, FIG. 31). The first radius may be equal to the determined distance between the first access point and the tag. In another specific implementation, the radius may be equal to or greater than the determined distance.

The second circle includes a second center 3325B having an x-coordinate value 15 and a y-coordinate value 9. Coordinates (15, 9) identify a location of second access point 3215B in the store. A second radius of the second circle is based on the determined distance between the second access point and the tag. The second radius may be equal to the determined distance between the second access point and the tag.

The third circle includes a third center 3325C having an x-coordinate value 12 and a y-coordinate value 15. Coordinates (12, 15) identify a location of third access point 3215C in the store. A third radius of the third circle is based on the determined distance between the third access point and the tag. The third radius may be equal to the determined distance between the third access point and the tag.

Referring now to FIG. 31, in a step 3125, the system identifies pairs of intersections formed by each circular boundary crossing another circular boundary. For example, referring now to FIG. 33, a first pair of intersections includes intersections 3330A and 3330D. Intersections 3330A and 3330D are formed when the first and second circles cross each other. A second pair of intersections includes intersections 3330E and 3330C. Intersections 3330E and 3330C are formed when the first and third circles cross each other. A third pair of intersections includes intersections 3330B and 3330F. Intersections 3330B and 3330F formed when the second and third circles cross each other. Table D below summarizes the circular boundary pairs, their intersecting point pairs, and the corresponding coordinates of the intersections.

TABLE D

| Circular Boundary Pairs | Intersecting Point Pairs | Coordinates |
| --- | --- | --- |
| first circle 3320A and second circle 3320B | 3330A and 3330D | (10.5, 6.3) and (11.6, 13) |
| first circle 3320A and third circle 3320C | 3330E and 3330C | (9.4, 14) and (12.4, 12.4) |
| second circle 3320B and third circle 3320C | 3330B and 3330F | (11, 12.5) and (14.6, 14.3) |

In a step 3130 (FIG. 31), the system groups the intersections into a set of clusters. Each cluster includes a single intersection from each of the pairs of intersections. Consider, as an example, the data shown in table D. In this example, clustering the intersections results in six clusters. A first cluster includes points 3330A, 3330E, and 3330F. More particularly, the first cluster includes a single point from the first intersection pair having points 3330A and 3330D (e.g., point 3330A), a single point from the second intersection pair having points 3330E and 3330C (e.g., point 3330E), and a single point from the third intersection pair having points 3330B and 3330F (e.g., point 3330F).

A second cluster includes points 3330A, 3330E, and 3330B. More particularly, the second cluster includes a single point from the first intersection pair having points 3330A and 3330D (e.g., point 3330A), a single point from the second intersection pair having points 3330E and 3330C (e.g., point 3330E), and a single point from the third intersection pair having points 3330B and 3330F (e.g., point 3330B).

A third cluster includes points includes points 3330A, 3330C, and 3330F. More particularly, the third cluster includes a single point from the first intersection pair having points 3330A and 3330D (e.g., point 3330A), a single point from the second intersection pair having points 3330E and 3330C (e.g., point 3330C), and a single point from the third intersection pair having points 3330B and 3330F (e.g., point 3330F), and so forth. Table E below summarizes the clustering results.

TABLE E

| Cluster | Cluster Intersection Points | Coordinates |
|---|---|---|
| 1 | 3330A; 3330E; 3330F | (10.5, 6.3); (9.4, 14); (14.6, 14.3) |
| 2 | 3330A; 3330E; 3330B | (10.5, 6.3); (9.4, 14); (11, 12.5) |
| 3 | 3330A; 3330C; 3330F | (10.5, 6.3); (12.4, 12.4); (14.6, 14.3) |
| 4 | 3330A; 3330C; 3330B | (10.5, 6.3); (12.4, 12.4); (11, 12.5) |
| 5 | 3330D; 3330C; 3330B | (11.6, 13); (12.4, 12.4); (11, 12.5) |
| 6 | 3330D; 3330C; 3330F | (11.6, 13); (12.4, 12.4); (14.6, 14.3) |

The first column of the table identifies the cluster. The second column identifies the intersection points included in the cluster. The third column lists the coordinates that correspond to the intersection points of the cluster.

Referring now to FIG. 31, in a step 3135, the system analyzes the set of clusters to identify a cluster having a smallest size. In a specific implementation, the intersection points of the clusters form vertices of polygons. In this specific implementation, identifying the cluster having the smallest size includes calculating the areas of the polygons, and comparing the areas to identify a polygon having a smallest area, where a cluster associated with the polygon having the smallest area is the cluster having the smallest size.

Figure 34:
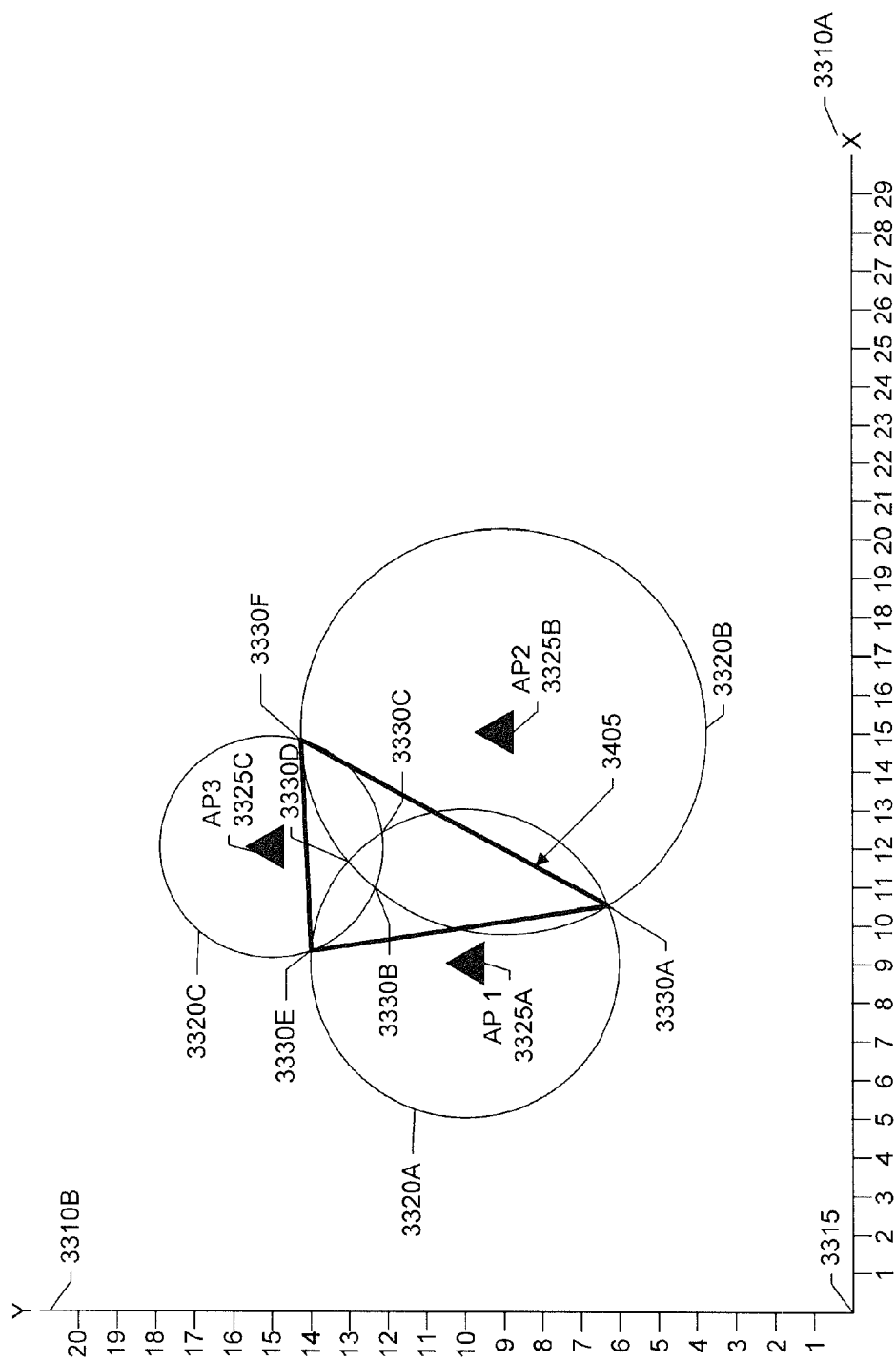
FIG. 34 shows an example of clustering points to determine a location of the tag-carry subject.
Figure 35:
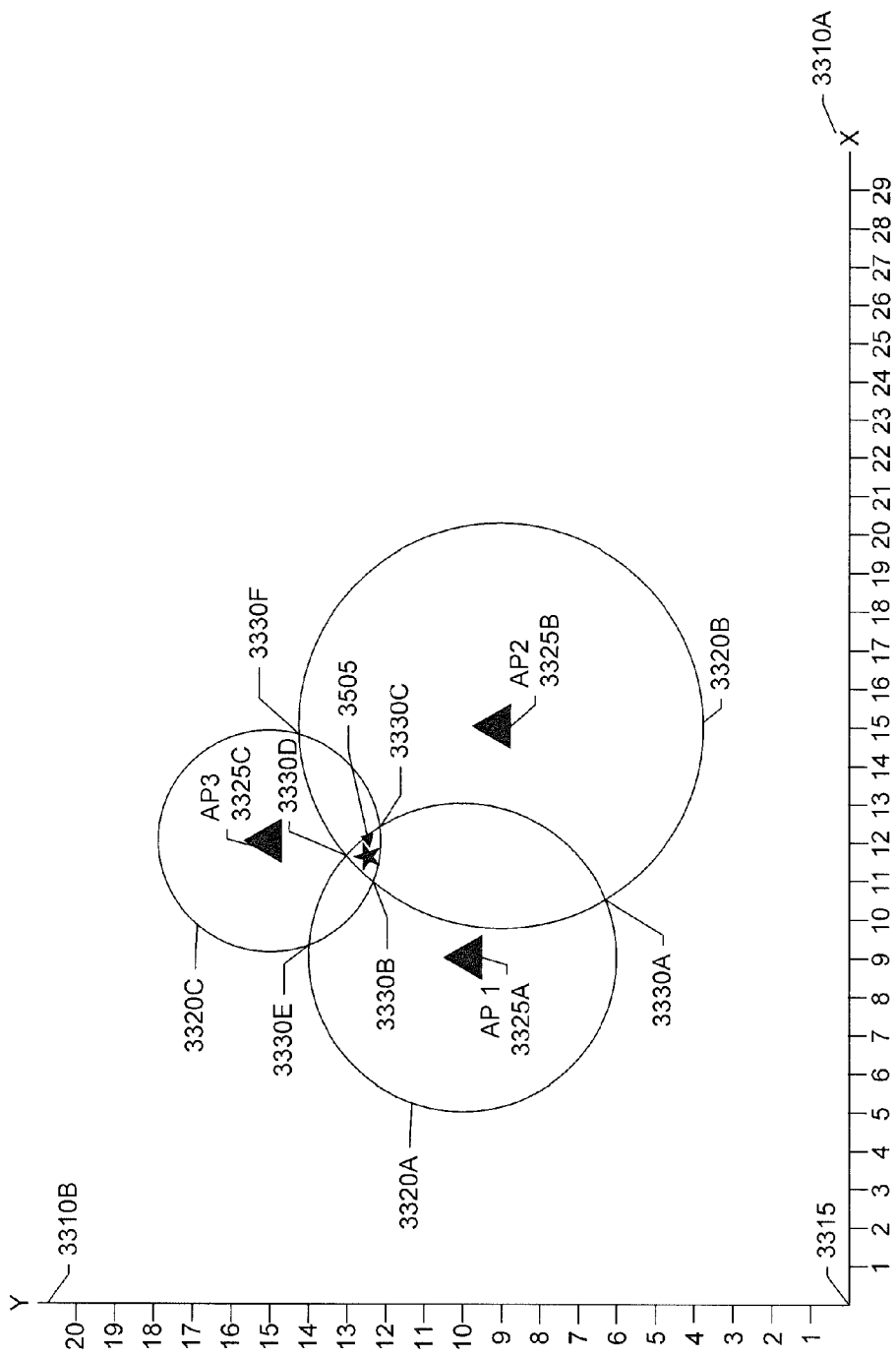
FIG. 35 shows the determined location of the tag-carrying subject.

Consider, as an example, the data shown in table E. As shown in table E, the first cluster includes cluster intersection points 3330A, 3330E, and 3330F. The points have the coordinates (10.5, 6.3), (9.4, 14), and (14.6, 14.3), respectively. In this specific implementation, these cluster intersection points form the vertices of a polygon. FIG. 34 shows an example of a polygon 3405 formed from the first cluster. A first line segment of the polygon extends between point 3330A and 3330E. A second line segment extends between point 3330E and 3330F. A third line segment extends between point 3330F and 3330A.

In this example, a shape of the polygon is a triangle. The shape, however, can vary depending upon factors such as the number of access points and points of intersection. For example, the shape of the polygon can be a square, rectangle, quadrilateral, pentagon, hexagon, heptagon, octagon, enneagon, or decagon—just to name a few examples.

The area can be calculated by applying the formula below:

$$\frac{(x_1 y_2 - y_1 x_2) + (x_2 y_3 - y_2 x_3) \ldots + (x_n y_1 - y_n x_1)}{2}$$

where $x_1$ is the x coordinate of the first vertex, $y_n$ is the coordinate of the nth vertex, and so forth.

Table F below summarizes the area calculations using the above formula for the clusters identified in table E above.

TABLE F

| Cluster | Cluster Intersection Points (Polygon Vertices) | Coordinates | Area |
|---|---|---|---|
| 1 | 3330A; 3330E; 3330F | (10.5, 6.3); (9.4, 14); (14.6, 14.3) | 20.2 |
| 2 | 3330A; 3330E; 3330B | (10.5, 6.3); (9.4, 14); (11, 12.5) | 5.3 |
| 3 | 3330A; 3330C; 3330F | (10.5, 6.3); (12.4, 12.4); (14.6, 14.3) | 4.9 |
| 4 | 3330A; 3330C; 3330B | (10.5, 6.3); (12.4, 12.4); (11, 12.5) | 4.4 |
| 5 | 3330D; 3330C; 3330B | (11.6, 13); (12.4, 12.4); (11, 12.5) | 0.4 |
| 6 | 3330D; 3330C; 3330F | (11.6, 13); (12.4, 12.4); (14.6, 14.3) | 1.4 |

Data in table F above shows that the size of the first cluster is 20.2. In other words, a polygon constructed using the intersection points of the first cluster as vertices has an area of 20.2 (e.g., 20.2 square centimeters or any other unit of area measurement as desired). The size of the second cluster is 5.3. The size of the third cluster is 4.9, and so forth. In an implementation, the system compares the cluster sizes to identify the cluster having the smallest size. The data in the table shows that the fifth cluster (i.e., cluster 5) has the smallest size. That is, the size of the fifth cluster is less than the size of the first, second, third, fourth, and sixth clusters.

The smallest cluster may be referred to as the location or point of maximum agreement among the at least three access points. Using cluster area in order to identify maximum agreement is merely one example of a technique to identify the tightest cluster of points. Other techniques may instead or additionally include comparing distances between points of one cluster with distances between points of another cluster to identify which cluster has the shortest distance between points. It should be appreciated that any competent clustering technique may be used to identify the tightest cluster of points.

Referring now to FIG. 31, in a step 3140, the system uses the cluster having the smallest size to determine a location of the tag. In a specific implementation, identifying the location of the tag includes finding a mean or average of the cluster points. Continuing with the example shown in table F, the fifth cluster includes intersection points having the coordinates (11.6, 13); (12.4, 12.4); and (11, 12.5). In this specific implementation, the x-coordinate value of the tag location is determined by averaging the x-coordinate values of the intersection points. In this example, an average x-coordinate value is 11.7 (i.e., (11.6+12.4+11)/3=11.7). The y-coordinate value of the tag location is determined by averaging the y-coordinate values of the intersection points. In this example, an average y-coordinate value is 12.6 (i.e., (13+12.4+12.5)/3=12.6). Thus, a location 3505 (FIG. 35) of the tag may be specified by the coordinates (11.7, 12.6).

As shown by a loop 3145, steps 3110-3140 are iterated in order to track the tag-carrying salesperson throughout the store and generate the Wi-Fi tracks.

In some cases, the circular boundaries defined for two or more access points may not intersect. This may be due to, for example, a small number of available access points or other factors. In these cases, the system can adjust one or more of the circular boundaries until they intersect. For example, radius of one or more of the circular boundaries may be increased until the circular boundaries intersect.

FIG. 36 shows a block diagram of a track identification system 3605. As shown in FIG. 36, this system includes a track comparison module 3610 and a track tagging module 3615. The track comparison module is responsible for comparing the Wi-Fi and video tracks. The comparison can identify which video tracks correspond or match the Wi-Fi tracks, which video tracks do not correspond or match the Wi-Fi tracks, or both.

In a specific implementation, determining whether a video track corresponds to a particular Wi-Fi track (or vice-versa) includes comparing changes in direction associated with the video track with changes in direction associated with the Wi-Fi track. In a specific implementation, the system builds feature vectors for the Wi-Fi and video tracks. The feature vector includes an indication of changes in direction. For example, a Wi-Fi track may indicate that the subject turned right, turned left, and so forth. A video track may indicate that subject turned right, turned left, and so forth. If the times at which the subject turned right and left (as recorded within the respective Wi-Fi and video tracks) correspond or match, the system may determine that the two tracks correspond or match. Track comparison may occur iteratively.

Applicant has discovered that there can be slight discrepancies between the location or position data associated with a video track and the location or position data associated with a corresponding Wi-Fi track. Directionality changes, however, has been found to be a good indicator of whether or not the two tracks are associated with the same subject. Comparisons, however, can be based on any parameter or combination of parameters associated with the Wi-Fi and video tracks such as time, date, velocity, speed, acceleration, directionality, location, position, changes or deltas (e.g., changes in velocity), and so forth.

The track tagging module is responsible for tagging or labeling the video tracks. For example, if a video track has a corresponding or matching Wi-Fi track, the video track may be tagged or labeled as being associated with subjects of the first subject type, i.e., tag-carrying subjects such as salespersons. If the video track does not have a corresponding or matching Wi-Fi track, the video track may be tagged or labeled as being associated with subjects of the second subject type, i.e., non-tag carrying subjects such as customers. The labels may be stored as tracking metadata.

In a specific implementation, a flow for correlating the Wi-Fi and video tracks is as follows. We first produce representations of the two different movement traces (e.g., WiFi and video) that are comparable and that account for the deficiencies in each trace type. We find the temporal intersection between the two traces, which means taking the segment of each trace that begins at the maximum start time of the two and ends at the minimum end time of the two.

Next, we determine suitable temporal and spatial sample resolutions. These resolutions can be thought of as the "lowest common denominator" between the two trace types. In a specific implementation, 1 second and 1 meter for temporal and spatial resolutions, respectively, is used. In other words, in this specific implementation, at each whole second, we take a location sample from each trace, rounded to the nearest meter.

We now step through each trace at intervals corresponding to the temporal resolution, recording spatial location (discretized at the spatial resolution determined above) and velocity (represented in polar form, theta and magnitude).

We now make the assumption that there is one video track for each Wi-Fi track. We can then perform an optimal matching between the two sets of tracks using a modified version of Munkres' Algorithm, with the cost of correlating two tracks determined by the Euclidean distance between their feature vectors.

In a specific implementation, comparing and tagging the tracks is performed offline. Performing the operations offline helps to conserve computing resources. For example, the operations may be performed at the end of the day or during the night. In another specific implementation, the operations are performed in real-time or near real-time to provide immediate analysis. For example, if a large number of customers are in an area of the store where there are relatively few salespersons, the system can generate an alert so that additional salespersons can go to the area to assist the customers.

In a specific implementation, the Wi-Fi tracking algorithm is capable of generating multiple hypotheses related to the location of a client. Each hypothesis has a confidence score attached based on properties of the algorithm. Each of these hypotheses can then be used to match against candidate tracks from video, taking into account the confidence score when performing a match. In brief, in this specific implementation, the algorithm essentially says "I have several guesses as to where the client (e.g., tag) is and I'll explore all of these guesses when looking for the corresponding video track."

FIG. 37 shows an example of identified video tracks 3705 superimposed over a floor plan 3710 of the store. In a specific implementation, tracks shown in red are associated with subjects of the first type (e.g., salespersons or sales associates). Tracks shown in yellow are associated with subjects of the second type (e.g., customers) or vice-versa. It should be appreciated that any visual or graphical indicator or combinations of visual indicators may be used to identify the different tracks. For example, tracks belonging to salespersons may be displayed in a first line pattern (e.g., solid lines). Tracks belonging to customers may be displayed in a second line pattern, different from the first line pattern (e.g., broken lines). Some specific examples of visual indicators include colors, line weights, line patterns, and text labels.

FIG. 38 shows an example of a graphic for finding and analyzing interactions. As shown in FIG. 38, there is a floor plan 3802. Filled circles 3805, and unfilled or outlined circles 3810 are superimposed over the floor plan. There is a log 3815 listing interactions. Entries in the log may include a time and date of the interaction, a description of the interaction, and so forth.

In this example, each filled circle 3805 is the location of a person in the store at a given time. Outlines 3810 are drawn around interactions, or instances where two or more filled circles (persons) occupy proximal locations at the same time. In a specific implementation, yellowed filled circles represent people and red outlines represent interactions. It should be appreciated, however, that any visual indicator or combination of visual indicators may be used to distinguish between subjects (e.g., people) and interactions. For example, people and interactions can be represented by different colors, fill patterns, line patterns (e.g., broken lines versus solid lines), line weights, shapes (e.g., circles, squares, rectangles, triangles, or stars), text labels, or combinations of these.

Each interaction may be accompanied by a timestamp 3820 that indicates the time and date of the interaction (e.g., "10/26/2009 4:36 PM"). As discussed, the definition of an "interaction" can be flexible and can be tuned to different environments. For example, one retailer might be interested in understanding properties of "greeters" or people at the front door who say hello to customers (so an interaction might be defined as an associate and customer spending at least 5 seconds within 5 feet of each other), while another retailer might only want to understand longer interactions, i.e., those that constitute a conversation (where an interaction might be an associate and customer spending at least 2 minutes together while being within 15 feet).

In a specific implementation, a user, such as an administrator, can configure the criteria for an interaction. A first criteria may include duration. A second criteria may include proximity or distance. In a specific implementation, a method for identifying interactions includes storing a duration threshold, storing a proximity threshold, scanning and comparing first tracking data associated with a subject of a first type and second tracking data associated with a subject of a second type, determining that there is a point in the first tracking data, and a corresponding point in the second tracking data where a distance between the point and the corresponding point satisfies the proximity threshold, and a duration associated with the point and the corresponding point satisfies the duration threshold, and based on the determinations, indicating an interaction between the subject of the first type and the subject of the second type.

Satisfying the proximity threshold may include determining that the distance is below the proximity threshold. A determination may include that the distance is less than or equal to the proximity threshold. Satisfying the duration threshold may include determining that the duration during which the distance satisfies the proximity threshold exceeds the duration threshold. A determination may include that the duration is greater than or equal to the duration threshold. The duration and proximity thresholds can be user-defined. The system may provide default thresholds.

A duration threshold may range, for example, from about 5 seconds to about 5 hours. This includes, for example, 6, 7, 8, 9, 10, 15, 30, 40, 50, 60, 70, 80, 90, 100, or 110 seconds; 2, 3, 4, 5, 6, 7, 8, 9, 10, 15, 20, 25, 30, 40, 50, 60, 70, or 80 minutes; or 2, 3, or 4 hours. A duration threshold may be less than 5 seconds or greater than 5 hours. A proximity threshold may range from about 1 foot (30.5 centimeters) to about 15 feet (457.2 centimeters). This includes, for example, 60, 90, 120, 150, 180, 210, 240, 270, 300, 330, 360, 390, 420, 450, or more than 450 centimeters. A duration threshold may be less than 60 centimeters.

It should be appreciated that the thresholds can vary widely depending upon factors such as the specific environment in which the system is deployed, the desired data to be gathered, the desired sensitivity, the level of analysis, the desired granularity of analysis, the cultural context, and others. For example, for a grocery store the duration thresholds may on average be less than the average duration thresholds for a clothing store because salespersons typically spend less time with customers shopping for groceries as compared to customers shopping for clothing (e.g., purchasing a wedding dress). As another example, the idea of personal space can vary depending upon the cultural setting. In some cultures people interact while standing very close to each other whereas in other cultures people consider such close interactions to be an invasion of personal space. Providing configurable proximity thresholds allows the system to be adapted to different environments and contexts.

Indicating an interaction between the subject of the first type and subject of the second type may include drawing a graphic associated with the point and the corresponding point, tagging or labeling the tracks with metadata to indicate the interaction, displaying a timestamp indicating a starting time of the interaction, displaying a timestamp indicating an ending time of the interaction, displaying an elapsed time duration of the interaction, or combinations of these. In a specific implementation, the graphic includes a shape drawn around the point and the corresponding point. A size or dimension of the shape may be proportional to the elapsed time duration of the interaction. For example, the shape may be a circle where the diameter of the circle is proportional to the elapsed time duration of the interaction. Larger circles may indicate longer interaction durations. Smaller circles may indicate shorter interaction durations.

There can be different types of interactions that can be defined or configured by an administrator user. For example, a first type of interaction may be defined by a first threshold proximity, and a first threshold duration. A second type of interaction may be defined by a second threshold proximity, and a second threshold duration. The first threshold proximity may be the same or different from the second threshold proximity. The first threshold duration may be the same or different from the second threshold duration. Having different types of interactions can allow, for example, the retailer to understand the interactions of "greeters" or the people at the store entrance who greet the incoming customers versus the interactions with salespersons who assist the customers in purchasing the item. There can be filters associated with the interaction types. For example, applying a first filter may filter out interactions of the first type while showing interactions of the second type. Applying a second filter, different from the first filter, may show interactions of the first and second type. The system may include a search tool to search for interactions using any criteria.

FIG. 39 shows another example of a graphic for finding and analyzing interactions. FIG. 39 is an example of visualizing closer interactions in the context of working together at a table or desk. This may be referred to as "collaboration." In a specific implementation, green circles 3905 are person locations during collaboration and are connected via green lines to the other collaboration participant(s). Red circles 3910 denote instances of a person working alone. It should be appreciated that any type of visual indicator or combination of visual indicators may be used to distinguish between people collaborating and people working alone.

Combining Wi-Fi and video tracking helps to provide both accuracy and precision. For example, Wi-Fi tracking as compared to video tracking can be more accurate, but less precise (e.g., "I know someone is there because I've received a MAC ID, but I don't know exactly where"). Conversely, video tracking as compared to Wi-Fi tracking can be less accurate, but more precise (e.g., "I'm not sure someone is there—it might be a shadow or a reflection—but, if someone is there, I know exactly or within a millimeter of where they are").

In a specific implementation, Wi-Fi tracking as shown, for example, in FIG. 31 and described in accompanying discussion, uses Wi-Fi signal emitting tags. These tags may be provided to employees of the store so that the employees can be tracked. In this specific implementation, the tags may not have components such as display screens, global positioning system receivers, large capacity storage devices (e.g., flash memory), or other components typically found in a smartphone. Excluding these components helps to lower the manufacturing cost of the tags, reduce the overall size of the tag, reduce the amount of battery power required to operate the tag, and reduce the weight of the tag. It should be appreciated, however, that the principles of the invention, such as Wi-Fi tracking, can be applied to tracking and locating any type of mobile client, including smartphones, that transmits wireless signals (e.g., Wi-Fi signals). Techniques for determining location based on Wi-Fi signal strength may be applicable to other types of wireless signals besides Wi-Fi.

As discussed above, a specific implementation of the system is person tracking in a retail environment. It should be appreciated, however, that aspects of the invention can be applied to tracking subjects in other environments such as airports, stadiums, buildings, arenas, outdoor environments (e.g., cities and towns), factories, manufacturing plants, parks, zoos, and so forth. In other specific embodiments, the subjects may instead or additionally include non-humans, such as animals, fish, and so forth.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
    tracking a plurality of subjects using video image processing to generate video tracks of the plurality of subjects, the plurality of subjects including subjects of a first type and subjects of a second type;
    tracking the subjects of the first type using wireless signals received from radio frequency tags coupled to the subjects of the first type to generate wireless tracks of the subjects of the first type;
    comparing the wireless tracks of the subjects of the first type to the video tracks of the plurality of subjects to identify video tracks associated with the subjects of the first type and to identify video tracks associated with the subjects of the second type;
    based on the comparison, labeling a first subset of the video tracks identified as being associated with the subjects of the first type and labeling a second subset of the video track identified as being associated with the subjects of the second type;
    analyzing the first subset of the video tracks and the second subset of the video tracks to identify interactions between a first subject of the first type and a first subject of the second type in a first area based on a first video track of the first subset of video tracks being within a first predetermined distance to a first video track of the second subset of video tracks for a first predetermined period of time, and to identify interactions between a second subject of the first type and a second subject of the second type in a second area based on a second video track of the first subset of video tracks being within a second predetermined distance to a second video track of the second subset of video tracks for a second predetermined period of time, wherein the first predetermined distance is different than the second predetermined distance or the first predetermined period of time is different than the second predetermined period of time; and
    providing, for display, a report of the identified interactions based on a result from the analyzing the first and second subsets of the video tracks.

2. The method of claim 1 wherein the subjects of the first type comprise salespersons, and the subjects of the second type comprise customers.

3. The method of claim 1 wherein the step of comparing the wireless tracks to the video tracks comprises:
    comparing changes in direction specified by a first wireless track with changes in direction specified by a first video track; and
    when the changes in direction specified by the first wireless track correspond to the changes in direction specified by the first video track, labeling the first video track as being associated with a subject of the first type.

4. The method of claim 1, wherein the step of analyzing the first subset and the second subset to indentify the interaction includes determining a length of time that the second video track is within a defined area before the interaction occurs.

5. The method of claim 1, wherein the step of analyzing the first subset and the second subset to indentify the interaction includes determining a length of time of the interaction.

6. The method of claim 5, wherein the step of analyzing the first subset and the second subset to indentify the interaction includes correlating an amount of a sale to the subject of the second type associated with the second video track to the length of time of the interaction.

7. The method of claim 1, wherein the step of analyzing the first subset and the second subset to indentify the interaction includes determining distances traveled by the first and second video tracks of the first subset of video track and the first and second video tracks of the second subset of video track during the interaction.

8. A method comprising:
    tracking a plurality of subjects using video image processing to generate video tracks of the plurality of subjects, the plurality of subjects including subjects of a first type and subjects of a second type;
    tracking the subjects of the first type using wireless signals received from radio frequency tags coupled to the subjects of the first type to generate wireless tracks of the subjects of the first type, wherein the radio frequency tags are not coupled to the subjects of the second type;
    comparing the wireless tracks of the subjects of the first type to the video tracks of the plurality of subjects to identify video tracks associated with the subjects of the first type and to identify video tracks associated with the subjects of the second type;
    based on the comparison, labeling a first subset of the video tracks identified as being associated with the subjects of the first type and labeling a second subset of the video track identified as being associated with the subjects of the second type;
    analyzing the first subset of the video tracks and the second subset of the video tracks to identify interactions between a first subject of the first type and a first subject of the second type in a first area based on a first video track of the first subset of video tracks being within a first predetermined distance to a first video track of the second subset of video tracks for a first predetermined period of time, and to identify interactions between a second subject of the first type and a second subject of the second type in a second area based on a second video track of the first subset of video tracks being within a second predetermined distance to a second video track of the second subset of video tracks for a second predetermined period of time, wherein the first predetermined distance is different than the second predetermined distance or the first predetermined period of time is different than the second predetermined period of time; and
    providing, for display, a report of the identified interactions based on a result from the analyzing the first and second subsets of the video tracks.

9. The method of claim 8 wherein the subjects of the first type comprise salespersons, and the subjects of the second type comprise customers.

10. The method of claim 8 wherein the step of comparing the wireless to the video tracks comprises:
   comparing changes in direction specified by a first wireless track and changes in direction specified by a first video track; and
   when the changes in direction specified by the first wireless track corresponds to the changes in direction specified by the first video track, labeling the first video track as being associated with the subjects of the first type.

11. The method of claim 8 wherein the step of tracking the subjects of the first type comprises:
   detecting at each of at least three access points a strength of a signal from a first radio frequency tag carried by the first subject of the first type;
   determining for each of the at least three access points a distance between an access point and the first radio frequency tag based on the strength of the signal detected at the access point;
   defining for each access point a circular boundary encompassing possible locations for the first radio frequency tag, the circular boundary comprising a radius based on the determined distance between the access point and the radio frequency tag;
   identifying pairs of intersections formed by each circular boundary crossing another circular boundary;
   grouping the intersections into a plurality of clusters, each cluster comprising a single intersection from each of the pairs of intersections;
   analyzing the plurality of clusters to identify a cluster having a smallest size; and
   using the cluster having the smallest size to determine a location of the first radio frequency tag.

12. A method comprising:
   tracking a plurality of subjects using video image processing to generate video tracks of the plurality of subjects, the plurality of subjects including subjects of a first type and subjects of a second type;
   while tracking the plurality of subjects using video image processing, simultaneously tracking the subjects of the first type using wireless signals received from radio frequency tags coupled to the subjects of the first type to generate wireless tracks of the subjects of the first type;
   comparing the wireless tracks of the subjects of the first type to the video tracks of the plurality of subjects to identify video tracks associated with the subjects of the first type and to identify video tracks associated with the subjects of the second type;
   based on the comparison, labeling a first subset of the video tracks identified as being associated with the subjects of the first type and labeling a second subset of the video track identified as being associated with the subjects of the second type;
   analyzing the first subset of the video tracks and the second subset of the video tracks to identify interactions between a first subject of the first type and a first subject of the second type in a first area based on a first video track of the first subset of video tracks being within a first predetermined distance to a first video track of the second subset of video tracks for a first predetermined period of time, and to identify interactions between a second subject of the first type and a second subject of the second type in a second area based on a second video track of the first subset of video tracks being within a second predetermined distance to a second video track of the second subset of video tracks for a second predetermined period of time, wherein the first predetermined distance is different than the second predetermined distance or the first predetermined period of time is different than the second predetermined period of time; and
   providing, for display, a report of the identified interactions based on a result from the analyzing the first and second subsets of the video tracks.

13. The method of claim 12 wherein the step of tracking the subjects of the first type comprises:
   detecting at each of at least three access points a strength of a signal from a first radio frequency tag carried by the first subject of the first type;
   determining for each of the at least three access points a distance between an access point and the first radio frequency tag based on the strength of the signal detected at the access point;
   defining for each access point a circular boundary encompassing possible locations for the first radio frequency tag, the circular boundary comprising a radius equal to or greater than the determined distance between the access point and the radio frequency tag;
   identifying pairs of intersections formed by each circular boundary crossing another circular boundary;
   grouping the intersections into a plurality of clusters, each cluster comprising a single intersection from each of the pairs of intersections;
   analyzing the plurality of clusters to identify a cluster having a smallest size; and
   using the cluster having the smallest size to determine a location of the first radio frequency tag.

14. The method of claim 13 wherein the intersections of the clusters form vertices of polygons, and the analyzing the plurality of clusters to identify a cluster having a smallest size comprises:
   calculating areas of the polygons; and
   comparing the areas to identify a polygon having a smallest area, wherein the polygon having the smallest area is the cluster having the smallest size.

15. The method of claim 13 wherein the intersections are specified by x-coordinates and y-coordinates.

16. The method of claim 12 wherein the comparing the wireless tracks to the video tracks comprises:
   comparing changes in direction specified by a first wireless track and changes in direction specified by the first video track; and
   when the changes in direction specified by the first wireless track corresponds to the changes in direction specified by the first video track, labeling the first video track as being associated with the subjects of the first type.

* * * * *